United States Patent
Doi et al.

(10) Patent No.: US 8,012,603 B2
(45) Date of Patent: Sep. 6, 2011

(54) POLYMER COMPOUND AND POLYMER LIGHT-EMITTING DEVICE USING THE SAME

(75) Inventors: Shuji Doi, Tsukuba (JP); Satoshi Kobayashi, Tsukuba (JP); Takanobu Noguchi, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1148 days.

(21) Appl. No.: 10/532,937

(22) PCT Filed: Oct. 3, 2003

(86) PCT No.: PCT/JP03/12697
§ 371 (c)(1),
(2), (4) Date: Apr. 28, 2005

(87) PCT Pub. No.: WO2004/039859
PCT Pub. Date: May 13, 2004

(65) Prior Publication Data
US 2008/0138651 A1 Jun. 12, 2008

(30) Foreign Application Priority Data
Oct. 30, 2002 (JP) .................. 2002-315516

(51) Int. Cl.
*H01L 51/54* (2006.01)
*C09K 11/06* (2006.01)
*C08G 61/00* (2006.01)

(52) U.S. Cl. .......... 428/690; 428/917; 313/504; 257/40; 257/E51.028; 257/E51.036; 252/301.35; 528/8; 528/394; 528/405; 528/417; 528/422

(58) Field of Classification Search .................. None
See application file for complete search history.

(56) References Cited

U.S. PATENT DOCUMENTS

| | | | |
|---|---|---|---|
| 3,987,186 A | 10/1976 | Devlin et al. | |
| 4,624,949 A | 11/1986 | Melloni et al. | |
| 7,723,455 B2 * | 5/2010 | Becker et al. | 528/8 |
| 2001/0026878 A1 | 10/2001 | Woo et al. | |
| 2002/0028347 A1 * | 3/2002 | Marrocco, III et al. | 428/690 |
| 2002/0115711 A1 | 8/2002 | Schmidt | |
| 2002/0173617 A1 | 11/2002 | Yasuda et al. | |
| 2003/0168656 A1 * | 9/2003 | Kobayashi et al. | 257/40 |
| 2004/0067388 A1 | 4/2004 | Suzuki | |
| 2004/0131886 A1 * | 7/2004 | Marrocco, III et al. | 428/690 |
| 2007/0051922 A1 * | 3/2007 | Nakatani et al. | 252/301.35 |
| 2008/0003422 A1 * | 1/2008 | Ueda | 428/220 |

FOREIGN PATENT DOCUMENTS

| | | |
|---|---|---|
| EP | 1 318 163 A1 | 6/2003 |
| JP | 06-122874 A | 5/1994 |
| JP | 2002284862 A | 10/2002 |
| JP | 2003-221579 * | 8/2003 |
| WO | 01/96454 A1 | 12/2001 |
| WO | WO 02/26856 A1 | 4/2002 |
| WO | 03/099901 A1 | 12/2003 |

* cited by examiner

*Primary Examiner* — Marie R. Yamnitzky
(74) *Attorney, Agent, or Firm* — Sughrue Mion, PLLC

(57) ABSTRACT

High-molecular compounds comprising repeating units represented by the general formula (1) or (2) and having number-average molecular weights of $10^3$ to $10^8$ in terms of polystyrene: (1) [wherein $Ar^1$ and $Ar^2$ are each independently a trivalent aromatic hydrocarbon group or a trivalent heterocyclic group; and $X^1$ and $X^2$ are each independently O, S, C(=O), S(=O), $SO_2$, $C(R^1)(R^2)$, $Si(R^3)(R^4)$, $N(R^5)$, $B(R^6)$, $P(R^7)$, or $P(=O)(R^8)$, with the provisos that $X^1$ and $X^2$ must not be the same and that $X^1$ and $Ar^2$ are bonded respectively to the adjacent carbon atoms constituting the aromatic ring of $Ar^1$, and $X^2$ and $Ar^1$ are bonded respectively to the adjacent carbon atoms constituting the aromatic ring of $Ar^2$] (2) [wherein $Ar^3$ and $Ar^4$ are each independently a trivalent aromatic hydrocarbon group or a trivalent heterocyclic group; and $X^3$ and $X^4$ are each independently N, B, P, $C(R^9)$, or $Si(R^{10})$, with the provisos that $X^3$ and $X^4$ must not be the same and that $X^3$ and $Ar^4$ are bonded respectively to the adjacent carbon atoms constituting the aromatic ring of $Ar^3$, and $X^4$ and $Ar^3$ are bonded respectively to the adjacent carbon atoms constituting the aromatic ring of $Ar^4$].

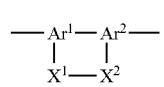

(1)

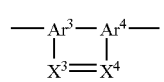

(2)

18 Claims, No Drawings

POLYMER COMPOUND AND POLYMER LIGHT-EMITTING DEVICE USING THE SAME

TECHNICAL FIELD

The present invention relates to a polymer compound, and a polymer light-emitting device (hereafter may be referred to as polymer LED) using the polymer compound.

BACKGROUND TECHNOLOGY

Unlike low molecular weight materials, a high molecular weight light-emitting material and a high molecular weight charge transporting material are soluble in a solvent, and are variously studied because a layer in a light-emitting device can be formed by a coating method, and as the example, polymer compounds having a repeating unit consisting of fluorenediyl group have been known (for example, WO 99/54385). Moreover, although a polymer compound having a symmetrical repeating unit has been known, the light emission strength is not satisfactory (JP-A 2002-284662).

DISCLOSURE OF THE INVENTION

An object of the present invention is to provide a new polymer compound having strong light emission strength, and a polymer light-emitting device using said polymer compound. As a result of studies in order to solve the above problems, the present inventors found that a polymer compound having specific structure in the repeating units is useful as a light-emitting material, a charge transporting material, etc., and completed the present invention.

That is, the present invention relates to a polymer compound comprising a repeating unit of below formula (1) or (2), and having a polystyrene reduced number average molecular weight of $10^3$ to $10^8$.

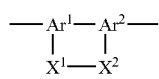
(1)

In the formula, $Ar^1$ and $Ar^2$ each independently represent a trivalent aromatic hydrocarbon group or a trivalent heterocyclic group. $X^1$ and $X^2$ each independently represent O, S, C(=O), S(=O), $SO_2$, $C(R^1)(R^2)$, $Si(R^3)(R^4)$, $N(R^5)$, $B(R^6)$, $P(R^7)$ or P(=O)($R^8$). Here, $R^1$, $R^2$, $R^3$, $R^4$, $R^5$, $R^6$, $R^7$ and $R^8$ each independently represent a hydrogen atom, halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imine residue, amino group, substituted amino group, substituted silyl group, substituted silyloxy group, substituted silylthio group, substituted silylamino group, a monovalent heterocyclic group, arylalkenyl group, arylethynyl group, carboxyl group or cyano group. $R^1$ and $R^2$, or $R^3$ and $R^4$ may be connected mutually to form a ring. $X^1$ and $X^2$ are not the same. Moreover, $X^1$ and $Ar^2$ bond to adjacent carbons in the aromatic ring of $Ar^1$, and $X^2$ and $Ar^1$ bond to adjacent carbons in the aromatic ring of $Ar^2$.

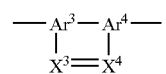
(2)

In the formula, $Ar^3$ and $Ar^4$ each independently represent a trivalent aromatic hydrocarbon group or a trivalent heterocyclic group. $X^3$ and $X^4$ each independently represent N, B, P, $C(R^9)$ or $Si(R^{10})$. Here, $R^9$ and $R^{10}$ each independently represent a hydrogen atom, halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imine residue, amino group, substituted amino group, substituted silyl group, substituted silyloxy group, substituted silylthio group, substituted silylamino group, a monovalent heterocyclic group, arylalkenyl group, arylethynyl group, carboxyl group or cyano group. $X^3$ and $X^4$ are not the same. Moreover, $X^3$ and $Ar^4$ bond to adjacent carbons in the aromatic ring of $Ar^3$, and $X^4$ and $Ar^3$ bond to adjacent carbons in the aromatic ring of $Ar^4$.

BEST MODE OF THE INVENTION

Hereafter, a polymer compound and a polymer light-emitting device using thereof of the present invention are explained in detail.

In the above formulas (1) and (2), $Ar^1$, $Ar^2$, $Ar^3$ and $Ar^4$ each independently represent a trivalent aromatic hydrocarbon group or a trivalent heterocyclic group.

In view of fluorescence strength, it is preferable that the repeating unit represented by the above formula (1) is contained.

Here, the trivalent aromatic hydrocarbon group is an atomic group in which three hydrogen atoms are removed from a benzene ring or a condensed ring, and usually has 6-60, preferably 6-20 carbon atoms, and the following compounds are exemplified.

The aromatic hydrocarbon group may have a substituent thereon, and the number of carbon atoms of the substituent is not counted as the number of carbon atoms of the trivalent aromatic hydrocarbon group.

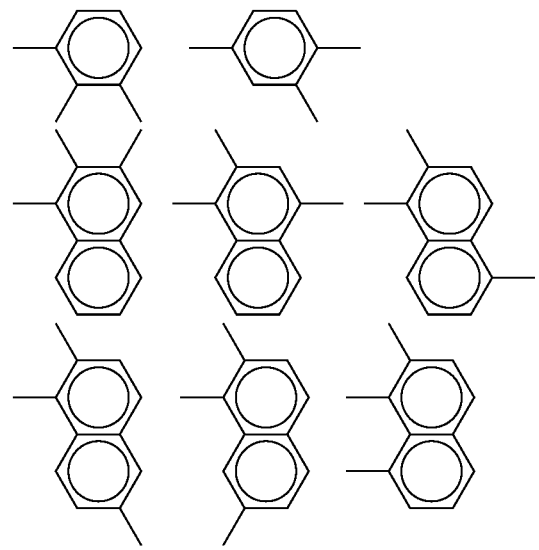

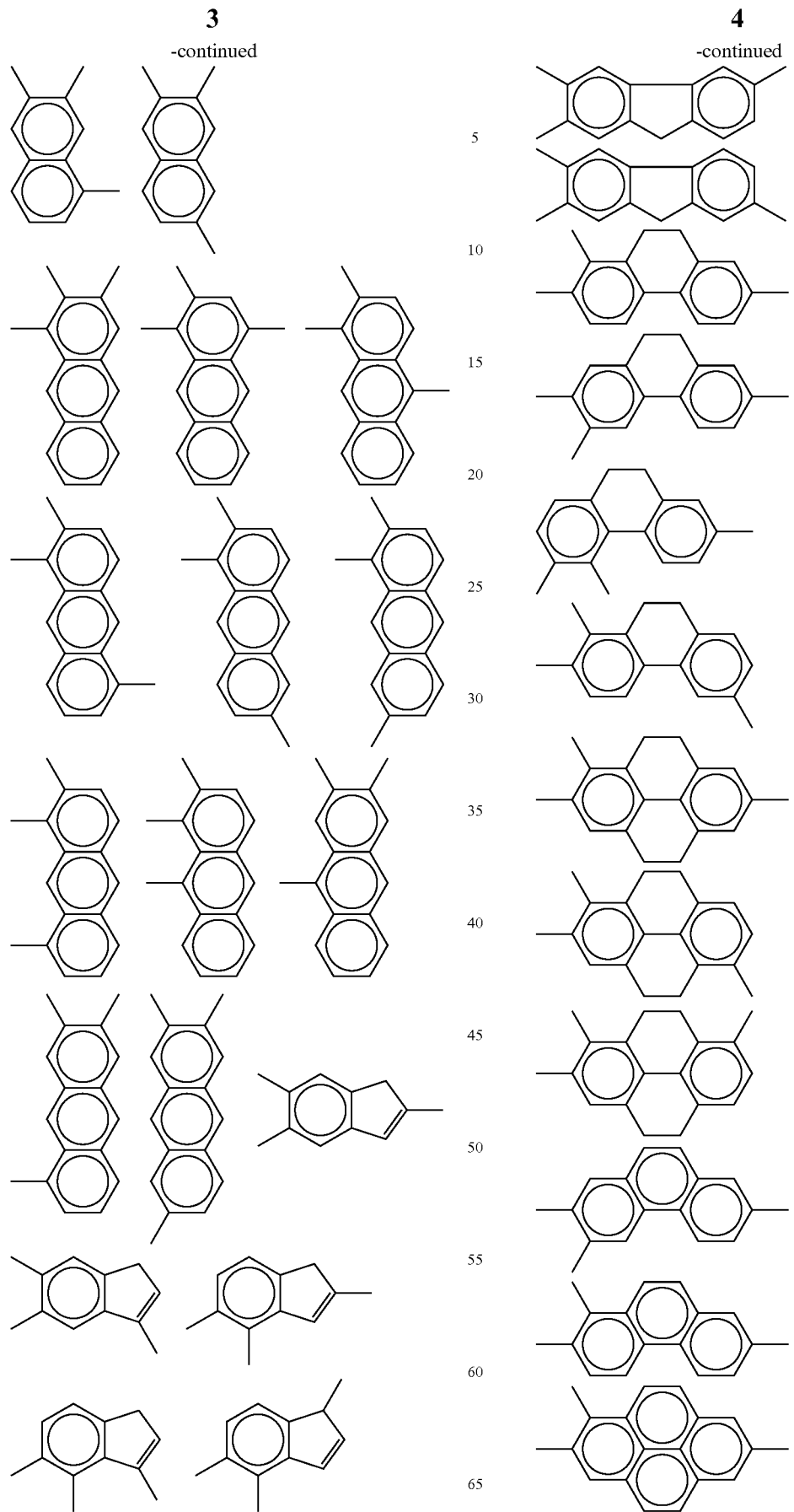

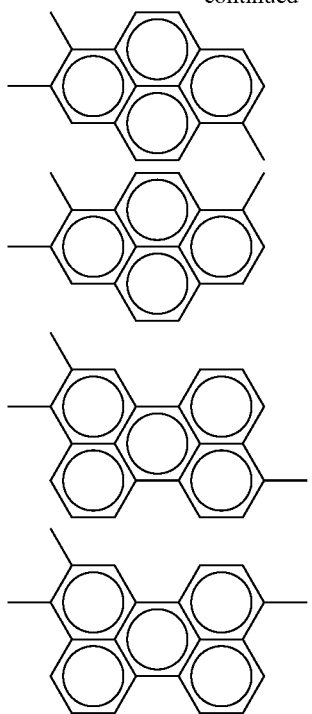

Here, the trivalent heterocyclic group is an atomic group in which three hydrogen atoms are removed from a heterocyclic compound, and usually has 4-60, preferably 4-20 carbon atoms.

The heterocyclic group may have a substituent thereon, and the number of carbon atoms of the substituent is not counted as the number of carbon atoms of the trivalent aromatic hydrocarbon group.

Here, The heterocyclic compound means an organic compound having a cyclic structure in which at least one heteroatom such as oxygen, sulfur, nitrogen, phosphorus, boron, silicon, etc. is contained in the cyclic structure as the element other than carbon atoms.

As the trivalent heterocyclic group, followings are exemplified.

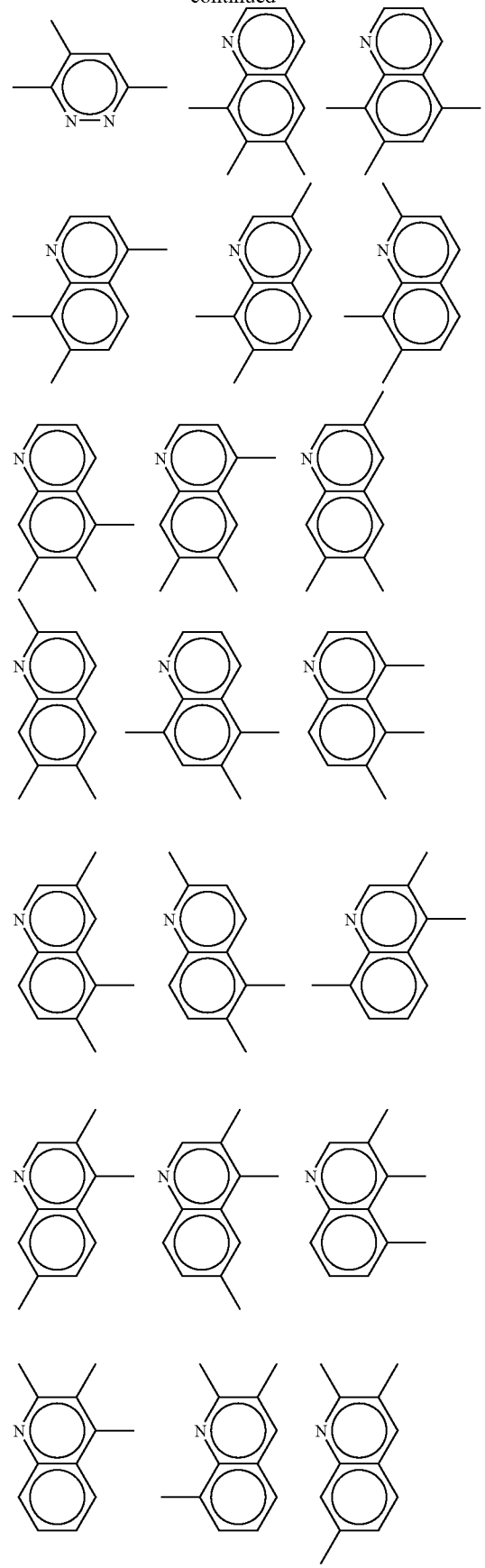

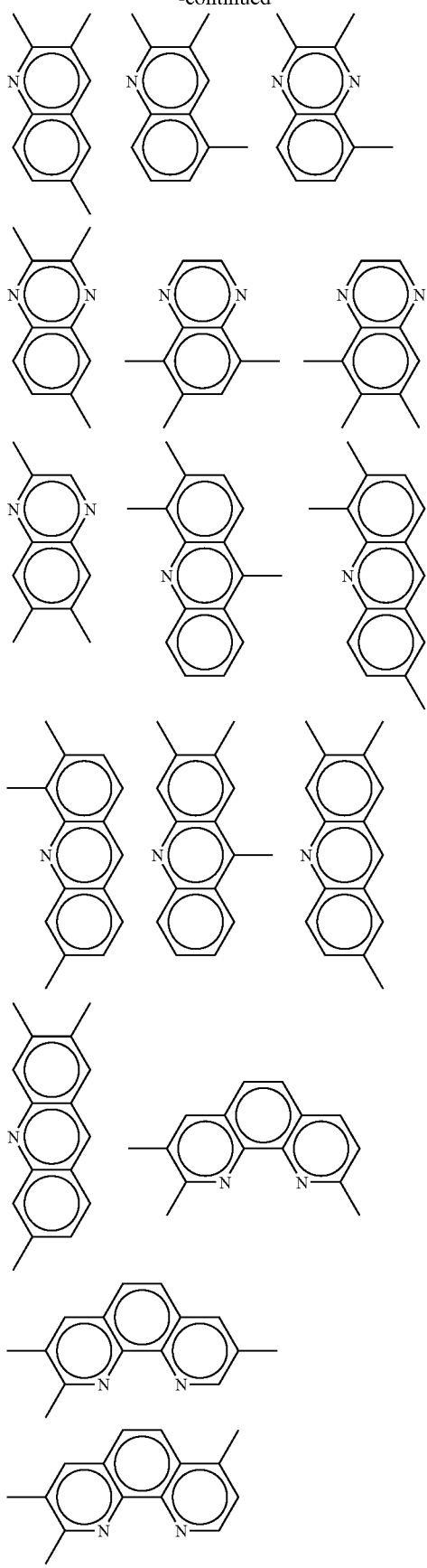

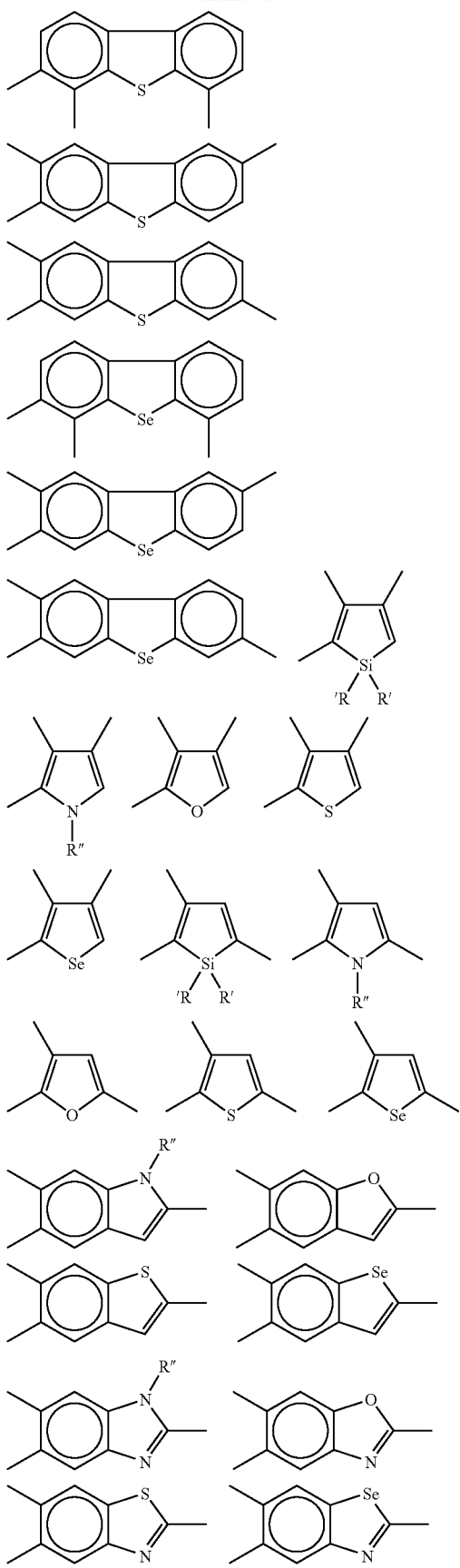

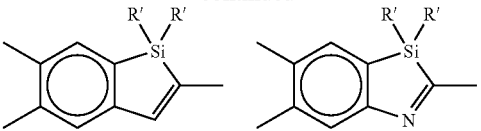

In the above formulas, R' each independently represents a hydrogen atom, halogen atom, alkyl group, alkoxy group, alkylthio group, alkylamino group, aryl group, aryloxy group, arylthio group, arylamino group, arylalkyl group, arylalkoxy group, aryl alkylthio group, arylalkylamino group, acyloxy group, amide group, arylalkenyl group, arylalkynyl group, a monovalent heterocyclic group, or cyano group.

R" each independently represents a hydrogen atom, alkyl group, aryl group, arylalkyl group, substituted silyl group, acyl group, or a monovalent heterocyclic group.

Examples of the substituent which may exist on the trivalent aromatic hydrocarbon group or the trivalent heterocyclic group include: a halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, It exemplifies imine residue, amino group, substituted amino group, substituted silyl group, substituted silyloxy group, substituted silylthio group, substituted silylamino group, a monovalent heterocyclic group, arylalkenyl group, aryl ethynyl group, carboxyl group, or cyano group.

In the above formula (1), $X^1$ and $X^2$ each independently represent O, S, C(=O), S(=O), $SO_2$, $C(R^1)(R^2)$, $Si(R^3)(R^4)$, $N(R^5)$, $B(R^6)$, $P(R^7)$ or $P(=O)(R^8)$. Here, $X^1$ and $X^2$ are not the same.

In the formula, $R^1$-$R^8$ each independently represent a hydrogen atom, halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imine residue, amino group, substituted amino group, substituted silyl group, substituted silyloxy group, substituted silylthio group, substituted silylamino group, monovalent heterocyclic group, arylalkenyl group, aryl ethynyl group, carboxyl group, or cyano group.

Among them, $X^1$ in formula (1) is preferably $C(R^1)(R^2)$, $Si(R^3)(R^4)$, $N(R^5)$, $B(R^6)$, $P(R^7)$ or $P(=O)(R^8)$. (in the formula, $R^1$-$R^8$ each independently show the same meaning as those mentioned above), and more preferably it is $C(R^1)(R^2)$.

As —$X^1$-$X^2$—, the groups represented by following (26), (27), and (28) are exemplified.

(26)

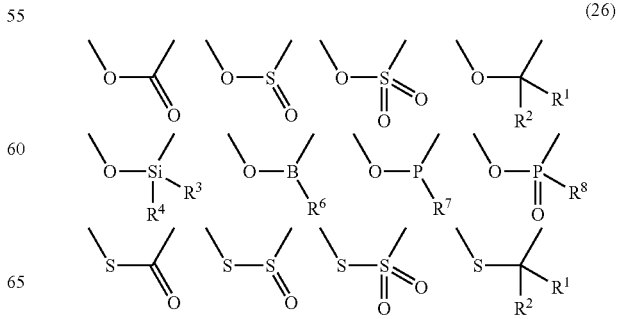

-continued

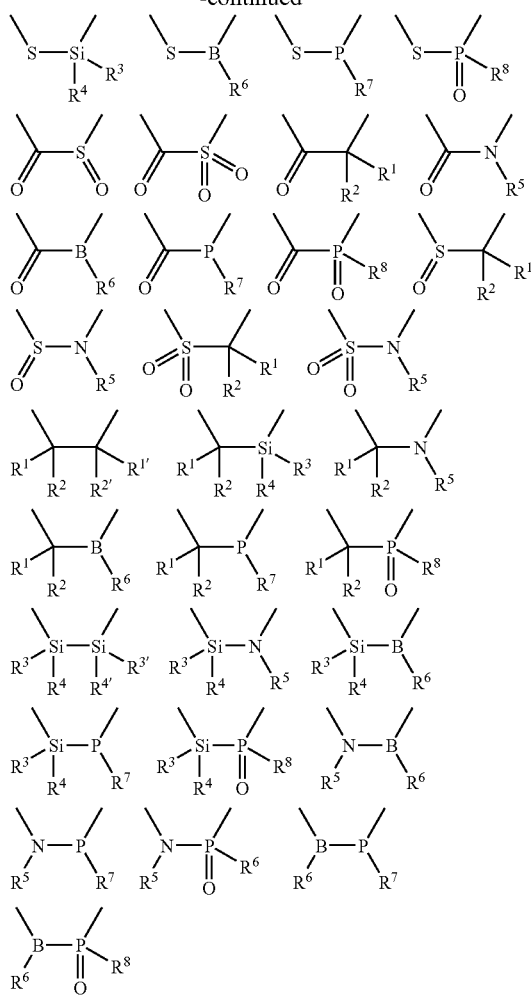

(27)

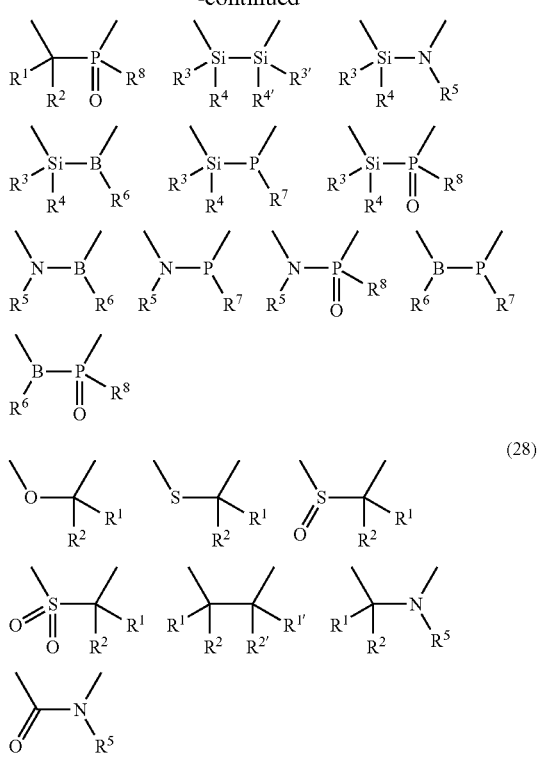

(28)

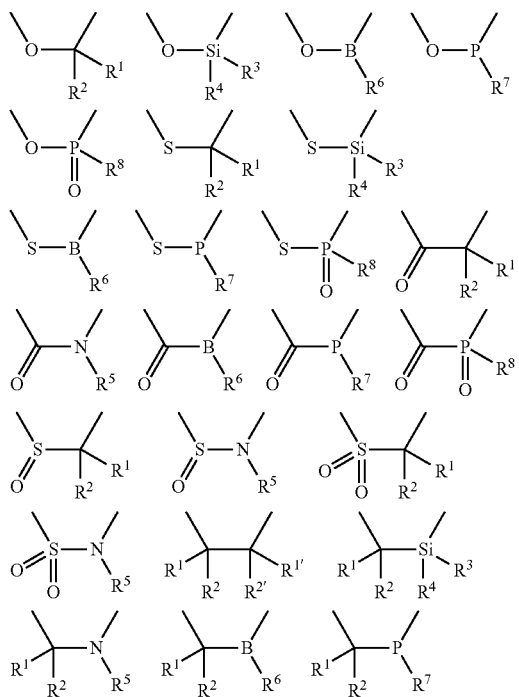

Among them, the groups of formulas (27) and (28) are preferable, in view of the compound stability, and the groups of formula (28) are more preferable.

Examples of the repeating unit represented by formula (1) include, specifically, the groups represented by following formulas (29)-(33), and the groups having a substituent further on the aromatic hydrocarbon group, or heterocyclic ring thereof.

Among them, the groups represented by formula (29) to a formula (32), and the group having a substituent further on the aromatic hydrocarbon group, or heterocyclic ring thereof, are preferable, and the group represented by formula (29) and the group having a substituent further on the aromatic hydrocarbon group, or heterocyclic ring thereof are more preferable.

Examples of the substituents include a halogen atom, alkyl group, alkyloxy group, alkylthio group, aryl group, aryloxy group, arylthio group, arylalkyl group, arylalkyloxy group, arylalkylthio group, acyl group, acyloxy group, amide group, acidimide group, imine residue, amino group, substituted amino group, substituted silyl group, substituted silyloxy group, substituted silylthio group, substituted silylamino group, a monovalent heterocyclic group, arylalkenyl group, aryl ethynyl group, carboxyl group, or cyano group, and they may be mutually connected to form a ring.

(29)

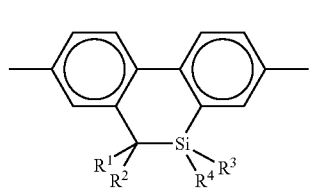

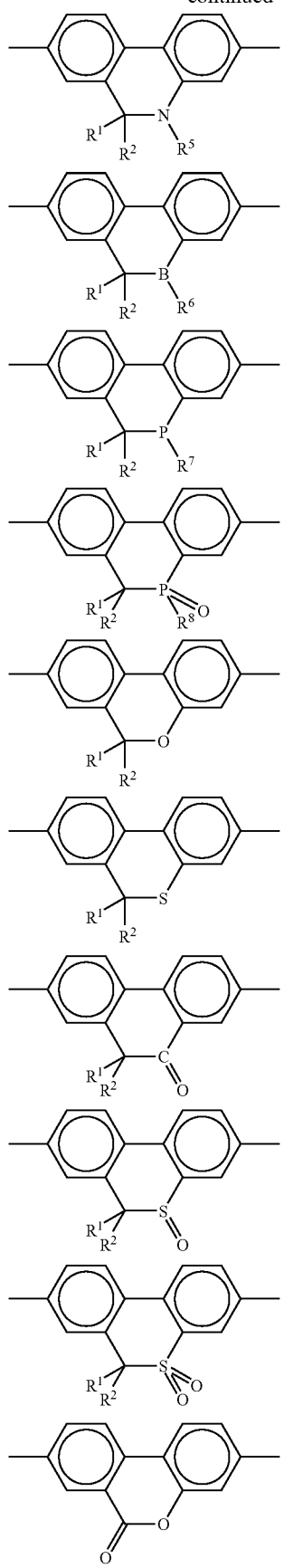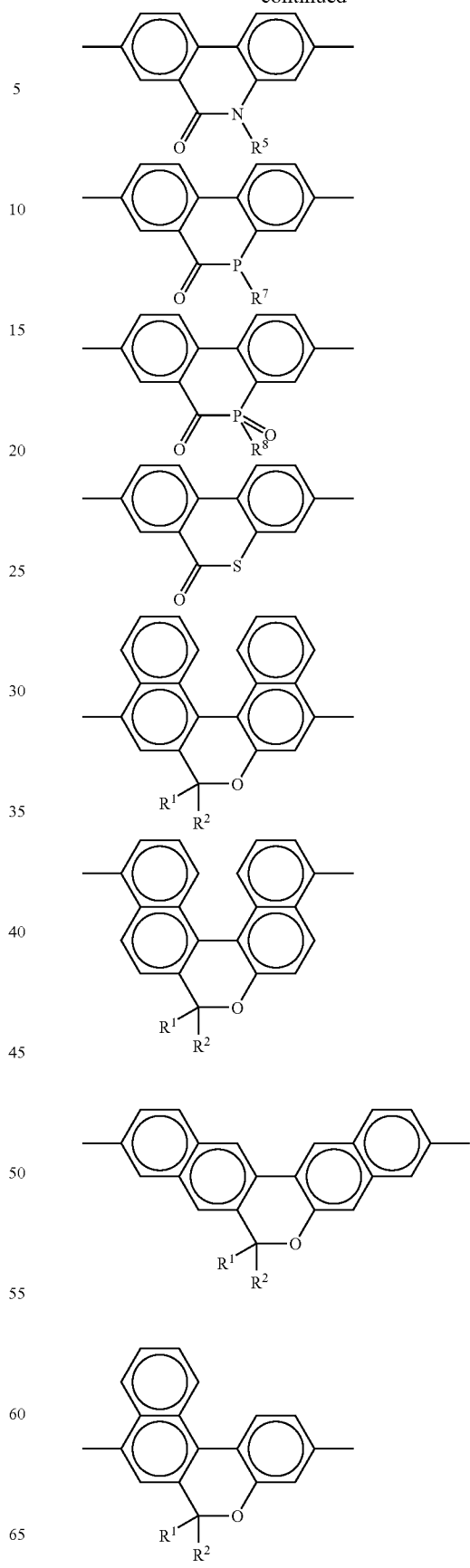

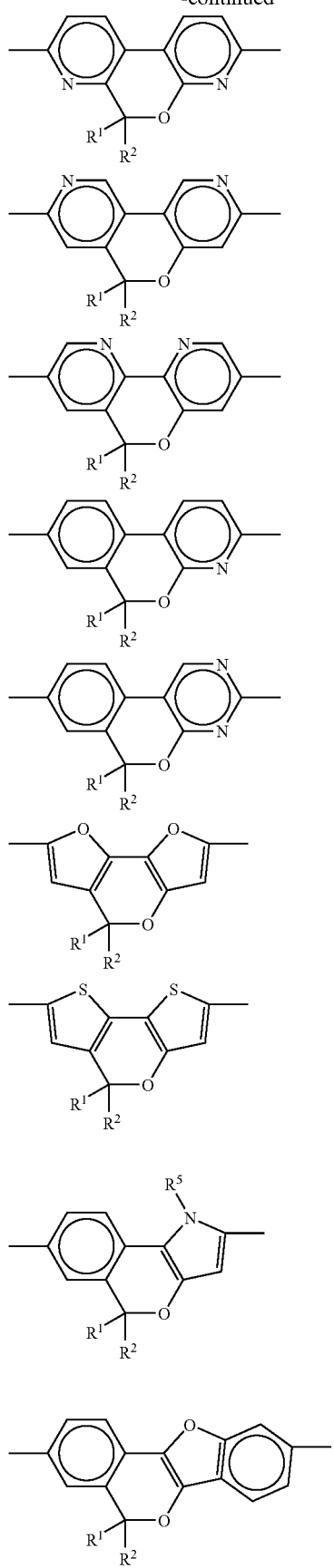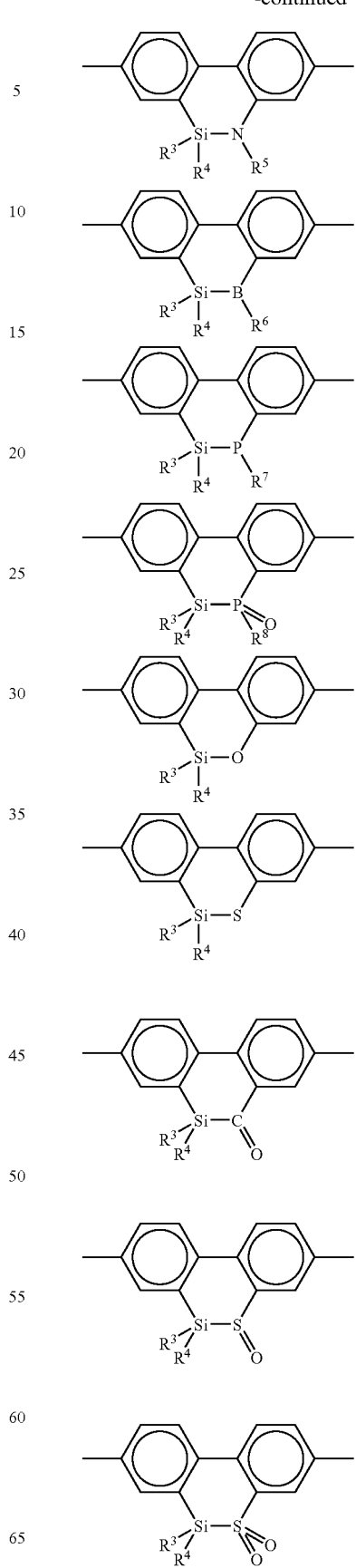

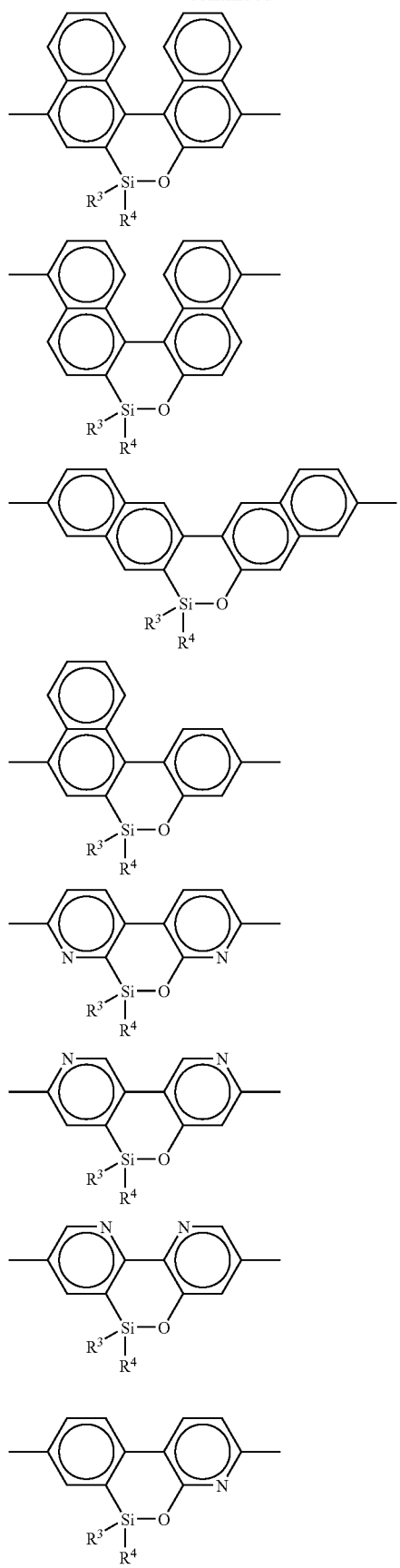
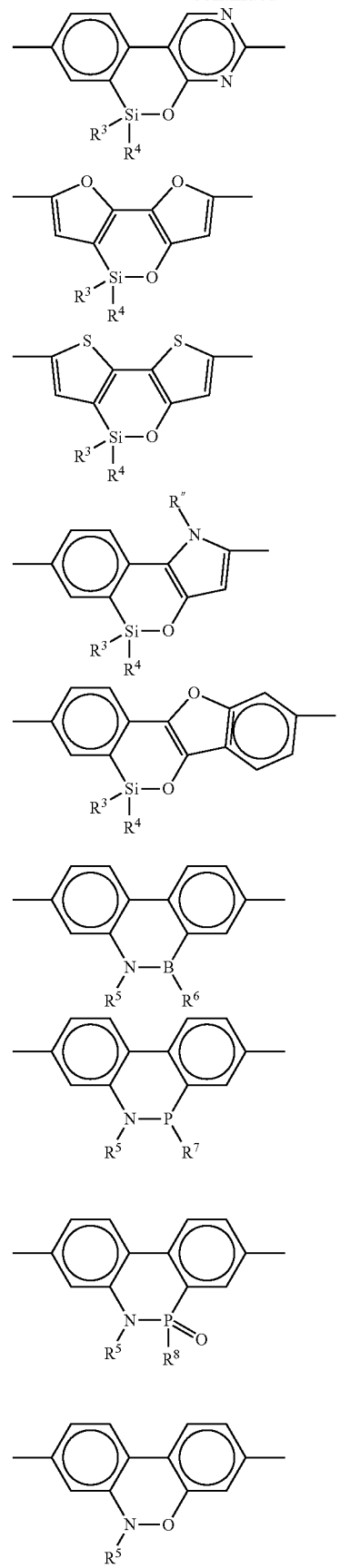
(31)

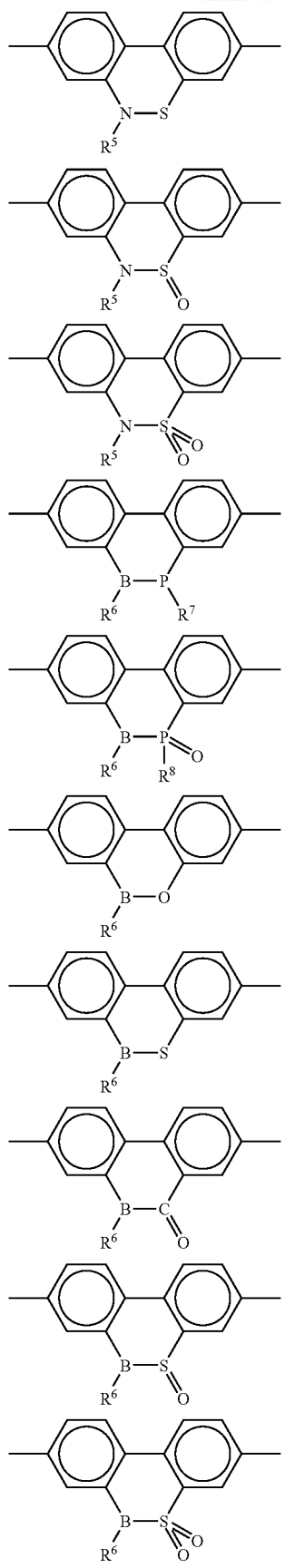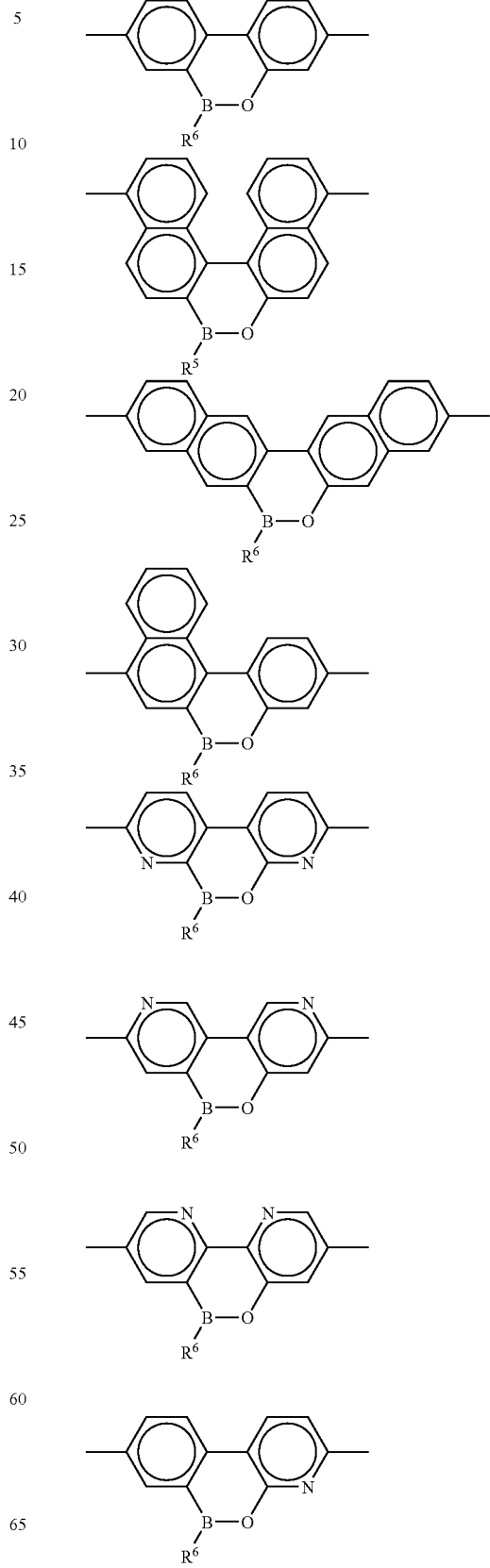

-continued
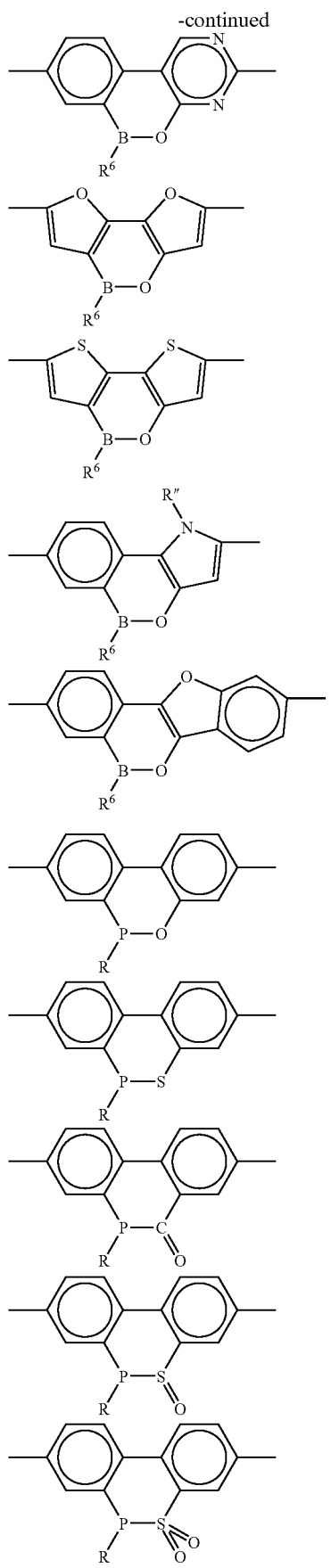
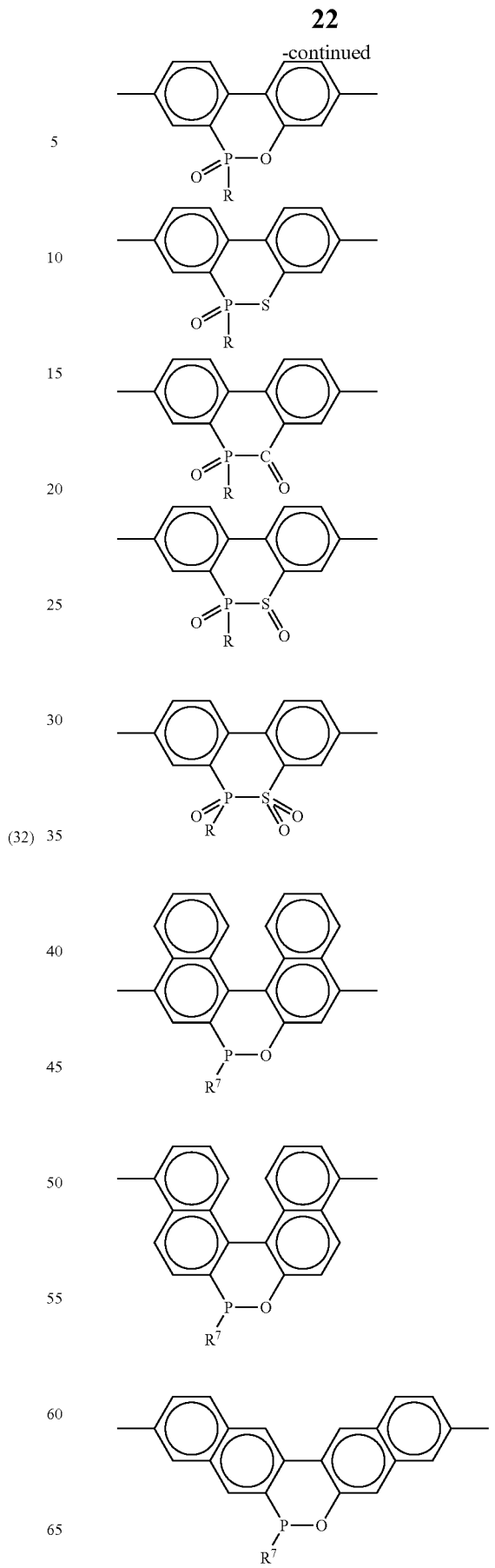
(32)

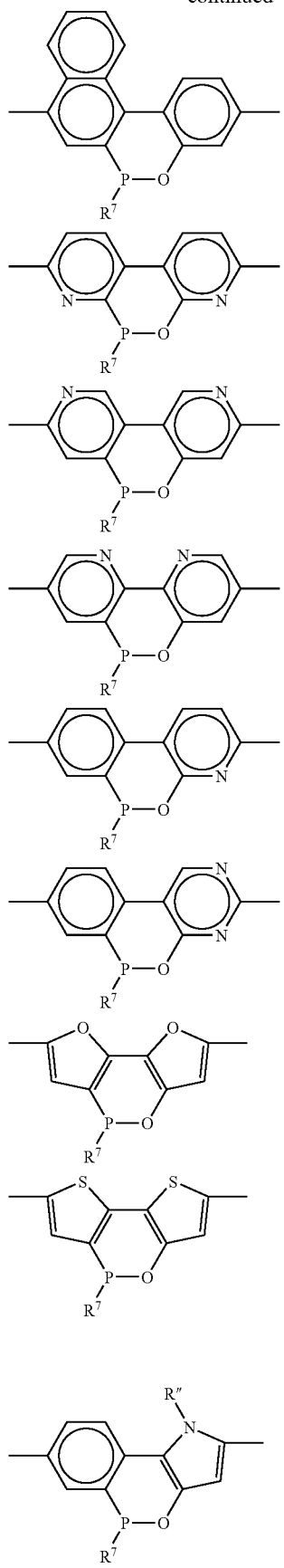
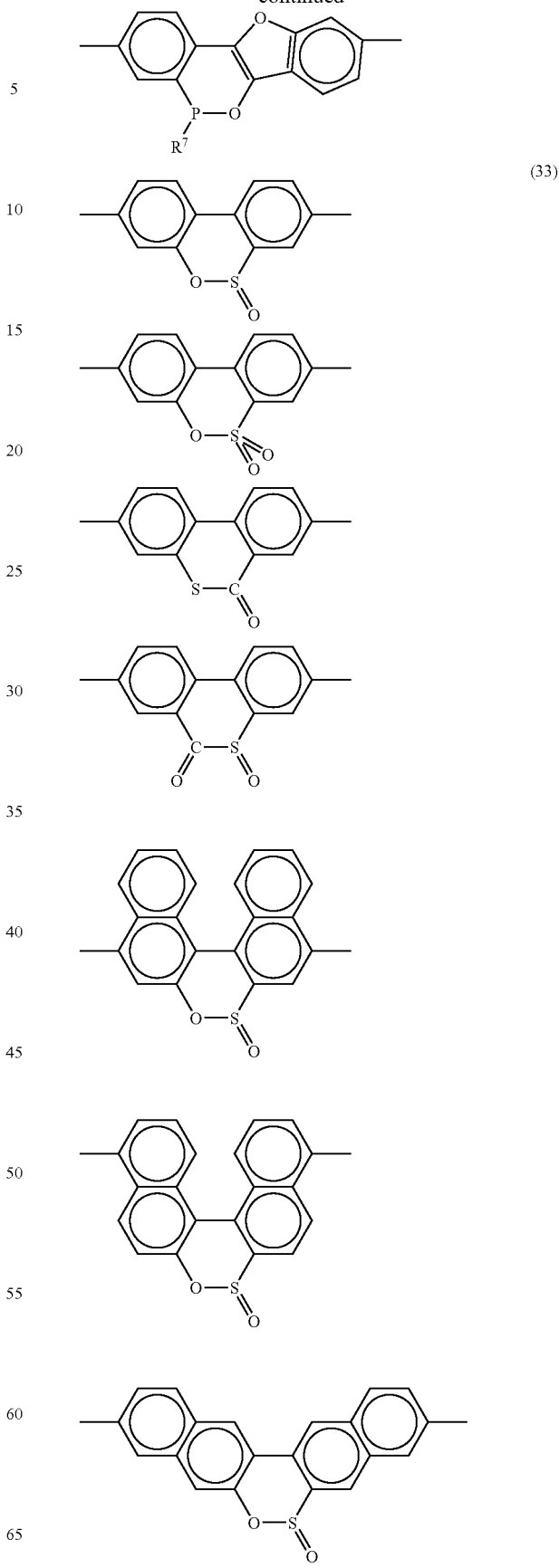
(33)

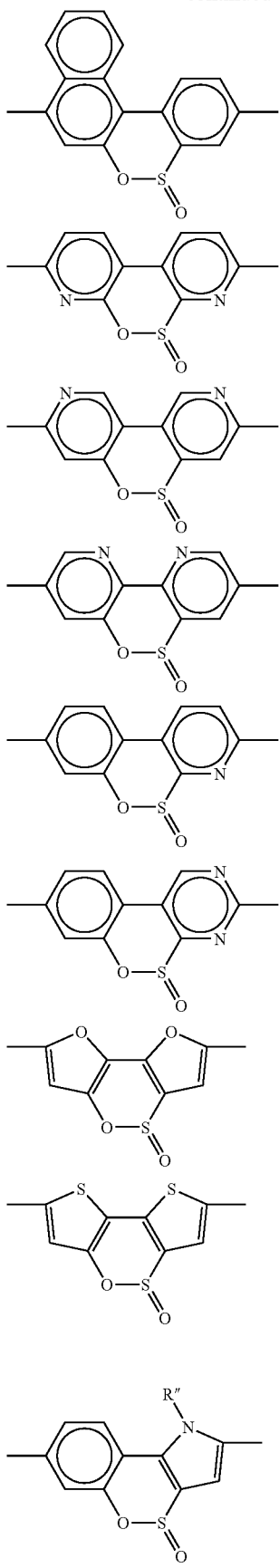

As the repeating unit represented by the above formula (1), the repeating unit represented by the below formula (3) is preferable in view of fluorescence strength, and the repeating unit represented by the below formula (4) is more preferable.

$$—Ar^1—Ar^2— \atop R^{11}—C—X^5 \atop R^{12}$$ (3)

Ar$^1$ and Ar$^2$ represent the same meaning as the above. R$^{11}$ and R$^{12}$ each independently represent a hydrogen atom, halogen atom, alkyl group, aryl group, arylalkyl group, or a monovalent heterocyclic group, and they may be connected mutually to form a ring. X$^5$ represents O, S, C(=O), S(=O), SO$_2$, Si(R$^3$)(R$^4$), N(R$^5$), B(R$^6$), P(R$^7$) or P(=O)(R$^8$). (In the formula, R$^3$, R$^4$, R$^5$, R$^6$, R$^7$, and R$^8$ represent the same meaning as the above.)

(4)

In the formula, X$^5$, R$^{11}$, and R$^{12}$ represent the same meaning as the above. R$^{13}$, R$^{14}$, R$^{15}$, R$^{16}$, R$^{17}$, and R$^{18}$ each independently represent a hydrogen atom, halogen atom, alkyl group, alkyloxy group, alkylthio group, aryl group, aryloxy group, arylthio group, arylalkyl group, arylalkyloxy group, arylalkylthio group, acyl group, acyloxy group, amide group, acidimide group, imine residue, amino group, substituted amino group, substituted silyl group, substituted silyloxy group, substituted silylthio group, substituted silylamino group, a monovalent heterocyclic group, arylalkenyl group, aryl ethynyl group, carboxyl group, or cyano group. R$^{14}$ and R$^{15}$, or R$^{16}$ and R$^{17}$ may be mutually connected to form a ring, such as an aromatic ring or a heterocyclic ring.

Especially preferable is the case where X$^5$ is an oxygen atom, in the above formula (4), in view of the production easiness of the polymer compound, and fluorescence strength thereof.

Next, the repeating unit represented by the above formula (2) is explained. Ar$^3$ and Ar$^4$ in the above formula (2) each independently represent a trivalent aromatic hydrocarbon group or a trivalent heterocyclic group. X$^3$ and X$^4$ each independently represent N, B, P, C(R$^9$) or Si(R$^{10}$). However, X$^3$ and X$^4$ are not the same.

In the formula, R$^9$ and R$^{10}$ each independently represent a hydrogen atom, halogen atom, alkyl group, alkyloxy group, alkylthio group, aryl group, aryloxy group, arylthio group, arylalkyl group, arylalkyloxy group, arylalkylthio group, acyl group, acyloxy group, amide group, acidimide group, imine residue, amino group, substituted amino group, substituted silyl group, substituted silyloxy group, substituted silylthio group, substituted silylamino group, a monovalent heterocyclic group, arylalkenyl group, arylethynyl group, carboxyl group, or cyano group. $X^3$ of formula (2) is preferably $C(R^9)$ or $Si(R^{10})$ (in the formula, $R^9$ and $R^{10}$ each independently represent the same meaning as the above.), and more preferably, $C(R^9)$.

As $-X^3=X^4-$, groups described in the below formulas (34), (35), and (36) are exemplified.

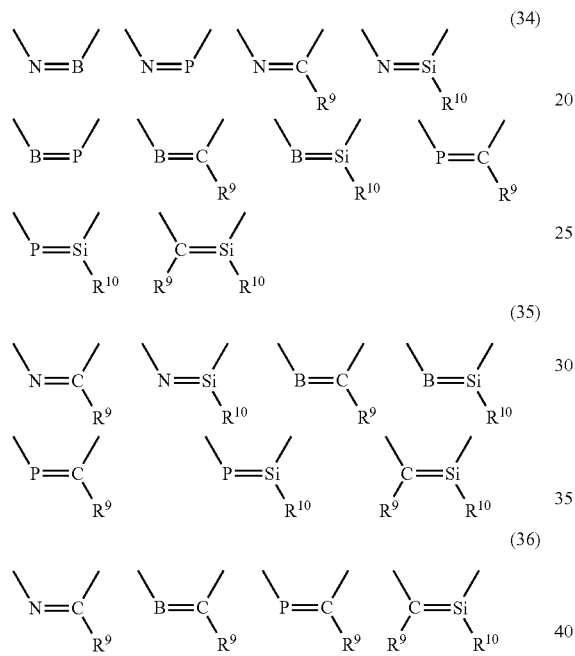

Among them, the groups of formulas (35) and (36) are preferable, in view of the stability of the compound, and the groups of formula (36) are more preferable.

As the repeating unit represented by formula (2), specifically exemplified are the groups represented by following formulas (37), (38) and (39), and the groups having a substituent further on an aromatic hydrocarbon groups, or a heterocyclic ring.

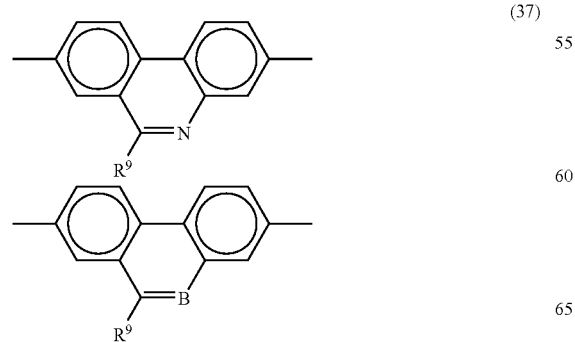

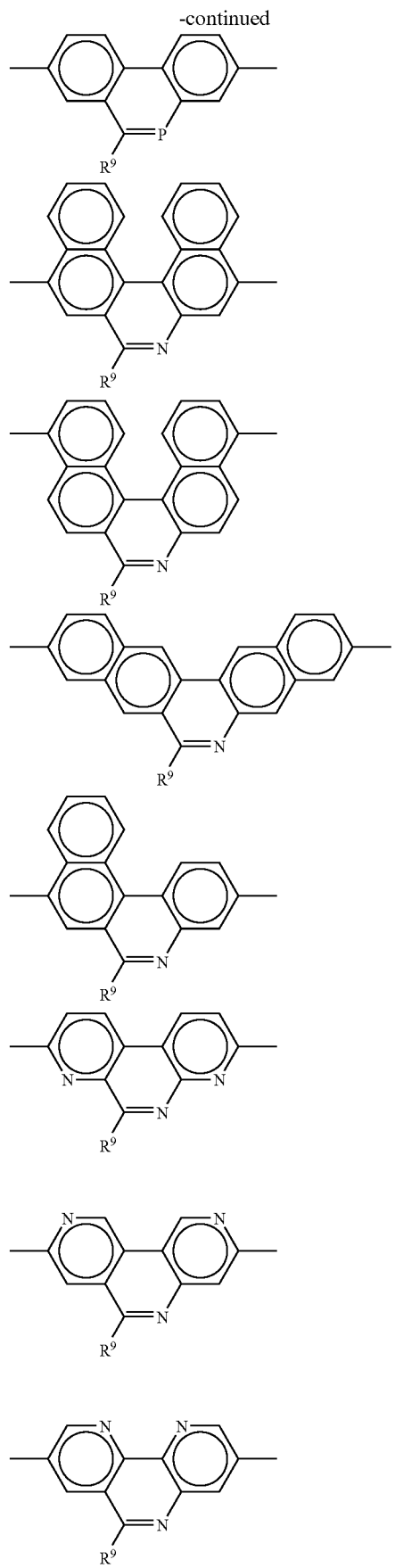

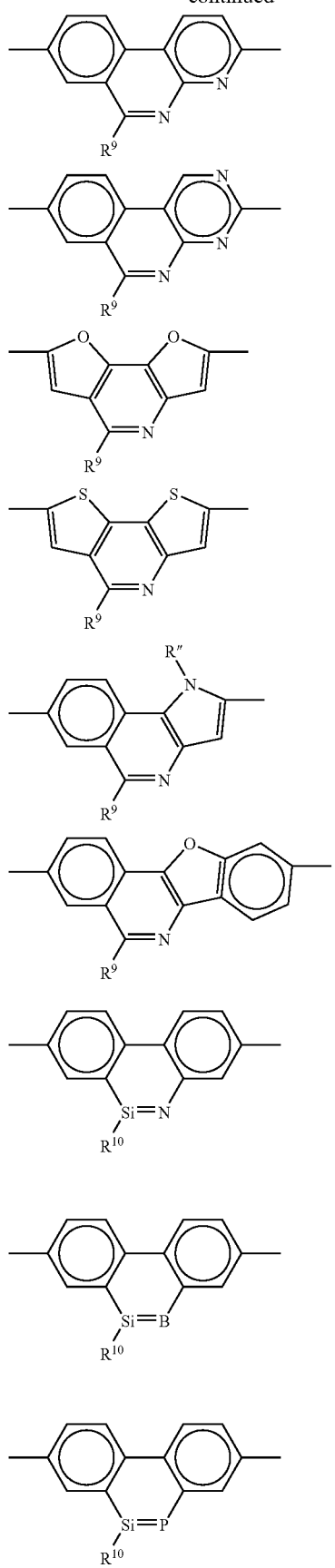
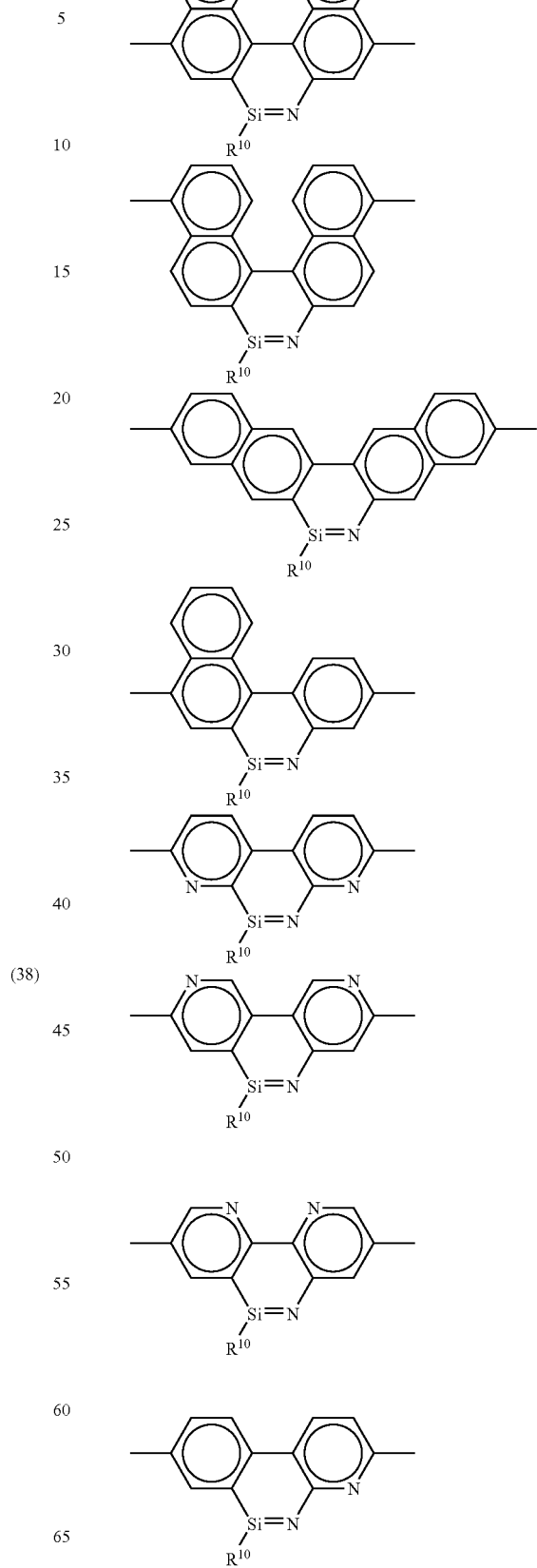

-continued
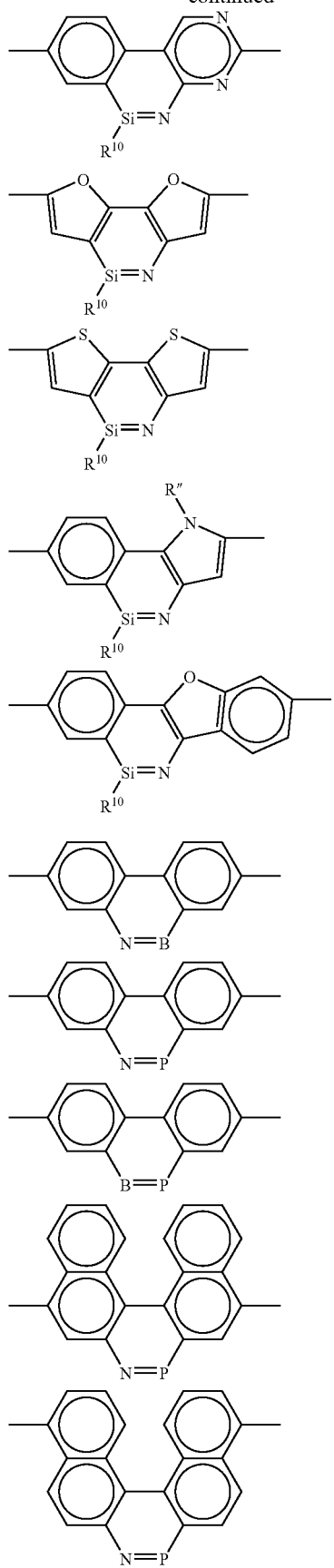
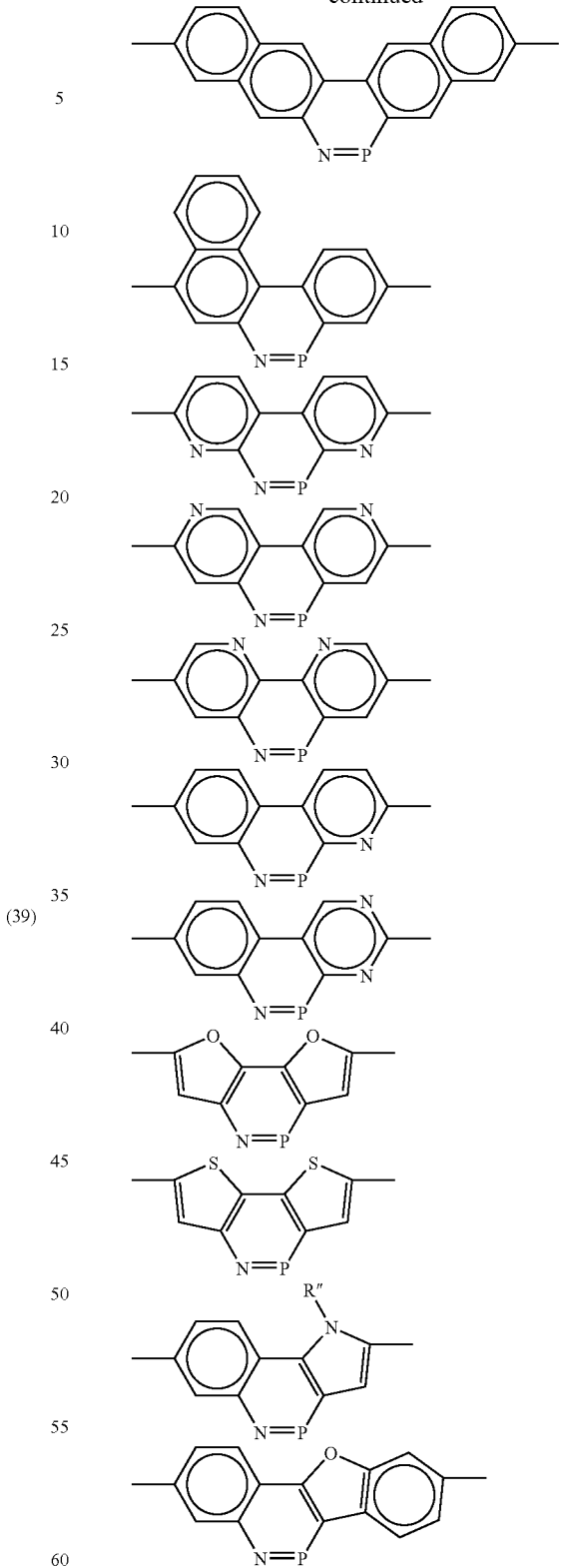
As the halogen atom, fluorine, chlorine, bromine, and iodine are exemplified.
The alkyl group may be any of linear, branched or cyclic, and may have a substituent. The number of carbon atoms is usually about 1 to 20, and specific examples thereof include methyl group, ethyl group, propyl group, i-propyl group, butyl group, and i-butyl group, t-butyl group, pentyl group, hexyl group, cyclohexyl group, heptyl group, octyl group, 2-ethylhexyl group, nonyl group, decyl group, 3,7-dimethyloctyl group, lauryl group, trifluoromethyl group, pentafluoroethyl group, perfluorobutyl group, perfluorohexyl group, perfluorooctyl group, etc.

The alkyloxy group may be any of linear, branched or cyclic, and may have a substituent. The number of carbon atoms is usually about 1 to 20, and specific examples thereof include methoxy group, ethoxy group, propyloxy group, i-propyloxy group, butoxy group, i-butoxy group, t-butoxy group, pentyloxy group, hexyloxy group, cyclohexyloxy group, heptyloxy group, octyloxy group, 2-ethylhexyloxy group, nonyloxy group, decyloxy group, 3,7-dimethyloctyloxy group, lauryloxy group, trifluoromethoxy group, pentafluoroethoxy group, perfluorobutoxy group, perfluorohexyl group, perfluoro octyl group, methoxymethyloxy group, 2-methoxyethyloxy group, etc.

The alkylthio group may be any of linear, branched or cyclic, and may have a substituent. The number of carbon atoms is usually about 1 to 20, and specific examples thereof include methylthio group, ethylthio group, propylthio group, i-propylthio group, butylthio group, i-butylthio group, t-butylthio group, pentylthio group, hexylthio group, cyclo hexylthio group, heptylthio group, octylthio group, 2-ethyl hexylthio group, nonylthio group, decylthio group, 3,7-dimethyloctylthio group, laurylthio group, trifluoro methylthio group, etc.

The aryl group may have a substituent, and the number of carbon atoms is usually about 3 to 60. Specific examples thereof include phenyl group, and $C_1$-$C_{12}$ alkoxyphenyl group (hereafter $C_1$-$C_{12}$ means the number of carbon atoms 1-12), $C_1$-$C_{12}$ alkylphenyl group, 1-naphtyl group, 2-naphtyl group, pentafluorophenyl group, pyridyl group, pyridazinyl group, pyrimidyl group, pyrazyl group, triazyl group, etc.

The aryloxy group may have a substituent on the aromatic ring, and the number of carbon atoms is usually about 3 to 60. Specific examples thereof include phenoxy group, $C_1$-$C_{12}$ alkoxy phenoxy group, $C_1$-$C_{12}$ alkylphenoxy group, 1-naphtyloxy group, 2-naphtyloxy group, pentafluorophenyloxy group, pyridyloxy group, pyridazinyloxy group, pyrimidyloxy group, pyrazyloxy group, triazyloxy group, etc.

The arylthio group may have a substituent on the aromatic ring, and the number of carbon atoms is usually about 3 to 60. Specific examples thereof include phenylthio group, $C_1$-$C_{12}$ alkoxyphenylthio group, $C_1$-$C_{12}$ alkylphenylthio group, 1-naphthylthio group, 2-naphthylthio group, pentafluoro phenylthio group, pyridylthio group, pyridazinylthio group, pyrimidylthio group, pyrazylthio group, triazylthio group, etc.

The arylalkyl group may have a substituent, and the number of carbon atoms is usually about 7 to 60. Specific examples thereof include phenyl-$C_1$-$C_{12}$ alkyl group, $C_1$-$C_{12}$ alkoxyphenyl-$C_1$-$C_{12}$ alkyl group, $C_1$-$C_{12}$ alkyl phenyl-$C_1$-$C_{12}$ alkyl group, 1-naphtyl-$C_1$-$C_{12}$ alkyl group, 2-naphtyl-$C_1$-$C_{12}$ alkyl group, etc.

The arylalkyloxy group may have a substituent, and the number of carbon atoms is usually about 7 to 60. Specific examples thereof include phenyl-$C_1$-$C_{12}$ alkoxy group, $C_1$-$C_{12}$ alkoxyphenyl-$C_1$-$C_{12}$ alkoxy group, $C_1$-$C_{12}$ alkylphenyl-$C_1$-$C_{12}$ alkoxy group, 1-naphtyl-$C_1$-$C_{12}$ alkoxy group, 2-naphtyl-$C_1$-$C_{12}$ alkoxy group, etc.

The arylalkylthio group may have a substituent and the number of carbon atoms is usually about 7 to 60. Specific examples thereof include phenyl-$C_1$-$C_{12}$ alkylthio group, $C_1$-$C_{12}$ alkoxyphenyl-$C_1$-$C_{12}$ alkylthio group, $C_1$-$C_{12}$ alkylphenyl-$C_1$-$C_{12}$ alkylthio group, 1-naphtyl-$C_1$-$C_{12}$ alkylthio group, 2-naphtyl-$C_1$-$C_{12}$ alkylthio group, etc.

The number of carbon atoms of acyl group is usually about 2 to 20, and specific examples thereof include acetyl group, propionyl group, butyryl group, isobutyryl group, pivaloyl group, benzoyl group, trifluoroacetyl group, pentafluoro benzoyl group, etc.

The number of carbon atoms of acyloxy group is usually about 2 to 20, and specific examples thereof include acetoxy group, propionyloxy group, butyryloxy group, isobutyryloxy group, pivaloyloxy group, benzoyloxy group, trifluoroacetyloxy group, pentafluorobenzoyloxy group, etc.

The number of carbon atoms of amide group is usually about 2 to 20, and specific examples thereof include formamide group, acetamide group, propioamide group, butyroamide group, benzamide group, trifluoroacetamide group, pentafluoro benzamide group, diformamide group, diacetoamide group, dipropioamide group, dibutyroamide group, dibenzamide group, ditrifluoro acetamide group, dipentafluorobenzamide group, etc.

As for the acid imide group, succin imide group, phthalic acid imide group, etc. are exemplified.

The imine residue has about 2 to 20 carbon atoms, and examples thereof include the compounds represented by the following structural formula, specifically.

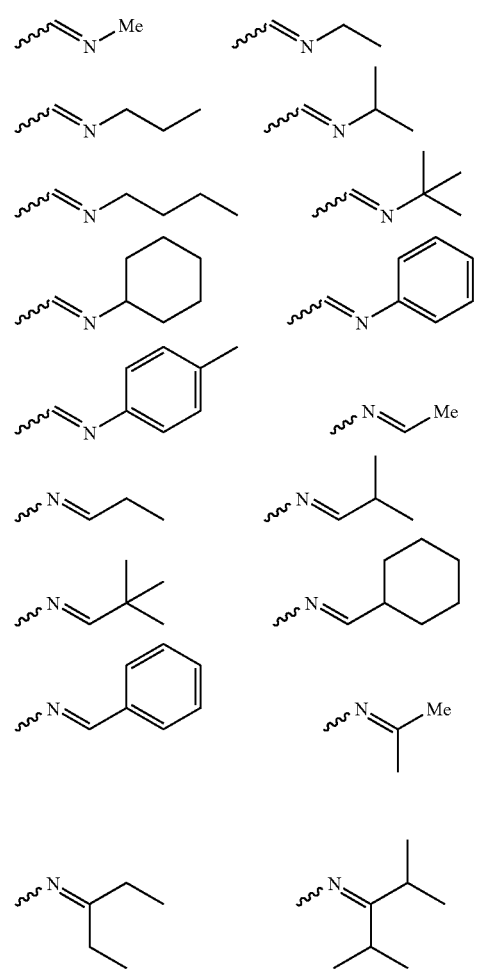

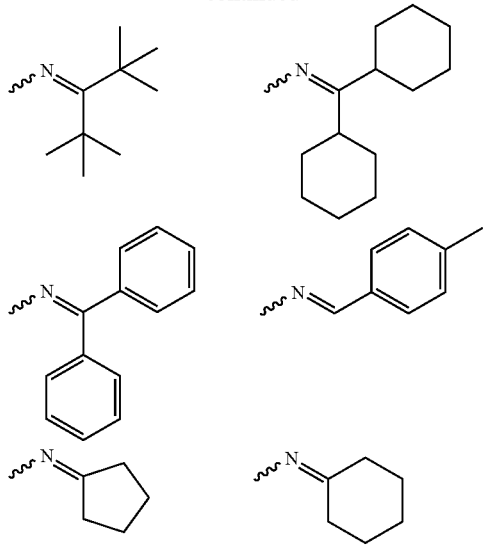

The number of carbon atoms of substituted amino group is usually about 1 to 40. specific examples thereof include methylamino group, dimethylamino group, ethylamino group, diethylamino group, propylamino group, dipropylamino group, isopropylamino group, diisopropylamino group, butylamino group, isobutylamino group, t-butylamino group, pentylamino group, hexylamino group, cyclohexylamino group, heptylamino group, octylamino group, 2-ethyl hexylamino group, nonylamino group, decylamino group, 3,7-dimethyloctylamino group, laurylamino group, cyclopentylamino group, dicyclo pentylamino group, cyclohexylamino group, dicyclohexylamino group, pyrrolidyl group, piperidyl group, ditrifluoro methylamino group, phenylamino group, diphenylamino group, $C_1$-$C_{12}$ alkoxyphenylamino group, di($C_1$-$C_{12}$ alkoxyphenyl)amino group, di($C_1$-$C_{12}$ alkylphenyl)amino group, 1-naphtylamino group, 2-naphtylamino group, pentafluorophenylamino group, pyridylamino group, pyridazinylamino group, pyrimidylamino group, pyrazylamino group, triazylamino group, phenyl-$C_1$-$C_{12}$ alkylamino group, $C_1$-$C_{12}$ alkoxyphenyl-$C_1$-$C_{12}$ alkylamino group, $C_1$-$C_{12}$ alkylphenyl-$C_1$-$C_{12}$ alkylamino group, di($C_1$-$C_{12}$ alkoxy phenyl-$C_1$-$C_{12}$ alkyl)amino group, di($C_1$-$C_{12}$ alkylphenyl-$C_1$-$C_{12}$ alkyl)amino group, 1-naphtyl-$C_1$-$C_{12}$ alkylamino group, 2-naphtyl-$C_1$-$C_{12}$ alkylamino group, etc.

Examples of the substituted silyl group include trimethyl silyl group, triethylsilyl group, tri-n-propylsilyl group, tri-i-propylsilyl group, t-butyl dimethylsilyl group, triphenylsilyl group, tri-p-xylylsilyl group, tribenzylsilyl group, diphenylmethylsilyl group, t-butyldiphenyl silyl group, dimethylphenylsilyl group, etc.

Examples of the substituted silyloxy group include trimethylsilyloxy group, triethylsilyloxy group, tri-n-propylsilyloxy group, tri-i-propylsilyloxy group, t-butyl dimethylsilyloxy group, triphenylsilyloxy group, tri-p-xylylsilyloxy group, tribenzylsilyloxy group, diphenyl methylsilyloxy group, t-butyldiphenylsilyloxy group, dimethylphenylsilyloxy group, etc.

Examples of the substituted silylthio group include trimethylsilylthio group, triethylsilylthio group, tri-n-propylsilylthio group, tri-i-propylsilylthio group, t-butyl dimethylsilylthio group, triphenylsilylthio group, tri-p-xylylsilylthio group, tri enzyl ilylthio group, diphenylmethylsilylthio group, t-butyldiphenylsilylthio group, dimethylphenylsilylthio group, etc.

Examples of the substituted silylamino group include trimethylsilylamino group, triethylsilylamino group, tri-n-propyl silylamino group, tri-i-propylsilylamino group, t-butyl dimethyl silylamino group, triphenylsilylamino group, tri-p-xylylsilylamino group, tribenzylsilylamino group, diphenylmethylsilylamino group, t-butyldiphenyl silylamino group, dimethylphenylsilylamino group, di(trimethylsilyl)amino group, di(triethylsilyl)amino group, di(tri-n-propylsilyl) amino group, di(tri-i-propyl silyl)amino group, di(t-butyl dimethyl silyl)amino group, di(triphenylsilyl)amino group, di(tri-p-xylyl silyl)amino group, di(tribenzylsilyl)amino group, di(diphenylmethyl silyl)amino group, di(t-butyldiphenylsilyl)amino group, di(dimethylphenylsilyl)amino group, etc.

The monovalent heterocyclic group means an atomic group in which one hydrogen atom is removed from a heterocyclic compound, and the number of carbon atoms is usually about 4 to 60, and specific examples thereof include thienyl group, $C_1$-$C_{12}$ alkylthienyl group, pyroryl group, furyl group, pyridyl group, $C_1$-$C_{12}$ alkylpyridyl group, imidazolyl group, pyrazolyl group, triazolyl group, oxazolyl group, thiazole group, thiadiazole group, etc.

Moreover, examples of the monovalent heterocyclic group in the present invention also include heteroaryloxy group and heteroarylmercapto group.

The heteroaryloxy group means an atomic group in which one hydrogen atom is replaced by an oxygen atom in a heterocyclic compound, and the number of carbon atoms thereof is usually about 4 to 60. Specific examples thereof include thienyloxy group, $C_1$-$C_{12}$ alkylthienyloxy group, pyroryloxy group, furyloxy group, pyridyloxy group, $C_1$-$C_{12}$ alkylpyridyloxy group, imidazolyloxy group, pyrazolyloxy group, triazolyloxy group, oxazolyloxy group, thiazoleoxy group, thiadiazoleoxy group, etc.

The heteroarylmercapto group is an atomic group in which one hydrogen atom is replaced by a sulfur atom in a heterocyclic compound, and the number of carbon atoms is usually about 4 to 60. Specific examples thereof include thienylmercapto group, $C_1$-$C_{12}$ alkylthienylmercapto group, pyrorylmercapto group, furylmercapto group, pyridylmercapto group, $C_1$-$C_{12}$ alkyl pyridylmercapto group, imidazolylmercapto group, pyrazolyl mercapto group, triazolylmercapto group, oxazolylmercapto group, thiazolemercapto group, thiadiazole mercapto group, etc.

Instead of the carboxyl group (—COOH), groups in which the hydrogen atom of the carboxyl group is replaced by other groups can also be exemplified, as such, alkyloxy carbonyl group, aryloxy carbonyl group, arylalkyloxy carbonyl group, or hetero aryloxy carbonyl group.

As the alkyloxy group in alkyloxy carbonyl group, the groups of the above-mentioned alkyloxy groups are exemplified. As the aryloxy group in aryloxy carbonyl group, the groups of the above-mentioned aryloxy groups are exemplified. As the arylalkyloxy group in arylalkyloxy carbonyl group, the groups of the above-mentioned arylalkyloxy groups are exemplified. As the heteroaryloxy group in heteroaryloxy carbonyl group, the groups of the above-mentioned heteroaryloxy groups are exemplified.

As the aryl groups in arylalkenyl group and arylethynyl group, the same group as those for the above-mentioned aryl group are exemplified.

The polymer compound of the present invention may contain two or more kinds of repeating units represented by formula (1) and formula (2), respectively.

The polymer compound of the present invention may contain repeating units other than the repeating unit represented by formula (1) and formula (2) within a range of not injuring the fluorescence characteristic or the charge transportating characteristic. Moreover, the total amount of the repeating unit represented by formula (1) and formula (2) is preferably 10% by mole or more based on all repeating units, more preferably 50% by mole or more, and further preferably 80% by mole or more.

As for the polymer compound of the present invention, it is preferable that the repeating unit represented by the below formula (5), formula (6), formula (7), or formula (8) is contained in addition to the repeating unit represented by formulas (1) and (2), in view of improving fluorescence strength.

—Ar⁵— (5)

—Ar⁵—X⁶—(Ar⁶—X⁷)a-Ar⁷— (6)

—Ar⁵—X⁷— (7)

—X⁷— (8)

In the formula, Ar⁵, Ar⁶, and Ar⁷ each independently represent an arylene group, divalent heterocyclic group, or divalent group having metal complex structure. X⁶ represents —C≡C—, —N(R²¹)— or —(SiR²²R²³)$_y$—. X⁷ represents —CR¹⁹=CR²⁰—, —C≡C—, —N(R²¹)— or —(SiR²²R²³)$_y$—. R¹⁹ and R²⁰ each independently represent a hydrogen atom, alkyl group, aryl group, monovalent heterocyclic group, carboxyl group or cyano group. R²¹, R²² and R²³ each independently represent a hydrogen atom, alkyl group, aryl group, monovalent heterocyclic group or arylalkyl group. a represents an integer of 0-1. b represents an integer of 1-12.

Here, the arylene group is an atomic group in which two hydrogen atoms are removed from an aromatic hydrocarbon, and the number of carbon atoms which constitutes the ring is usually about 6 to 60, and preferably 6 to 20. Here, as the aromatic hydrocarbon, also contained are those having a condensed ring, those having two or more independent benzene ring or condensed ring are connected through a direct bond or a vinylene group, etc.

As the arylene group, exemplified are: phenylene group (for example, following formulas 1-3), naphthalenediyl group (following formulas 4-13), anthracenediyl group (following formulas 14-19), biphenyl-diyl group (following formulas 20-25), fluorene-diyl group (following formulas 36-38), terphenyl-diyl group (following formulas 26-28), and stilbene-diyl (following formulas A-D), distilbene-diyl (following formulas E, F), condensed-ring compound group (following formulas 29-38) etc. Among them, phenylene group, biphenylene group, fluorene-diyl group, and stilbene group are preferable.

1

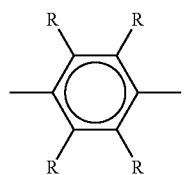

2

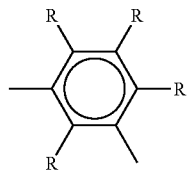

3

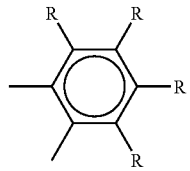

4

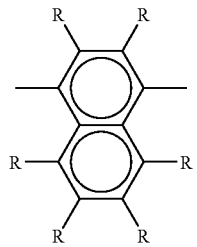

5

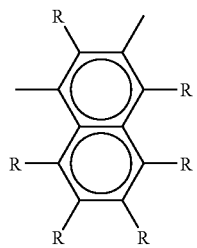

6

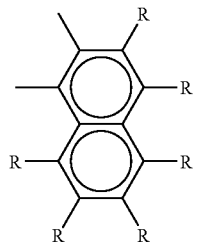

7

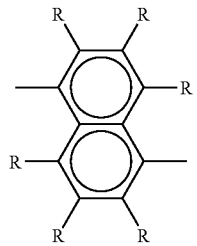

8

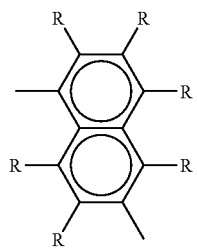

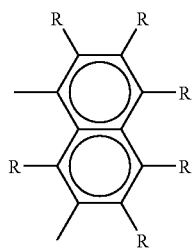
9
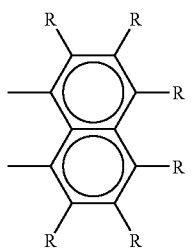
10
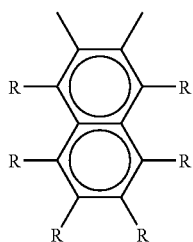
11
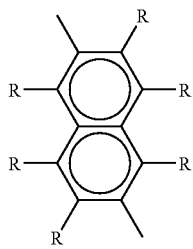
12
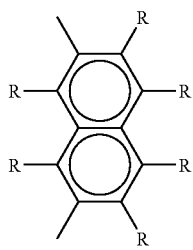
13
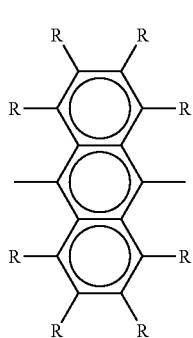
14
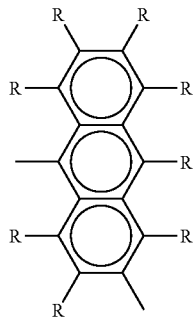
15
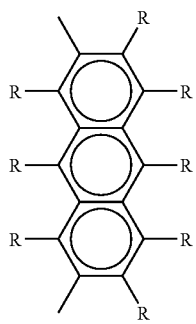
16
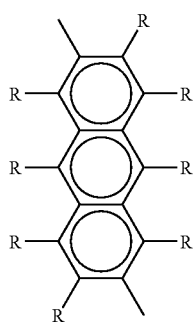
17
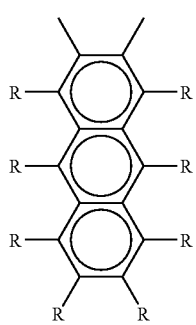
18
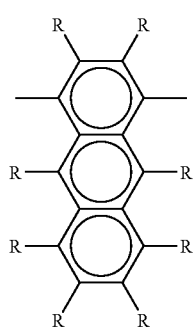
19

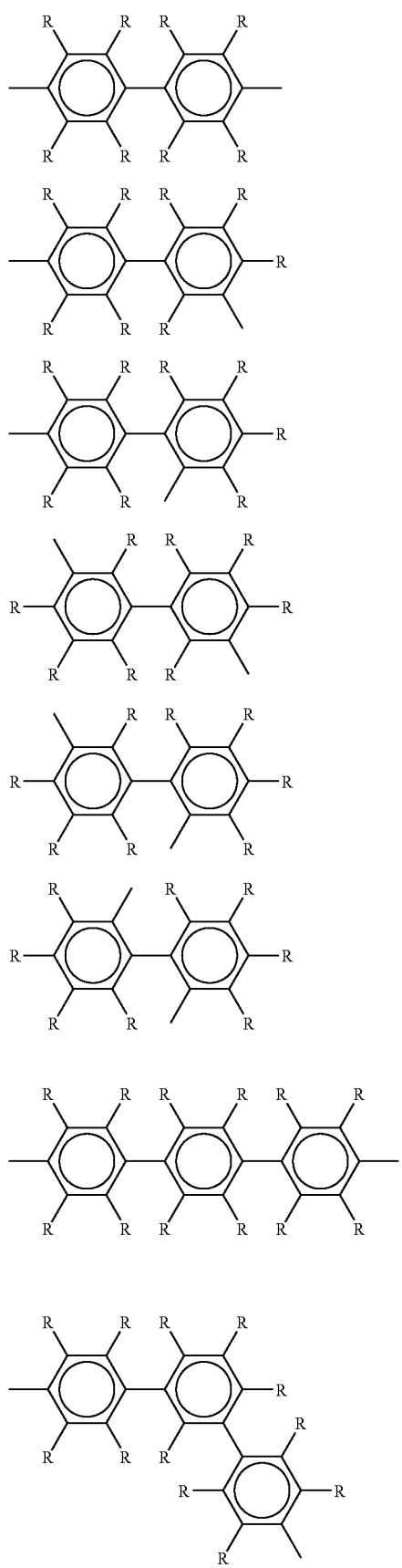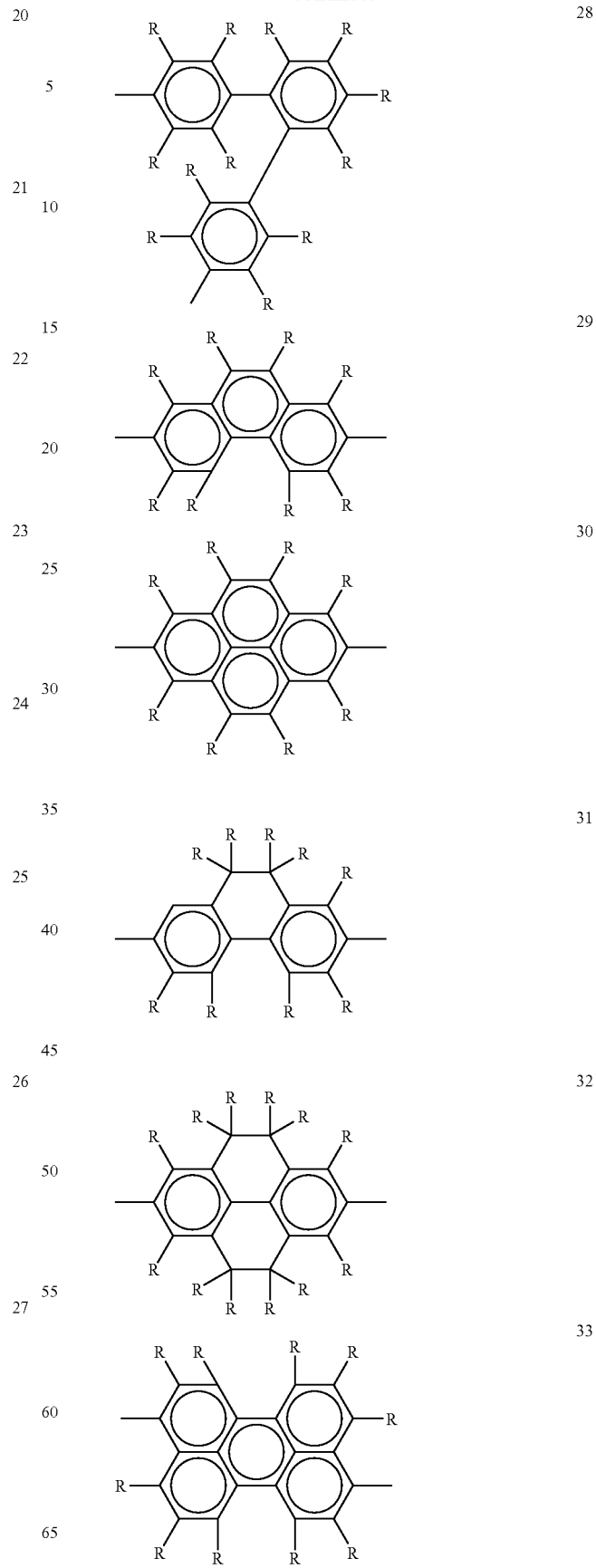

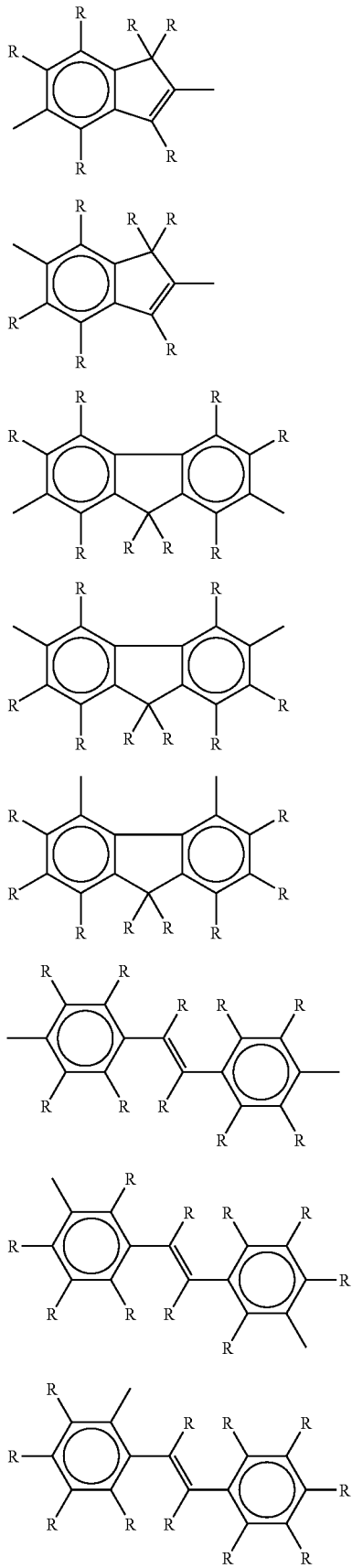

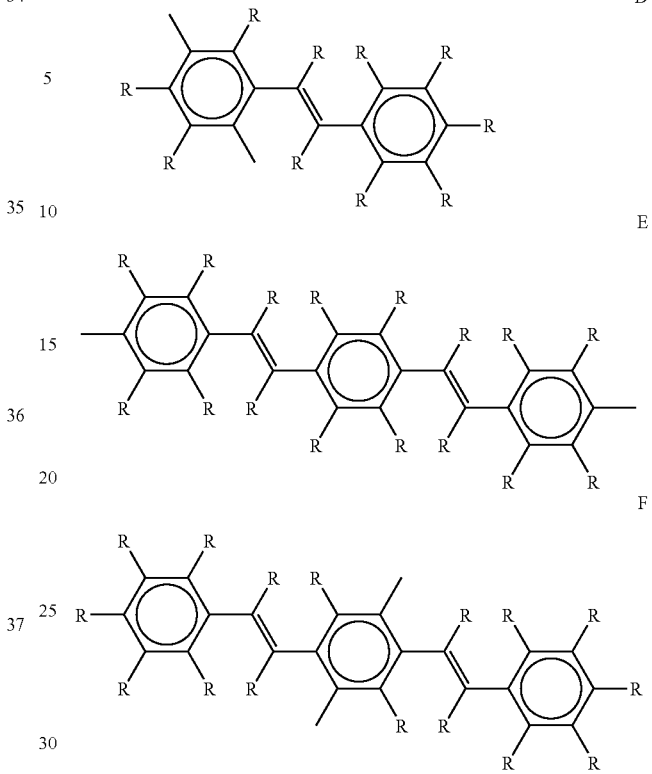

In the present invention, the divalent heterocyclic group means an atomic group in which two hydrogen atoms are removed from a heterocyclic compound, and the number of carbon atoms constituting a ring is usually about 3 to 60.

The heterocyclic compound means an organic compound having a cyclic structure in which at least one heteroatom such as oxygen, sulfur, nitrogen, phosphorus, boron, arsenic, etc. is contained in the cyclic structure as the element other than carbon atoms.

Examples of the divalent heterocyclic group include followings.

Divalent heterocyclic groups containing nitrogen as a hetero atom; pyridine-diyl group (following formulas 39-44), diaza phenylene group (following formulas 45-48), quinolinediyl group (following formulas 49-63), quinoxalinediyl group (following formulas 64-68), acridinediyl group (following formulas 69-72), bipyridyldiyl group (following formulas 73-75), phenanthrolinediyl group (following formulas 76-78), etc.

Groups having a fluorene structure containing silicon, nitrogen, sulfur, selenium, etc. as a hetero atom (following formulas 79-93).

5 membered heterocyclic groups containing silicon, nitrogen, sulfur, selenium, etc. as a hetero atom: (following formulas 94-98).

Condensed 5 membered heterocyclic groups containing silicon, nitrogen, sulfur, selenium, etc. as a hetero atom: (following formulas 99-108.

5 membered heterocyclic groups containing silicon, nitrogen, sulfur, selenium, etc. as a hetero atom, which are connected at the a position of the hetero atom to form a dimer or an oligomer (following formulas 109-113).

5 membered ring heterocyclic groups containing silicon, nitrogen, oxygen, sulfur, selenium, as a hetero atom is connected with a phenyl group at the a position of the hetero atom (following formulas 113-119); and
5 membered ring condensed heterocyclic groups which contains silicon, nitrogen, oxygen, sulfur, selenium, as a hetero atom, and has a substituent of phenyl group, furyl group or thienyl group (following formulas 120-125).
39
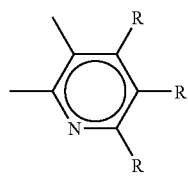
40
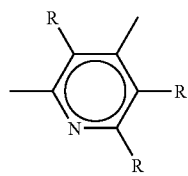
41
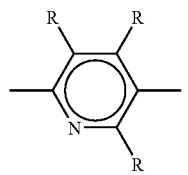
42
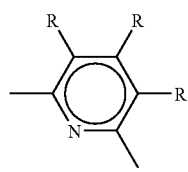
43
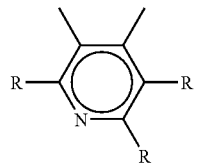
44
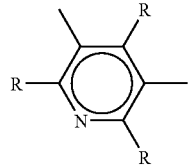
45
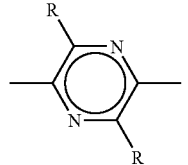
46
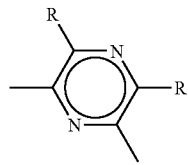
-continued
47
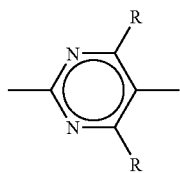
48
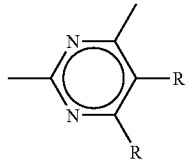
49
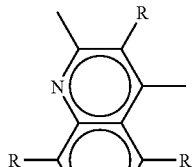
50
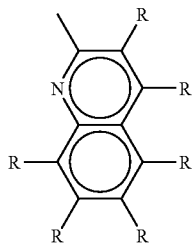
51
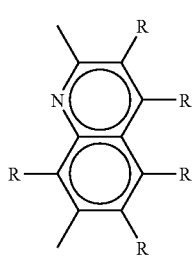
52
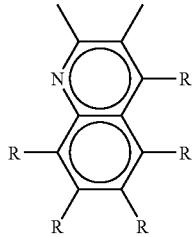
53
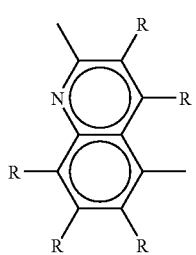

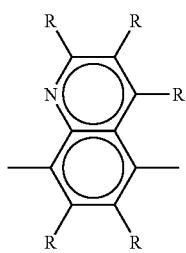
54
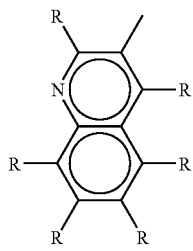
55
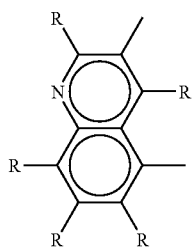
56
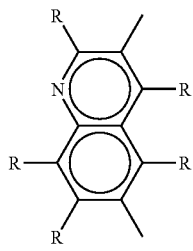
57
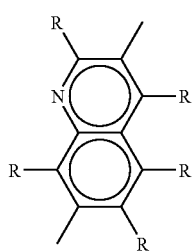
58
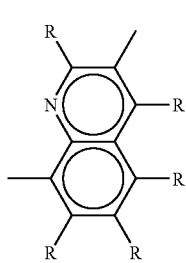
59
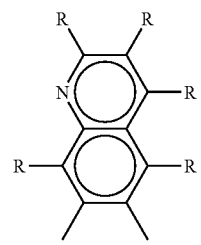
60
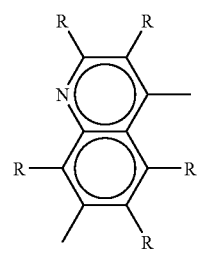
61
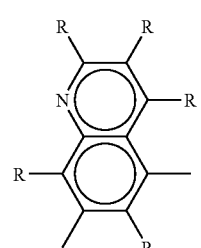
62
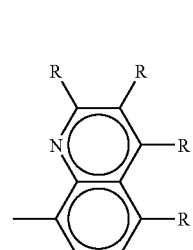
63
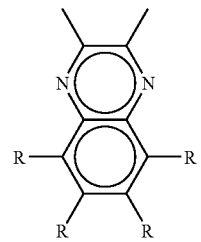
64
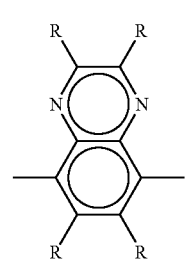
65

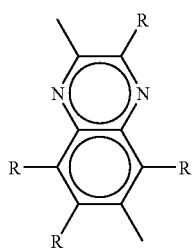
66
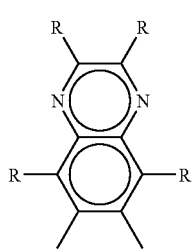
67
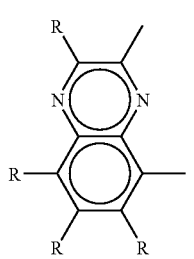
68
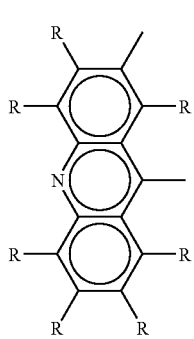
69
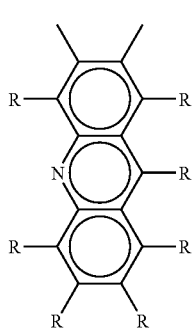
70
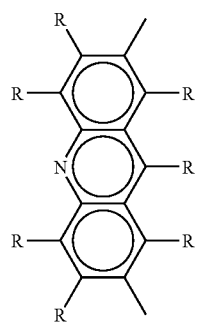
71
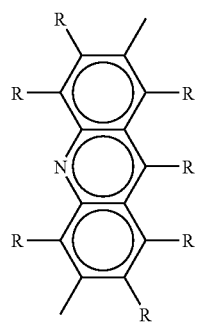
72
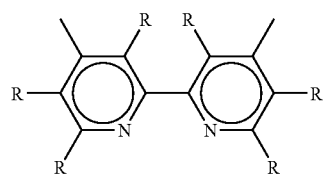
73
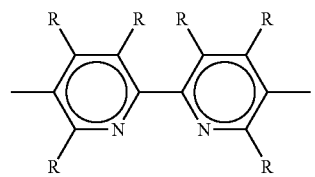
74
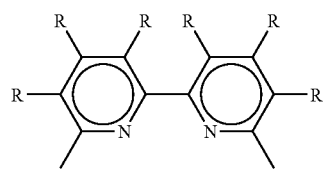
75
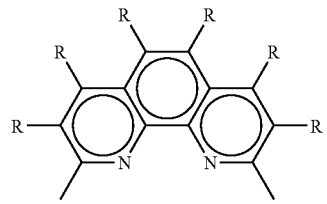
76
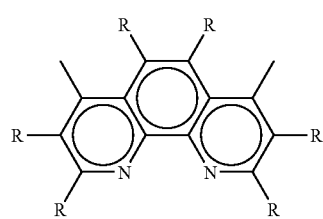
77

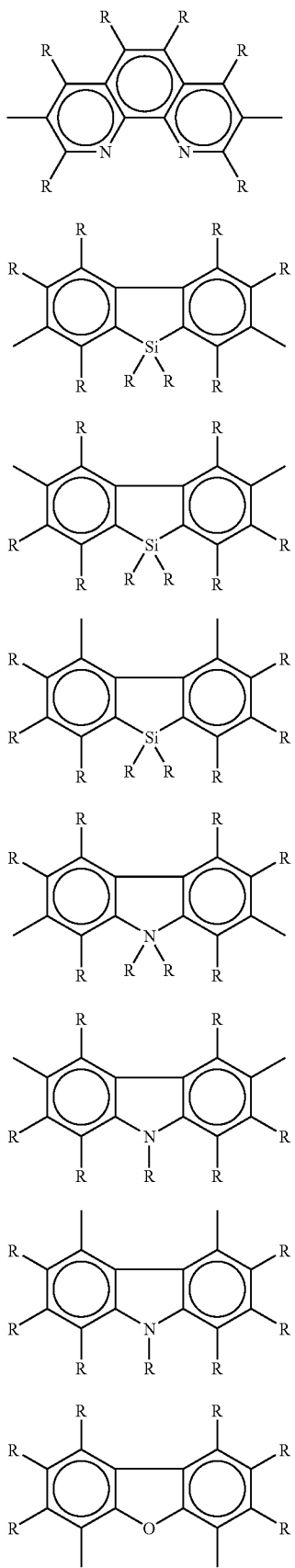
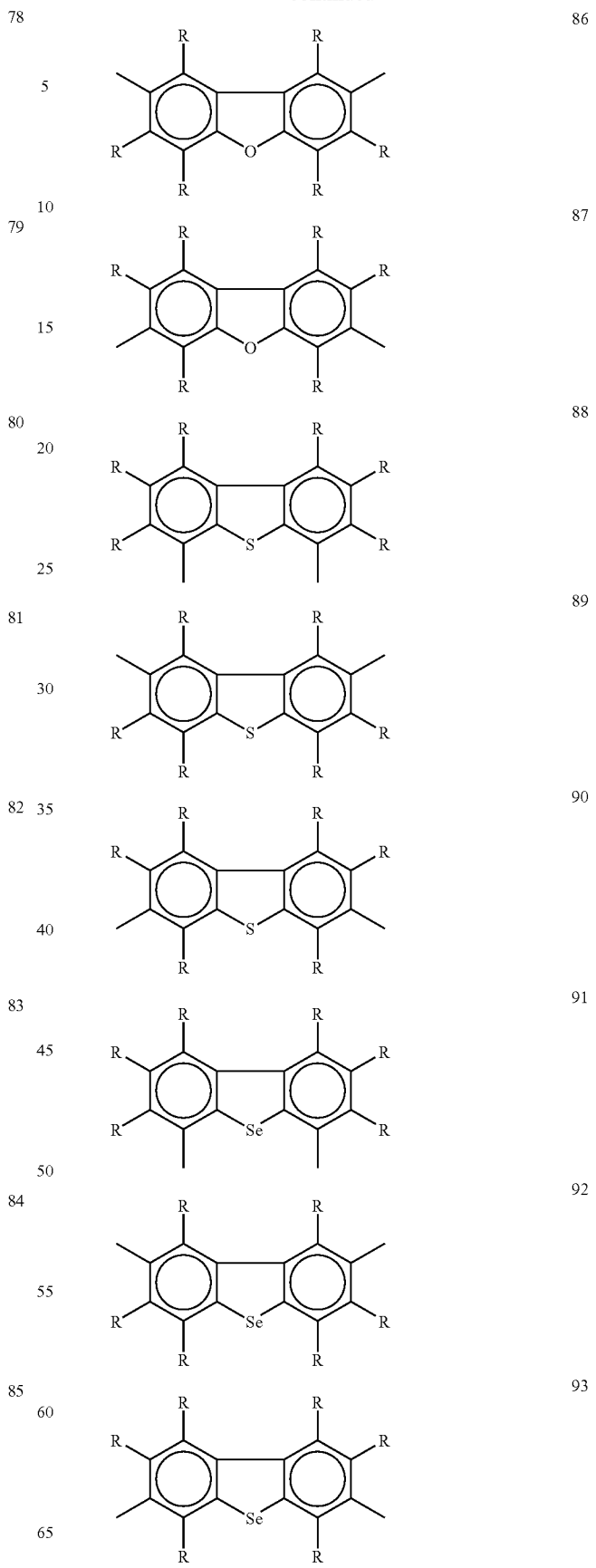

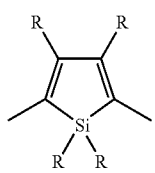
94
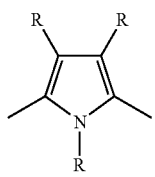
95
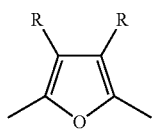
96
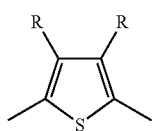
97
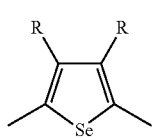
98
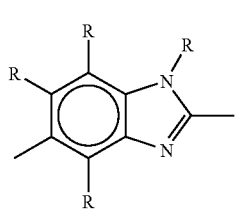
99
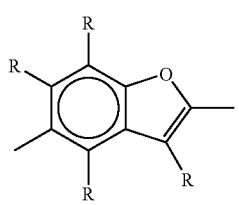
100
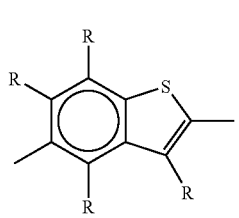
101
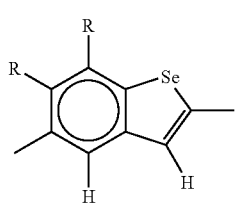
102
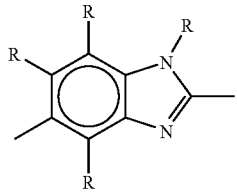
103
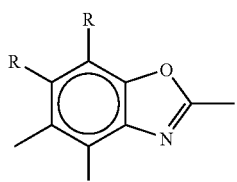
104
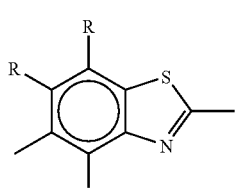
105
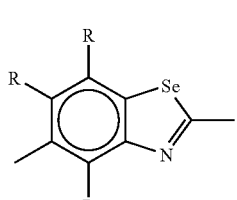
106
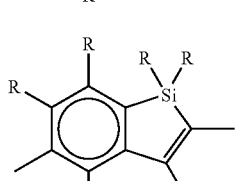
107
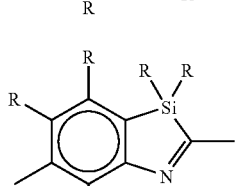
108
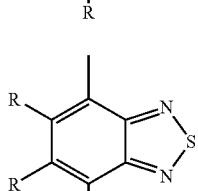
109
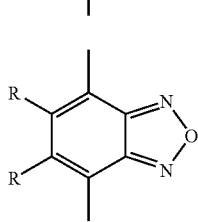
110

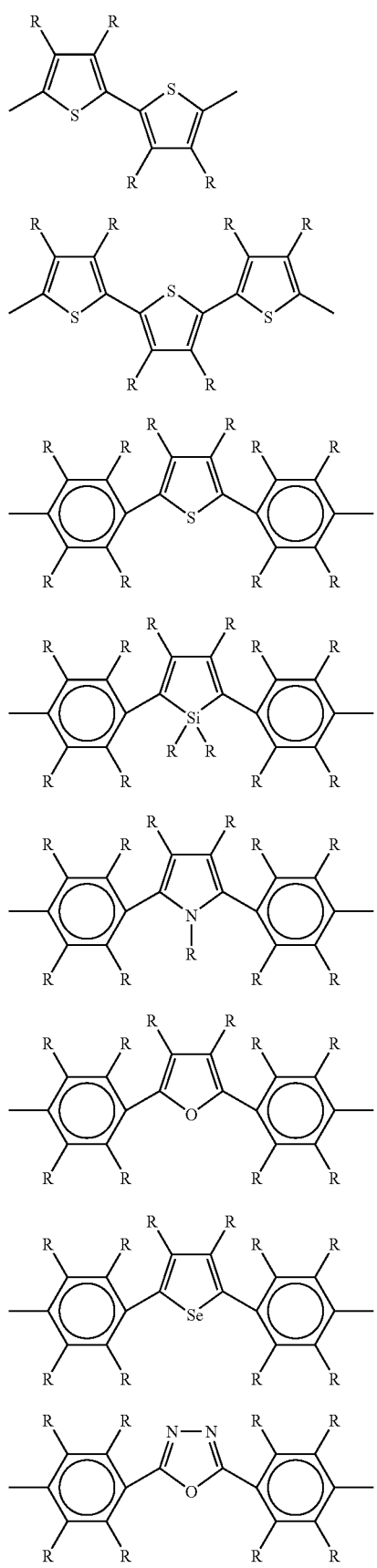
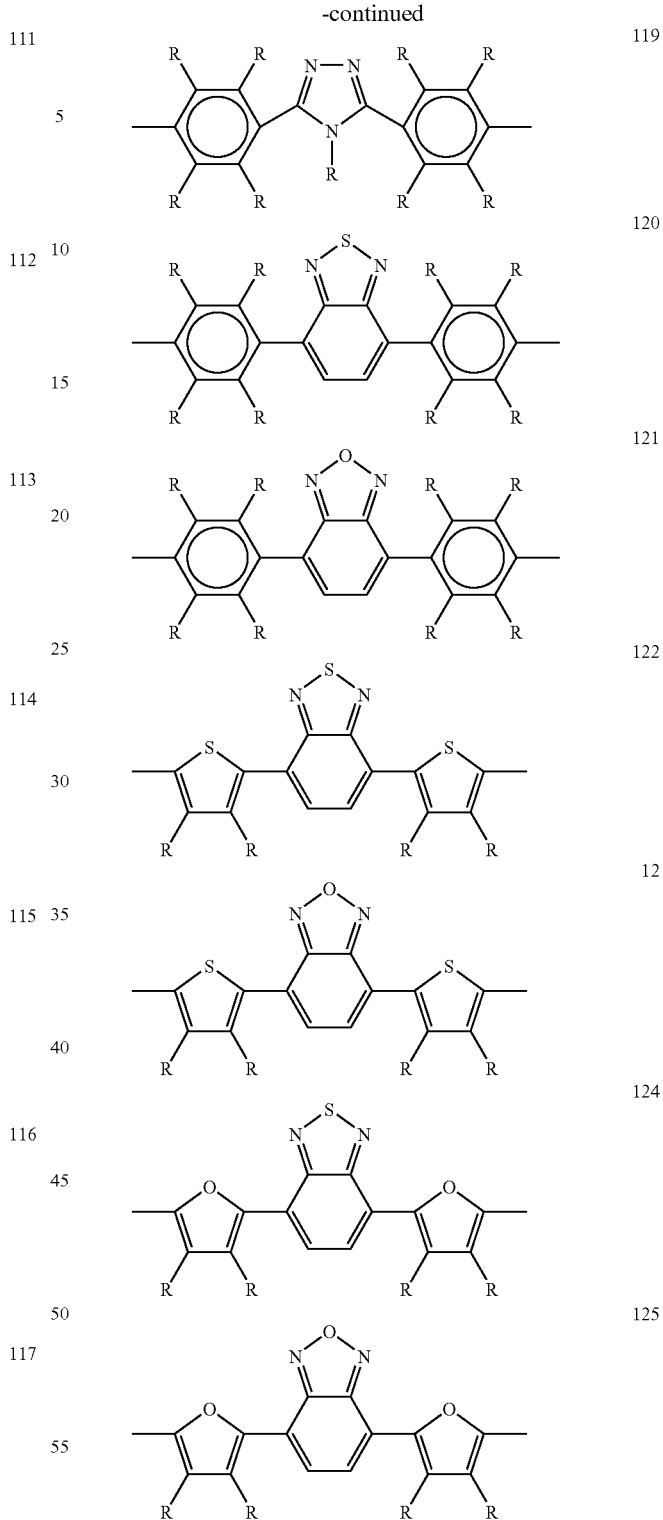

In the present invention, the divalent group having metal complex structure is a divalent group in which two hydrogen atoms are removed from the organic ligand of a metal complex having an organic ligand. This organic ligand has the number of carbon atoms of usually about 4 to 60, and examples thereof include 8-quinolinol and its derivative, benzoquinolinol and its derivative, 2-phenyl-pyridine and its derivative, 2-phenyl-benzothiazole and its derivative, 2-phenyl-benzoxazole and its derivative, porphyrin, its derivative, etc.

As the central metal of the complex, aluminum, zinc, beryllium, iridium, platinum, gold, europium, terbium, etc. are exemplified. As the metal complex having an organic ligand, exemplified are: low molecular weight fluorescence materials, metal complexes known as a phosphorescence material, and triplet light emitting complexes.

As the divalent group having metal complex structure, following (126-132) are specifically exemplified.

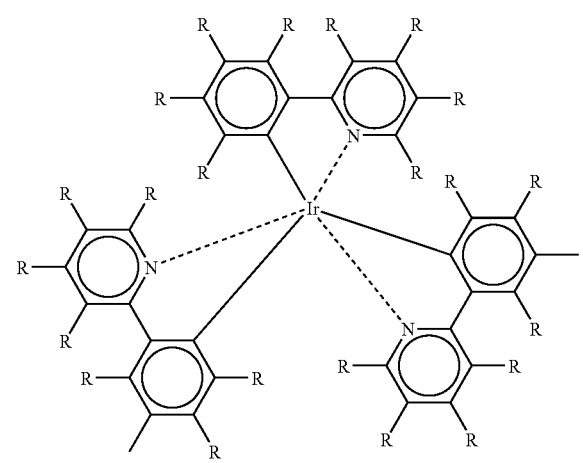

126

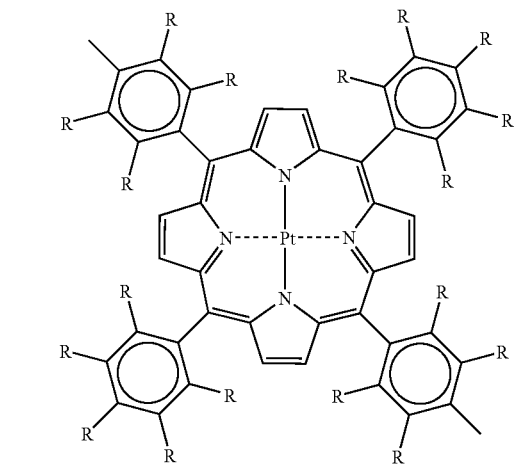

127

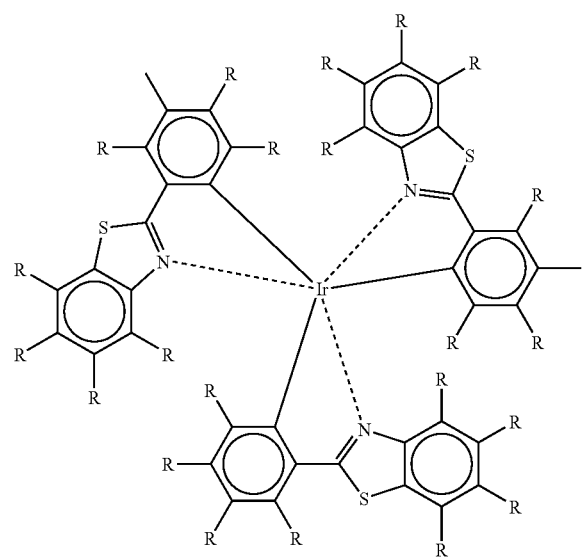

128

-continued

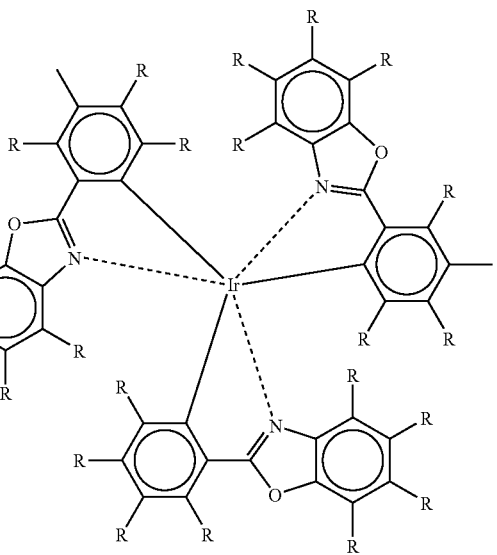

129

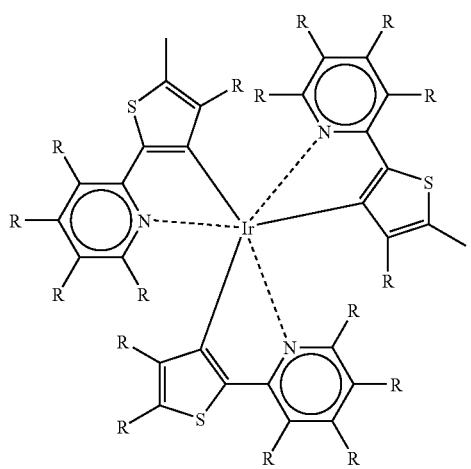

130

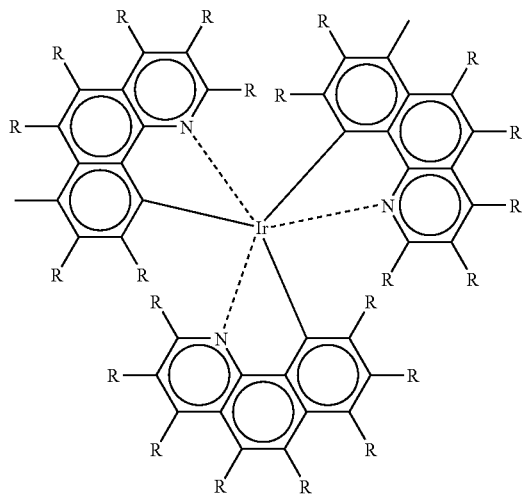

131

-continued

132

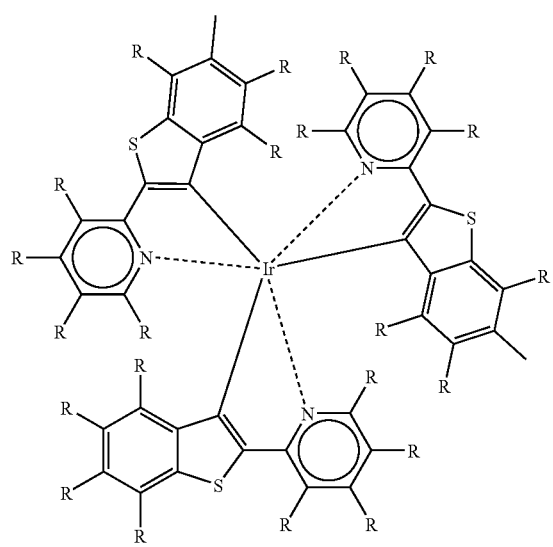

In the examples shown by the above formulas 1-132, R each independently represents a hydrogen atom, halogen atom, alkyl group, alkyloxy group, alkylthio group, aryl group, aryloxy group, arylthio group, arylalkyl group, arylalkyloxy group, arylalkylthio group, acyl group, acyloxy group, amide group, imide group, imine residue, amino group, substituted amino group, substituted silyl group, substituted silyloxy group, substituted silylthio group, substituted silylamino group, a monovalent heterocyclic group, arylalkenyl group, aryl ethynyl group, carboxyl group, or cyano group. Moreover, the carbon atom in the group of formulas 1-132 may be replaced with a nitrogen atom, oxygen atom or sulfur atom, and the hydrogen atom may be replaced by a fluorine atom.

Among the repeating units represented by the above formula (5), it is preferable that the repeating unit represented by the below formula (9), formula (10), formula (11), formula (12), formula (13) or formula (14) is contained, in view of light emitting strength.

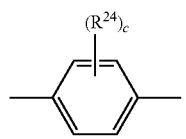

(9)

In the formula, $R^{24}$ represents a halogen atom, alkyl group, alkyloxy group, alkylthio group, aryl group, aryloxy group, arylthio group, arylalkyl group, arylalkyloxy group, aryl alkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, aryl ethynyl group, carboxyl group, or cyano group. c represents an integer of 0-4.

As the concrete examples of formula (9), the following repeating units are exemplified.

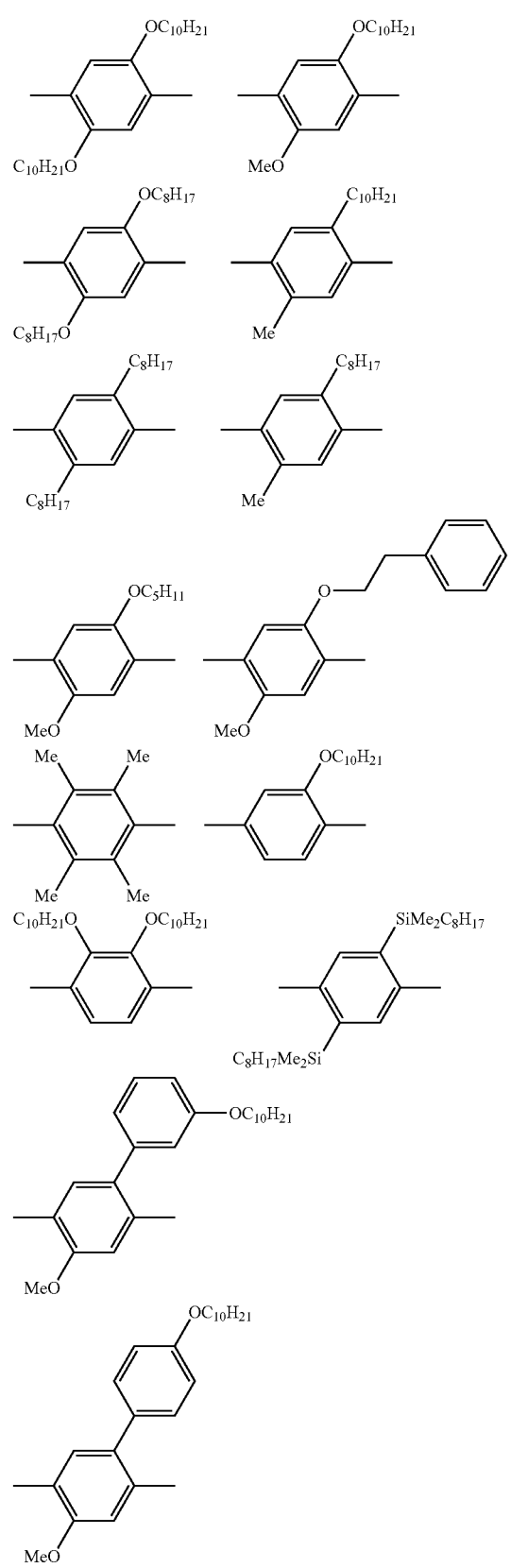

-continued

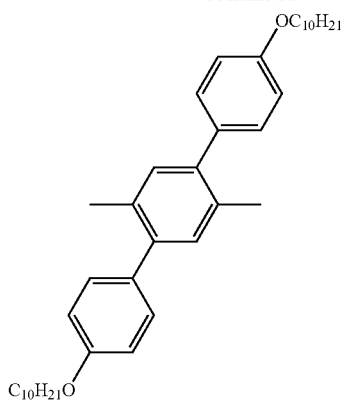

(10)

In the formula, $R^{25}$ and $R^{26}$ each independently represent a halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, arylethynyl group, carboxyl group, or cyano group. d and e each independently represent an integer of 0-3.

As the concrete examples of formula (10), the following repeating units are exemplified.

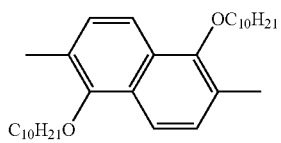

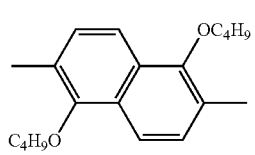

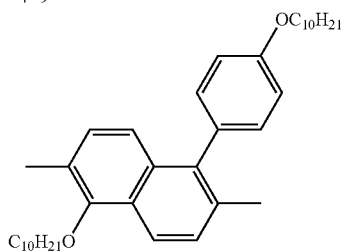

-continued

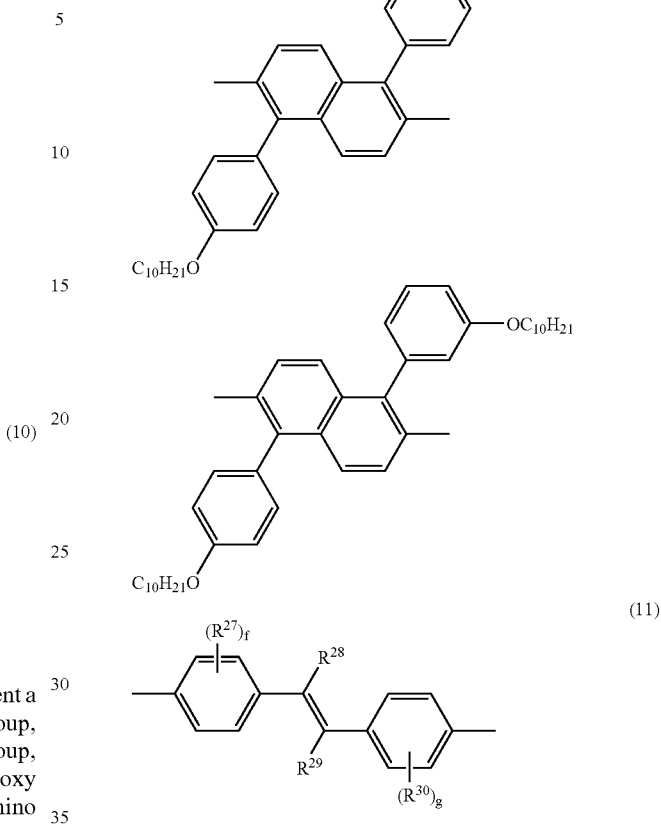

(11)

In the formula, $R^{27}$ and $R^{30}$ each independently represent a halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, arylethynyl group, carboxyl group, or cyano group. $R^{28}$ and $R^{29}$ each independently represent a hydrogen atom, alkyl group, aryl group, monovalent heterocyclic group, carboxyl group, or cyano group.

As the concrete examples of formula (11), the following repeating units are exemplified.

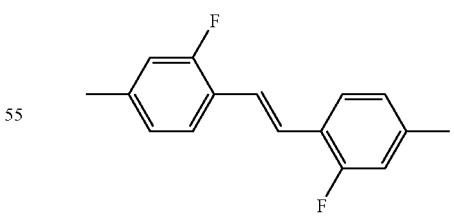

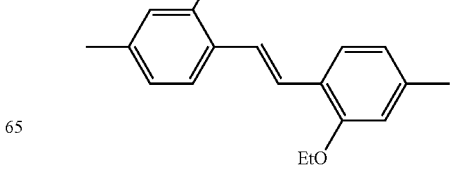

-continued

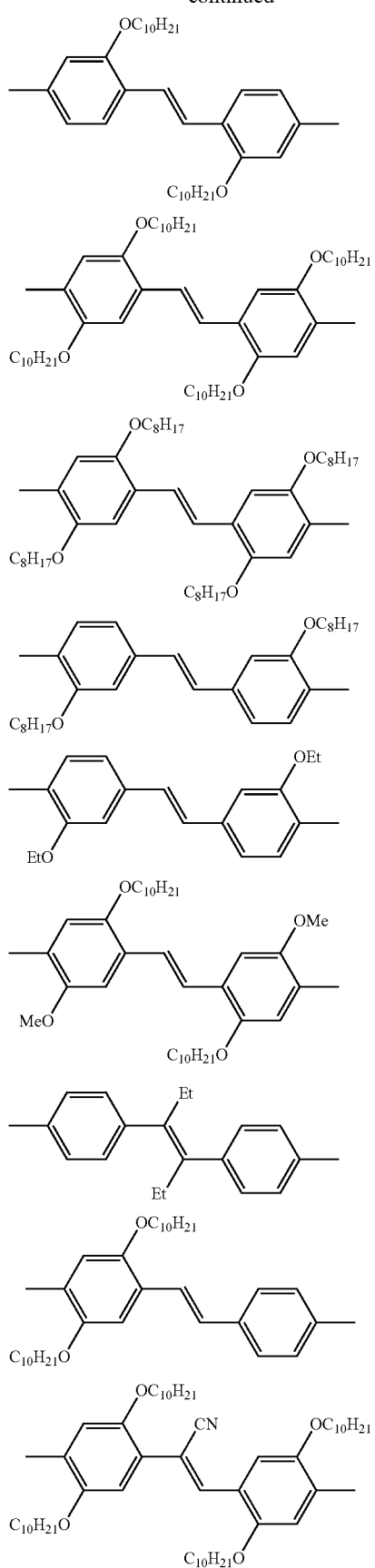

-continued

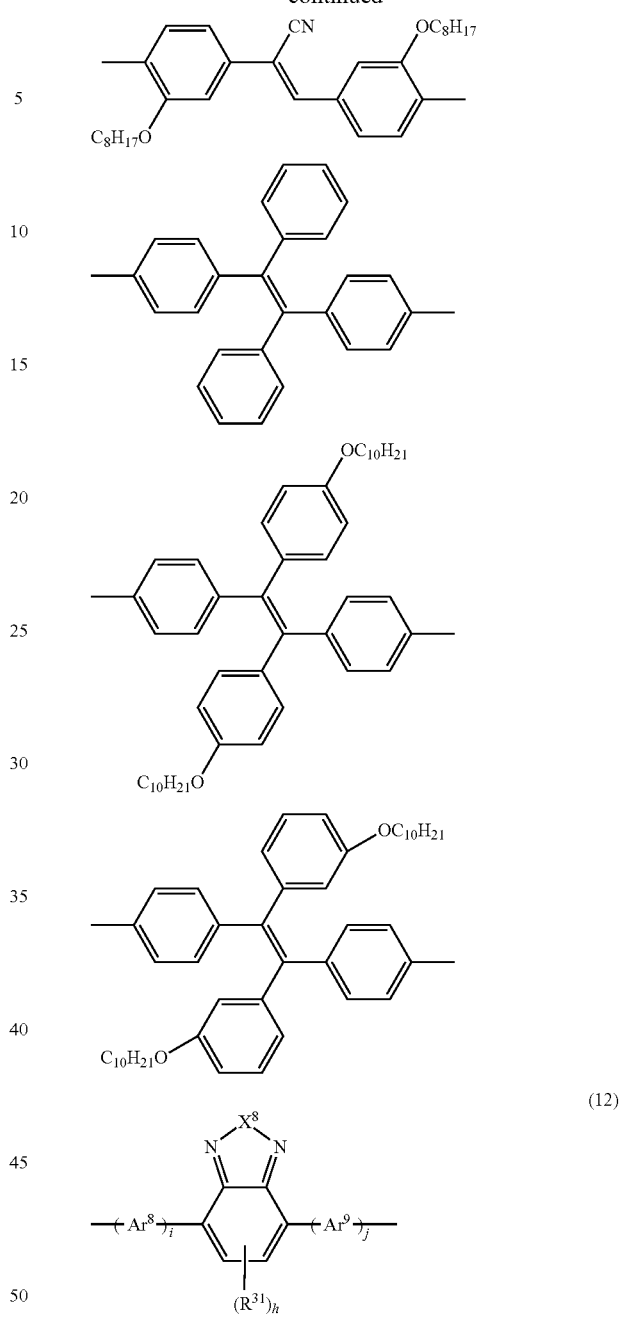

(12)

In the formula, $R^{31}$ represent a halogen atom, alkyl group, alkyloxy group, alkylthio group, aryl group, aryloxy group, arylthio group, arylalkyl group, arylalkyloxy group, aryl alkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, aryl ethynyl group, carboxyl group, or cyano group. h represents an integer of 0-2. $Ar^8$ and $Ar^9$ each independently represent an arylene group, divalent heterocyclic group, or a divalent group having metal complex structure. i and j each independently represent 0 or 1. $X^8$ represents O, S, SO, $SO_2$, Se or Te.

As the concrete examples of formula (12), the following repeating units are exemplified.

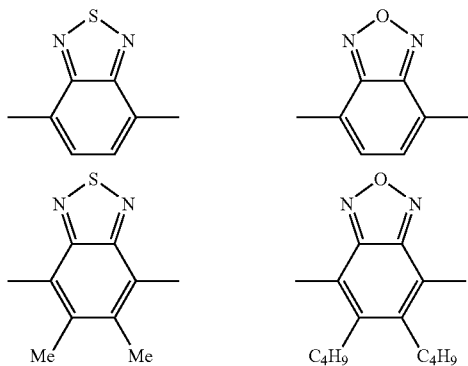

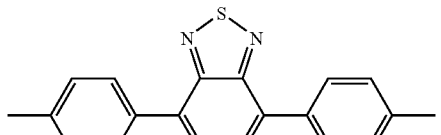

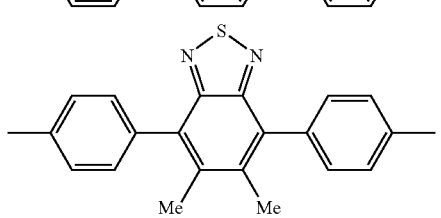

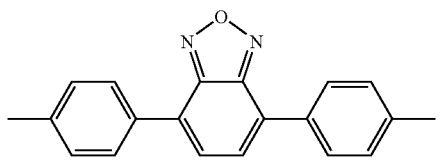

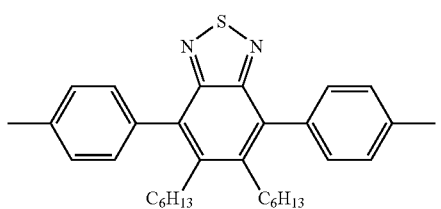

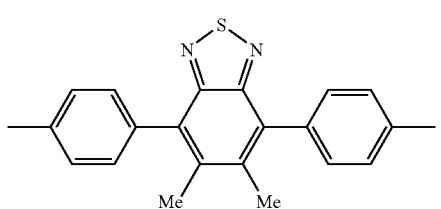

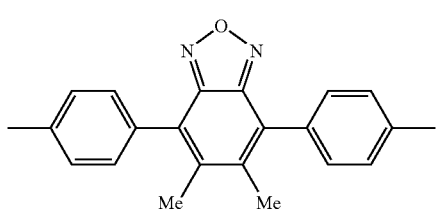

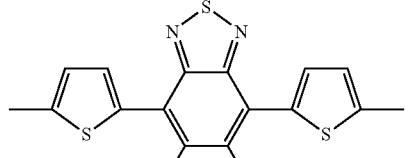

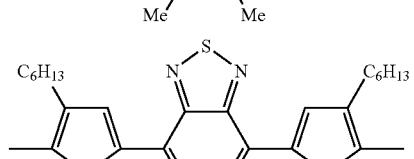

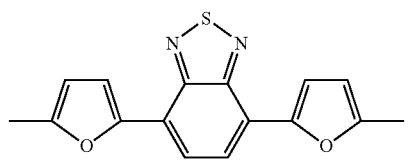

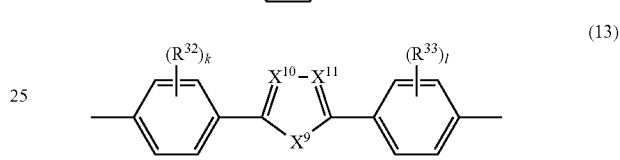

(13)

In the formula, $R^{32}$ and $R^{33}$ each independently represent a halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, arylethynyl group, carboxyl group, or cyano group. k and l each independently represent an integer of 0-4. $X^9$ represents O, S, SO, $SO_2$, Se, Te, N—$R^{34}$, or $SiR^{35}R^{36}$. $X^{10}$ and $X^{11}$ each independently represent N or C—$R^{37}$. $R^{34}$, $R^{35}$, $R^{36}$ and $R^{37}$ each independently represent a hydrogen atom, alkyl group, aryl group, arylalkyl group or a monovalent heterocyclic group.

As the concrete examples of formula (13), the following repeating units are exemplified.

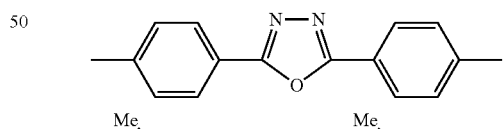

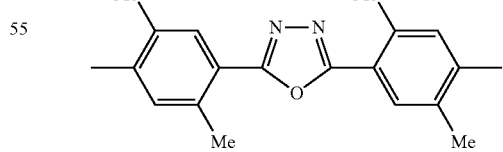

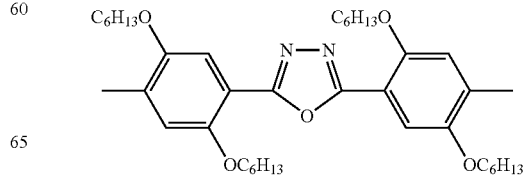

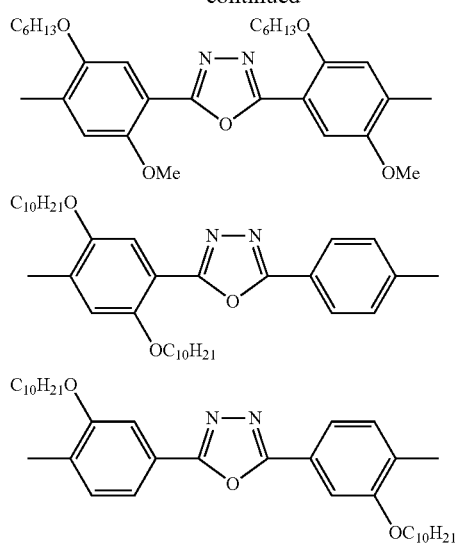

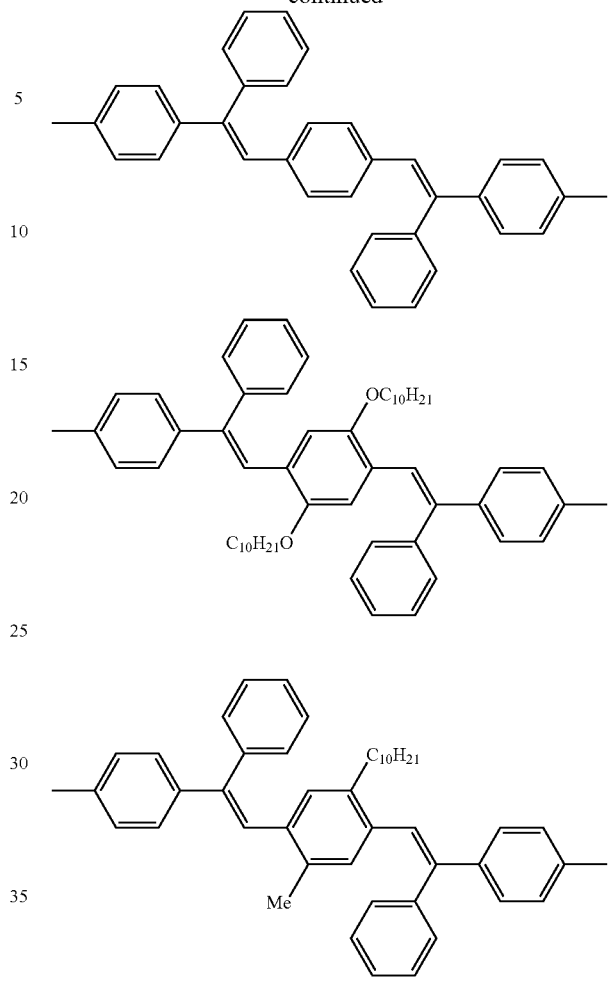

(14)

In the formula, $R^{38}$ and $R^{43}$ each independently represent a halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, arylethynyl group, carboxyl group, or cyano group. m and n each independently represent an integer of 0-4. $R^{39}$, $R^{40}$, $R^{41}$, and $R^{42}$ each independently represent a hydrogen atom, alkyl group, aryl group, monovalent heterocyclic group, carboxyl group, or cyano group. $Ar^{10}$ represents an arylene group, divalent heterocyclic group, or a divalent group having metal complex structure.

As the concrete examples of formula (14), the following repeating units are exemplified.

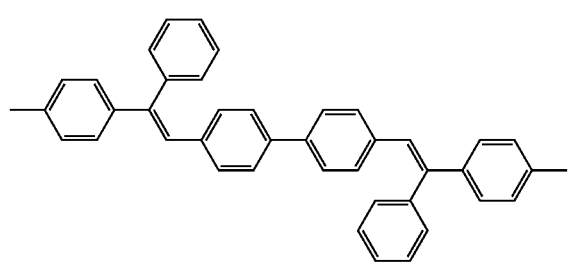

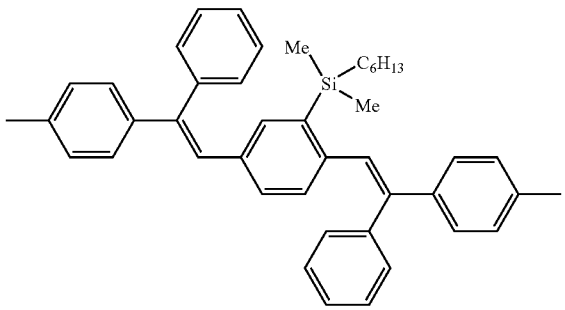

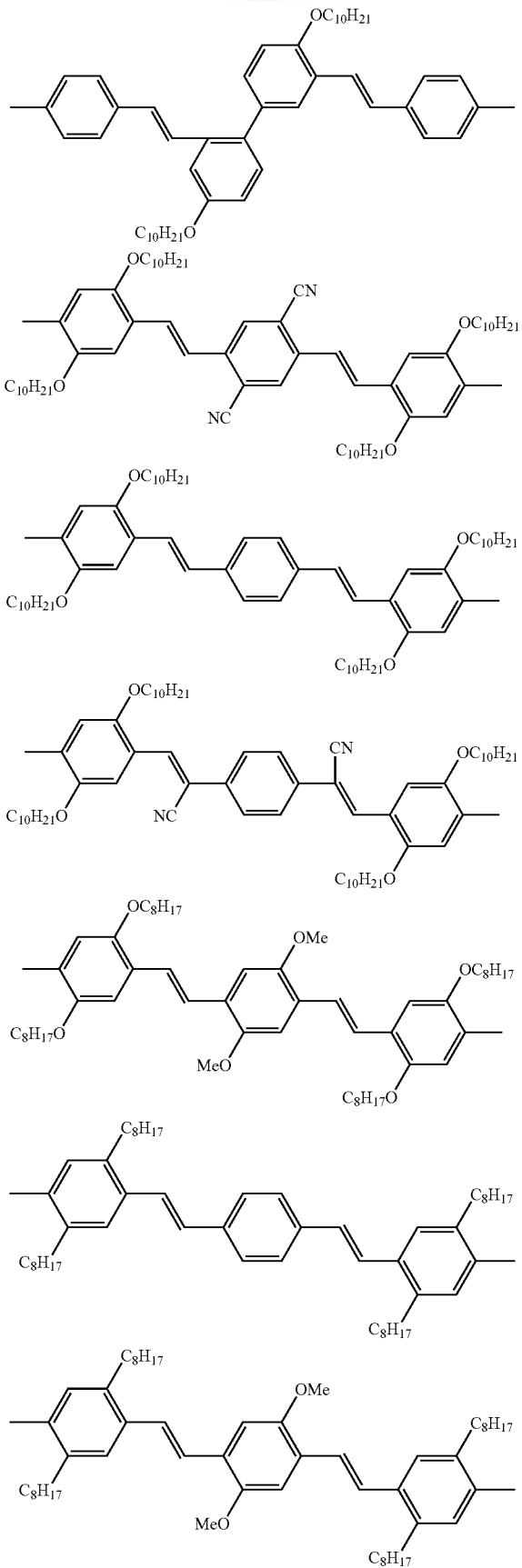

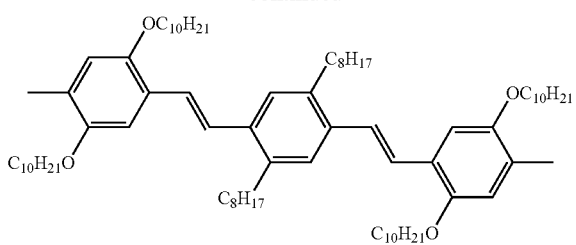

It is also preferable that the polymer compound of the present invention contains the repeating unit represented by the below formula (15) in addition to the repeating units represented by formulas (1) and (2), in view of improving fluorescence strength.

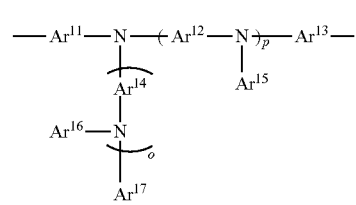

(15)

In the formula, $Ar^{11}$, $Ar^{12}$, $Ar^{13}$, and $Ar^{14}$ each independently represent an arylene group or a divalent heterocyclic group. $Ar^{15}$, $Ar^{16}$, and $Ar^{17}$ each independently represent an aryl group or a monovalent heterocyclic group. o and p each independently represent 0 or 1, and $0 \leq o+p \leq 1$.

As concrete examples of the repeating unit represented by the above formula (15), the repeating unit of the following formulas 133-140 are exemplified.

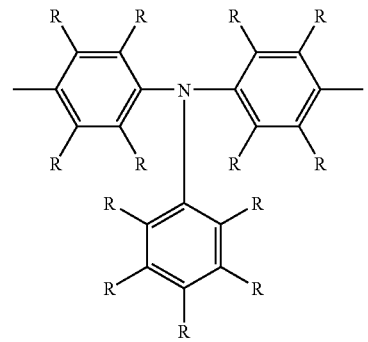

133

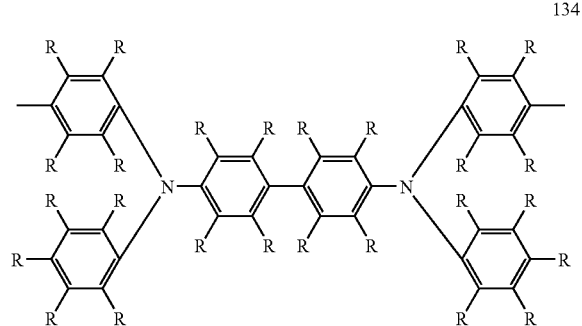

134

135

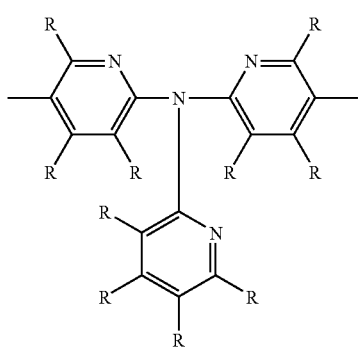

136

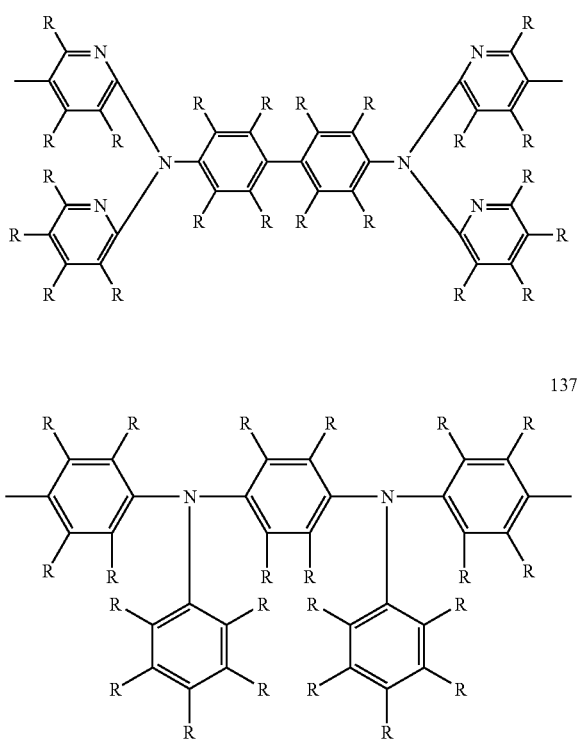

137

138

139

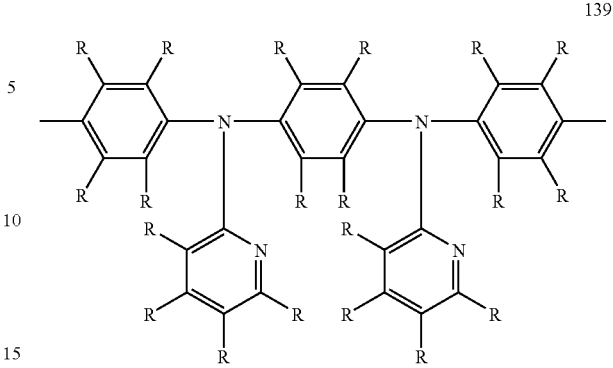

140

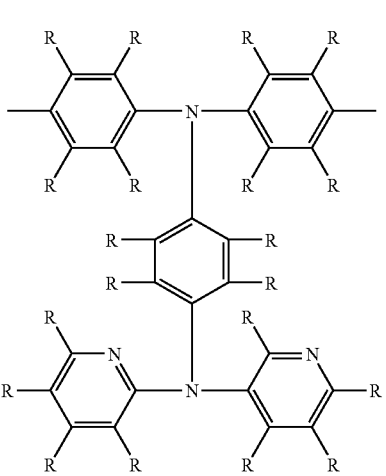

In above formulas 133-140, R is the same definition as those of the above formulas 1-132. In the above examples, although a plurality of Rs are contained in one structural formula, they may be the same or different. In order to improve the solubility in a solvent, it is preferable that R has one or more groups other than hydrogen atoms are contained, and it is preferable that there is little symmetry in the form of the repeating unit including substituent. Furthermore, in the above formula, when R contains an aryl group or a heterocyclic group in a part, they may have one more substituents.

In the substituents where R contains an alkyl chain in the above formula, they may be linear, branched or cyclic, or combination thereof, and as the example of not linear, isoamyl group, 2-ethylhexyl group, 3,7-dimethyloctyl group, cyclohexyl group, 4-$C_1$-$C_{12}$ alkyl cyclohexyl group, etc. are exemplified. In order to improve the solubility of a polymer compound in a solvent, it is preferable that an alkyl chain of cyclic or branched is contained in one or more of them.

A plurality of Rs may be connected to form a ring. Furthermore, in the case of the group where R contains an alkyl chain, the alkyl chain may be interrupted by a group containing a hetero atom. Here, as the hetero atom, an oxygen atom, a sulfur atom, a nitrogen atom, etc. are exemplified.

In the repeating unit represented by the above (9)-(15), the repeating unit represented by the above formula (15) is preferable. Among them, the repeating unit represented by the below formula (15-2) is preferable.

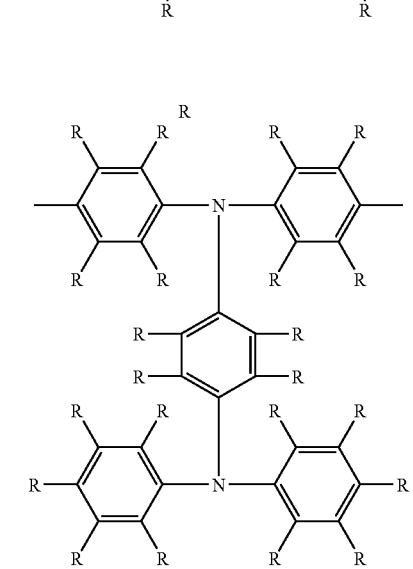

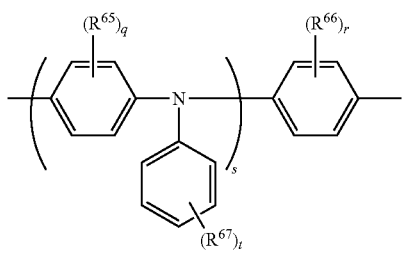
(15-2)

In the formula, $R^{65}$, $R^{66}$, and $R^{67}$ each independently represent a halogen atom, alkyl group, alkyloxy group, alkylthio group, alkylamino group, aryl group, aryloxy group, arylthio group, arylamino group, arylalkyl group, arylalkyloxy group, aryl alkylthio group, arylalkylamino group, acyl group, acyloxy group, amide group, imine residue, substituted silyl group, substituted silyloxy group, substituted silylthio group, substituted silylamino group, monovalent heterocyclic group, arylalkenyl group, arylethynyl group, or cyano group. q and r each independently represent an integer of 0-4. s represents an integer of 1-2. t represents an integer of 0-5.

In formulas (5)-(15), as to the alkyl group, alkoxy group, alkylthio group, aryl group, aryloxy group, arylthio group, arylalkyl group, aryl alkoxy group, arylalkylthio group, arylalkenyl group, arylalkynyl group, substituted amino group, silyl group, substituted silyl group, halogen atom, acyl group, acyloxy group, imine residue, amide group, imide group, and a monovalent heterocyclic group, the definition and the concrete examples thereof are the same as those of the substituents which may be contained in the compound exemplified in the above (29)-(33) etc.

In the polymer compound of the present invention, the repeating unit may be connected by non-conjugated units, and the non-conjugated portions may be contained in the repeating unit. Examples of the connecting structures include: groups shown below, and combinations of two or more groups shown below. Here, R is a group selected from the same substituents as the above, and Ar represents a hydrocarbon group of 6-60 carbon atoms.

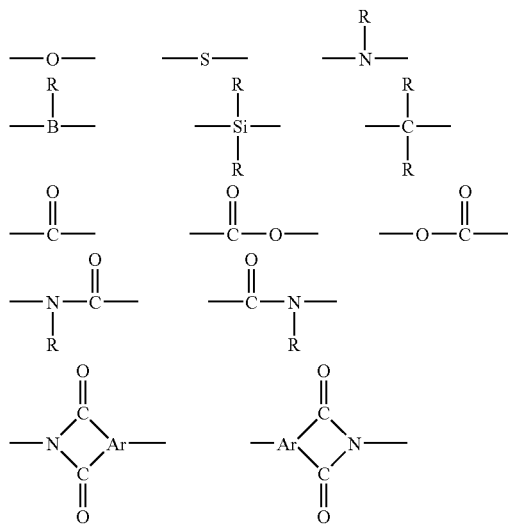

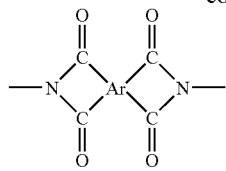
-continued

The polymer of the present invention may be a random, block or graft copolymer, or a polymer having an intermediate structure thereof, for example, a random copolymer having block property. From the viewpoint for obtaining a polymeric fluorescent substance (high molecular weight light-emitting material) having high fluorescent or phosphorescent quantum yield, random copolymers having block property and block or graft copolymers are more preferable than complete random copolymers. Further, a polymer having a branched main chain and more than three terminals, and a dendrimer may also be included.

The end group of polymer compound may also be protected with a stable group since if a polymerization active group remains intact, there is a possibility of reduction in light emitting property and life-time when made into an device. Those having a conjugated bond continuing to a conjugated structure of the main chain are preferable, and there are exemplified structures connected to an aryl group or heterocyclic compound group via a carbon-carbon bond. Specifically, the substituents described as Chemical Formula 10 in JP-A-9-45478, etc. are exemplified.

The polymer compound of the present invention may contain, at the terminal, a structural unit represented by the below formula (1a), (2a), (3a), (3b), (4a) or (4b).

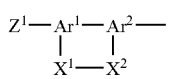
(1a)

In the formula, $Ar^1$, $Ar^2$, $X^1$, and $X^2$ are the same as those of the above. $Z^1$ represents a hydrogen atom, alkyl group, alkyloxy group, alkylthio group, aryl group, aryloxy group, arylthio group, arylalkyl group, arylalkyloxy group, aryl alkylthio group, substituted amino group, substituted silyl group, a monovalent heterocyclic group, arylalkenyl group, or arylethynyl group.

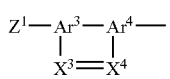
(2a)

In the formula, $Ar^3$, $Ar^4$, $X^3$, $X^4$, and $Z^1$ are the same as those of the above.

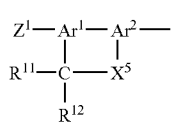
(3a)

In the formula, $Ar^1$, $Ar^2$, $R^{11}$, $R^{12}$, $X^5$, and $Z^1$ are the same as those of the above.

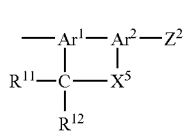
(3b)

In the formula, $Ar^1$, $Ar^2$, $R^{11}$, $R^{12}$, and $X^5$ are the same as those of the above. $Z^1$ represents a hydrogen atom, alkyl group, alkyloxy group, alkylthio group, aryl group, aryloxy group, arylthio group, arylalkyl group, arylalkyloxy group, aryl alkylthio group, substituted amino group, substituted silyl group, monovalent heterocyclic group, arylalkenyl group, or arylethynyl group.

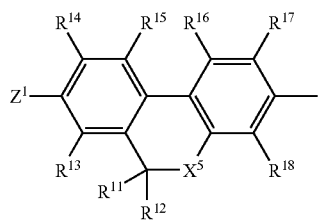

(4a)

In the formula, $R^{11}$, $R^{12}$, $R^{13}$, $R^{14}$, $R^{15}$, $R^{16}$, $R^{17}$, $R^{18}$, $X^5$, and $Z^1$ are the same as those of the above.

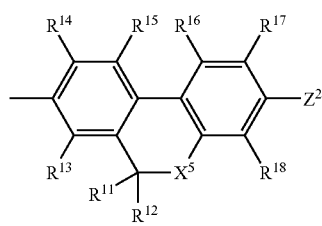

(4b)

In the formula, $R^{11}$, $R^{12}$, $R^{13}$, $R^{14}$, $R^{15}$, $R^{16}$, $R^{17}$, $R^{18}$, $X^5$, and $Z^2$ are the same as those of the above.

The polystyrene reduced number average molecular weight of the polymer compound of the present invention is $10^3$-$10^8$, and preferably $10^4$-$10^6$.

Examples of a good solvent for the polymer compound of the present invention include chloroform, methylene chloride, dichloro ethane, tetrahydrofuran, toluene, xylene, mesitylene, tetra phosphorus, decalin, n-butylbenzene, etc. Although it depends also on the structure and the molecular weight of the polymer compound, these solvents can be usually dissolved 0.1% by weight or more.

It is preferable that the polymer compound of the present invention has liquid-crystal property. The polymer compound having a liquid-crystal property means that a molecule containing the polymer compound shows liquid crystal phase. The liquid crystal phase can be confirmed by a polarizing microscope and differential scanning calorimeter measurement, X-ray diffraction measurement, etc.

Compounds having liquid-crystal property are known to have optical or electric anisotropy by being oriented. (Synthetic Metals 119 (2001) 537). As a orientation method, generally known method as a method for orienting a liquid crystal can be used, for example, "Foundation and Application of Liquid Crystal" (Written by Shoichi Matsumoto & Ichiro Kakuda, Published by Kogyo-Chosa Kai, 1991) Chapter 5, "Structure and Physical Properties of Strong Dielectric Liquid Crystal" (Written by Atsuo Fukuda & Hideo Takezoe, Published by Corona Company, 1990) Chapter 7, "Liquid Crystal" Vol. 3, No. 1 (1999) pages 3-16, etc. Among them, a rubbing method, an optically orienting method, shear-stress applying method, and drawing-up coating method are useful, since they are simple and easy to use as the oriention method.

The rubbing method is a method of rubbing a substrate surface lightly with cloth etc. As the substrate, glass, high polymer film, etc. can be used. As the cloth used for rubbing a substrate, clothes, such as gauze, polyester, cotton, nylon, and rayon, can be used. Orientation performance becomes higher by separately forming an oriented film furthermore on a substrate. Here, as the oriented film, polyimide, polyamide, PVA, polyester, nylon, etc. are exemplified and a commercial oriented film for liquid crystal can also be used. The oriented film can be formed by a spin coat method, flexography, etc. The cloth used for rubbing can be suitably selected in accordance with the oriented film to be used.

The optically orienting method is a method of giving an orientation function by a method of forming an oriented film on a substrate and carrying out a polarized-light irradiation of UV light—or oblique light incidence irradiation of UV light. As the oriented film, polyimide, polyamide, polyvinylcinnamate, etc. are exemplified, and commercial orientated film for liquid crystal can also be used.

In the rubbing method or the optical orienting method, orientation can be made by interposing an oriented polymer material between the substrates processed as the above. Here, it is required to raise the temperature of the substrate so that the material becomes a liquid crystal phase or isotropic phase. The temperature setting may be done either before interposing a polymer material to substrates, or after interposing. Further, it can be conducted by only coating the polymer material on the substrate whose orientation processing had been performed. The coating of a polymer can be carried out by: setting a polymer on the substrate at a temperature of not lower than Tg, or a temperature showing liquid crystal phase or isotropic phase, and coating it in one direction with using a rod etc. or preparing a solution dissolving it in an organic solvent, and coating it by a method of by spin coat, or flexography.

The shear-stress applying method is a method wherein, on a polymer material placed on a substrate, another substrate is placed, and the upper substrate is shifted to one direction at a temperature of liquid crystal phase or isotropic phase.

At this time, when a substrate of having orientation-processing as described in the above rubbing method or optically orienting method is used as the substrate, more highly oriented one can be obtained.

As the substrate, glass, a high polymer film, etc. can be used, and a thing which is shifted by stress may not be a substrate but a metal rod, etc.

The drawing-up coating method is a method where a substrate is dipped in a polymer solution and is drawn up. The organic solvent used for polymer solution, and drawing-up rate of the substrate are not especially limited, and they are selected and prepared according to the orientation degree of the polymer.

The polymer having liquid crystal property can be used as a light source of polarized-light emission when used as a polymer LED, and it is useful when used as a thin-film transistor, for improving the mobility of charge.

Next, the manufacture method of the polymer compound of the present invention will be explained. In the present invention, the polymer compound having a repeating unit represented by formula (1), (3), (4) and (20-0) can be produced by carrying out condensation polymerization of a compound represented by the below formulas (16-1), (17-1), and (18-1) (20) as one of materials, respectively.

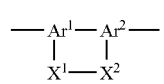

(1)

In the formula, $Ar^1$, $Ar^2$, $X^1$, and $X^2$ represent the same meaning as the above.

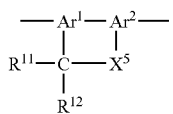
(3)

In the formula, $Ar^1$, $Ar^2$, $X^5$, $R^{11}$, and $R^{12}$ represent the same meaning as the above.

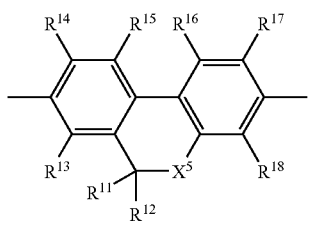
(4)

In the formula, $X^5$, $Ar^{11}$, $Ar^{12}$, $R^{13}$, $R^{14}$, $R^{15}$, $R^{16}$, $R^{17}$, and $R^{18}$ represent the same meaning as the above.

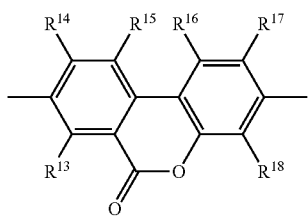
(20-0)

In the formula, $R^{13}$, $R^{14}$, $R^{15}$, $R^{16}$, $R^{17}$, and $R^{18}$ represent the same meaning as the above.

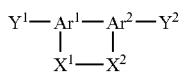
(16-1)

In the formula, $Ar^1$, $Ar^2$, $X^1$, and $X^2$ are the same as those of the above. $Y^1$ and $Y^2$ each independently represent a halogen atom, alkylsulfonate group, arylsulfonate group, arylalkylsulfonate group, boric ester group, sulfonium methyl group, phosphonium methyl group, phosphonate methyl group, monohalogenated methyl group, boric acid group, formyl group, or vinyl group.

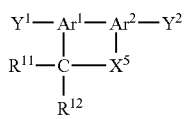
(17-1)

In the formula, $Ar^1$, $Ar^2$, $R^{11}$, $R^{12}$, $X^5$, $Y^1$, and $Y^2$ represent the same meaning as the above.

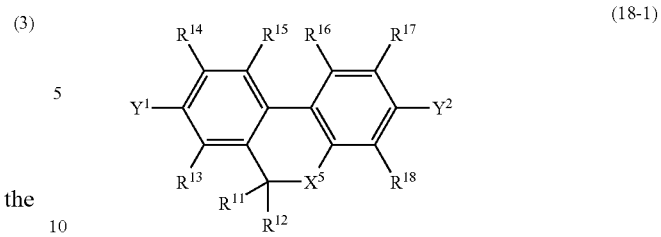
(18-1)

In the formula, $R^{11}$, $R^{12}$, $R^{13}$, $R^{14}$, $R^{15}$, $R^{16}$, $R^{17}$, $R^{18}$, $X^5$, $Y^1$, and $Y^2$ represent the same meaning as the above.

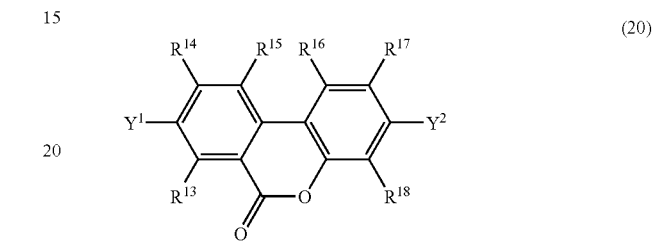
(20)

In the formula, $R^{13}$, $R^{14}$, $R^{15}$, $R^{16}$, $R^{17}$, $R^{18}$, $Y^1$, and $Y^2$ represent the same meaning as the above.

In view of easiness of synthesis and functional-group conversion, it is preferable that $Y^1$ and $Y^2$ each independently represent a halogen atom, alkylsulfonate group, arylsulfonate group, arylalkylsulfonate group, boric ester group, or boric acid group.

The polymer compound having the repeating unit represented by formula (2), (23), (24), and (25) can be manufactured by carrying out condensation polymerization of the compound represented by the below formula (2-1), (23-1), (24-1) and (25-1), respectively, as one of raw materials.

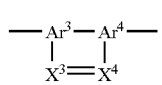
(2)

In the formula, $Ar^3$, $Ar^4$, $X^3$, and $X^4$ represent the same meaning as the above.

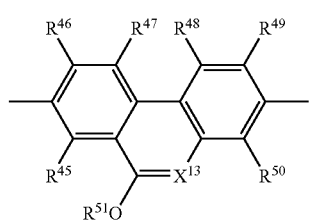
(23)

In the formula, $X^{13}$ represents a boron atom, nitrogen atom, or phosphorus atom. $R^{45}$, $R^{46}$, $R^{47}$, $R^{48}$, $R^{49}$, and $R^{50}$ each independently represent a hydrogen atom, halogen atom, alkyl group, alkyloxy group, alkylthio group, aryl group, aryloxy group, arylthio group, arylalkyl group, arylalkyloxy group, aryl alkylthio group, acyl group, acyloxy group, amide group, imide group, imine residue, amino group, substituted amino group, substituted silyl group, substituted silyloxy group, substituted silylthio group, substituted silylamino group, monovalent heterocyclic group, arylalkenyl group, aryl ethynyl group, carboxyl group, or cyano group. $R^{46}$, and $R^{47}$, $R^{48}$ and $R^{49}$ may be connected mutually to form a ring. $R^{51}$ represents an alkyl group, aryl group, arylalkyl group, or monovalent heterocyclic group.

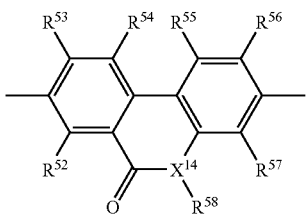

(24)

In the formula, $X^{14}$ represents a boron atom, a nitrogen atom, or a phosphorus atom. $R^{52}$, $R^{53}$, $R^{54}$, $R^{55}$, $R^{56}$ and $R^{57}$ each independently represent a hydrogen atom, halogen atom, alkyl group, alkyloxy group, alkylthio group, aryl group, aryloxy group, arylthio group, arylalkyl group, arylalkyloxy group, arylalkylthio group, acyl group, acyloxy group, amide group, imide group, imine residue, amino group, substituted amino group, substituted silyl group, substituted silyloxy group, substituted silylthio group, substituted silylamino group, monovalent heterocyclic group, arylalkenyl group, aryl ethynyl group, carboxyl group, or cyano group. $R^{53}$ and $R^{54}$, or $R^{55}$ and $R^{56}$ may be connected mutually to form a ring. $R^{58}$ represents alkyl group, aryl group, arylalkyl group, or monovalent heterocyclic group.

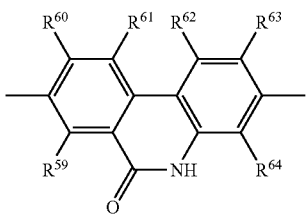

(25)

In the formula, $R^{59}$, $R^{60}$, $R^{61}$, $R^{62}$, $R^{63}$ and $R^{64}$ each independently represent a hydrogen atom, halogen atom, alkyl group, alkyloxy group, alkylthio group, aryl group, aryloxy group, arylthio group, arylalkyl group, arylalkyloxy group, aryl alkylthio group, acyl group, acyloxy group, amide group, imide group, imine residue, amino group, substituted amino group, substituted silyl group, substituted silyloxy group, substituted silylthio group, substituted silylamino group, monovalent heterocyclic group, arylalkenyl group, aryl ethynyl group, carboxyl group, or cyano group. $R^{60}$ and $R^{61}$, or $R^{62}$ and $R^{63}$ may be connected mutually to form a ring.

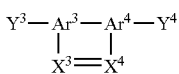

(2-1)

In the formula, $Ar^3$, $Ar^4$, $X^3$, and $X^4$ are the same as those of the above. $Y^3$ and $Y^4$ each independently represent a halogen atom, alkylsulfonate group, arylsulfonate group, arylalkylsulfonate group, boric ester group, sulfonium methyl group, phosphonium methyl group, phosphonate methyl group, monohalogenated methyl group, boric acid group, formyl group, or vinyl group.

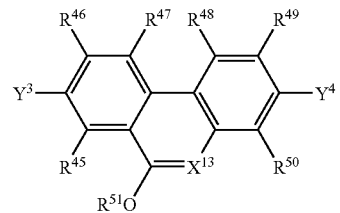

(23-1)

In the formula, $X^{13}$, $R^{45}$, $R^{46}$, $R^{47}$, $R^{48}$, $R^{49}$, $R^{50}$, and $R^{51}$ are the same as those of the above. $Y^3$ and $Y^4$ each independently represent a halogen atom, alkylsulfonate group, arylsulfonate group, arylalkylsulfonate group, boric ester group, sulfonium methyl group, phosphonium methyl group, phosphonate methyl group, monohalogenated methyl group, boric acid group, formyl group, or vinyl group.

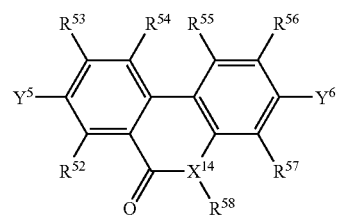

(24-1)

In the formula, $X^{14}$, $R^{52}$, $R^{53}$, $R^{54}$, $R^{55}$, $R^{56}$, $R^{57}$, and $R^{58}$ are the same as those of the above. $Y^5$ and $Y^6$ each independently represent a halogen atom, alkylsulfonate group, arylsulfonate group, arylalkylsulfonate group, boric ester group, sulfonium methyl group, phosphonium methyl group, phosphonate methyl group, monohalogenated methyl group, boric acid group, formyl group, or vinyl group.

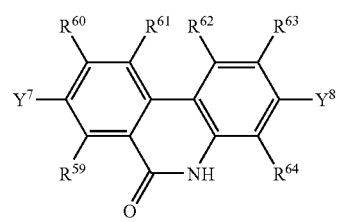

(25-1)

In the formula, $R^{59}$, $R^{60}$, $R^{61}$, $R^{62}$, $R^{63}$, and $R^{64}$ are the same as those of the above. $Y^7$ and $Y^8$ each independently represent a halogen atom, alkylsulfonate group, arylsulfonate group, arylalkylsulfonate group, boric ester group, sulfonium methyl group, phosphonium methyl group, phosphonate methyl group, monohalogenated methyl group, boric acid group, formyl group, or vinyl group.

In view of easiness of synthesis and functional-group conversion, it is preferable that $Y^3$, $Y^4$, $Y^5$, $Y^6$, $Y^7$, and $Y^8$ each independently represent a halogen atom, alkylsulfonate group, arylsulfonate group, arylalkylsulfonate group, boric ester group, or boric acid group.

The polymer compound having the repeating unit represented by formula (1), (3), (4) and (20-0) can be manufactured by carrying out condensation polymerization of the compound represented by the below formula (16-2), (17-2), (17-3), (18-2), (18-3), (20-2) and (20-3), respectively, as one of raw materials, and the terminal structure thereof can be preferably controlled.

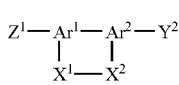
(16-2)

In the formula, $Ar^1$, $Ar^2$, $X^1$, $X^2$, and $Y^2$ are the same as those of the above. $Z^1$ represents a hydrogen atom, alkyl group, alkyloxy group, alkylthio group, aryl group, aryloxy group, arylthio group, arylalkyl group, arylalkyloxy group, aryl alkylthio group, substituted amino group, substituted silyl group, a monovalent heterocyclic group, arylalkenyl group, or arylethynyl group.

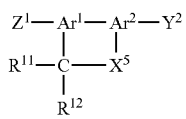
(17-2)

In the formula, $Ar^1$, $Ar^2$, $R^{11}$, $R^{12}$, $X^5$, $Y^2$, and $Z^1$ represent the same meaning as the above.

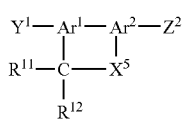
(17-3)

In the formula, $Ar^1$, $Ar^2$, $R^{11}$, $R^{12}$, $X^5$, and $Y^1$ represent the same meaning as the above. $Z^2$ represents a hydrogen atom, alkyl group, alkyloxy group, alkylthio group, aryl group, aryloxy group, arylthio group, arylalkyl group, arylalkyloxy group, aryl alkylthio group, substituted amino group, substituted silyl group, monovalent heterocyclic group, arylalkenyl group, or arylethynyl group.

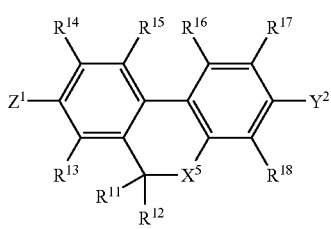
(18-2)

In the formula, $R^{11}$, $R^{12}$, $R^{13}$, $R^{14}$, $R^{15}$, $R^{16}$, $R^{17}$, $R^{18}$, $X^5$, $Y^2$, and $Z^1$ represent the same meaning as the above.

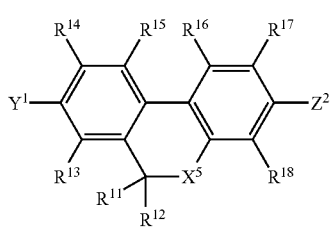
(18-3)

In the formula, $R^{11}$, $R^{12}$, $R^{13}$, $R^{14}$, $R^{15}$, $R^{16}$, $R^{17}$, $R^{18}$, $X^5$, $Y^1$, and $Z^2$ represent the same meaning as the above.

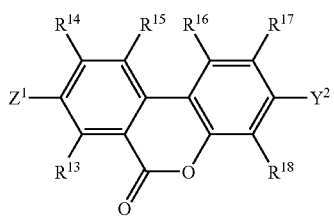
(20-2)

In the formula, $R^{13}R^{14}$, $R^{15}$, $R^{16}$, $R^{17}$, $R^{18}$, $Y^2$, and $Z^1$ represent the same meaning as the above.

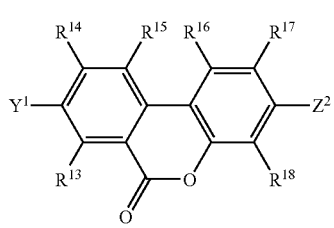
(20-3)

In the formula, $R^{13}R^{14}$, $R^{15}$, $R^{16}$, $R^{17}$, $R^{18}$, $Y^1$, and $Z^2$ represent the same meaning as the above.

The polymer compound having the repeating unit represented by formula (2), (23), (24), and (25) can be manufactured by carrying out condensation polymerization of the compound represented by the below formula (2-2), (23-2), (23-3), (24-2), (24-3), (25-2) and (25-3), respectively, as one of raw materials, and the terminal structure thereof can be preferably controlled.

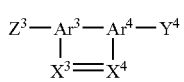
(2-2)

In the formula, $Ar^3$, $Ar^4$, $X^3$, $X^4$, and $Y^4$ are the same as those of the above. $Z^3$ represents a hydrogen atom, alkyl group, alkyloxy group, alkylthio group, aryl group, aryloxy group, arylthio group, arylalkyl group, arylalkyloxy group, aryl alkylthio group, substituted amino group, substituted silyl group, a monovalent heterocyclic group, arylalkenyl group, or arylethynyl group.

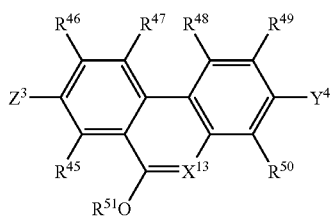
(23-2)

In the formula, $X^{13}$, $R^{45}$, $R^{46}$, $R^{47}$, $R^{48}$, $R^{49}$, $R^{50}$, $R^{51}$, $Y^4$, and $Z^3$ represent the same meaning as the above.

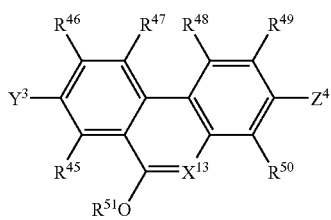
(23-3)

In the formula, $X^{13}$, $R^{45}$, $R^{46}$, $R^{47}$, $R^{48}$, $R^{49}$, $R^{50}$, $R^{51}$ and $Y^3$ represent the same meaning as the above. $Z^4$ represents a hydrogen atom, alkyl group, alkyloxy group, alkylthio group, aryl group, aryloxy group, arylthio group, arylalkyl group, arylalkyloxy group, arylalkylthio group, substituted amino group, substituted silyl group, monovalent heterocyclic group, arylalkenyl group, or aryl ethynyl group.

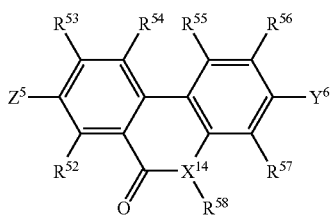
(24-2)

In the formula, $X^{14}$, $R^{52}$, $R^{53}$, $R^{54}$, $R^{55}$, $R^{56}$, $R^{57}$, $R^{58}$, and $Y^6$ represent the same meaning as the above. $Z^5$ represents a hydrogen atom, alkyl group, alkyloxy group, alkylthio group, aryl group, aryloxy group, arylthio group, arylalkyl group, arylalkyloxy group, aryl alkylthio group, substituted amino group, substituted silyl group, monovalent heterocyclic group, arylalkenyl group, or aryl ethynyl group.

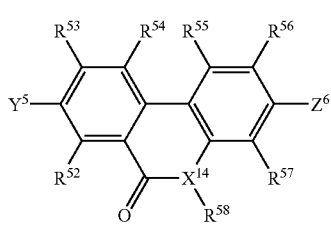
(24-3)

In the formula, $X^{14}$, $R^{52}$, $R^{53}$, $R^{54}$, $R^{55}$, $R^{56}$, $R^{57}$, $R^{58}$, and $Y^5$ represent the same meaning as the above. $Z^6$ represents a hydrogen atom, alkyl group, alkyloxy group, alkylthio group, aryl group, aryloxy group, arylthio group, arylalkyl group, arylalkyloxy group, arylalkylthio group, substituted amino group, substituted silyl group, monovalent heterocyclic group, arylalkenyl group, or aryl ethynyl group.

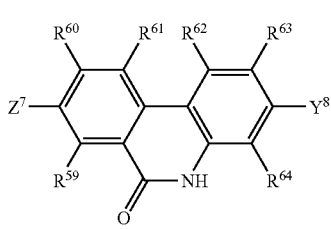
(25-2)

In the formula, $R^{59}$, $R^{60}$, $R^{61}$, $R^{62}$, $R^{63}$, $R^{64}$, and $Y^8$ represent the same meaning as the above. $Z^7$ represents a hydrogen atom, alkyl group, alkyloxy group, alkylthio group, aryl group, aryloxy group, arylthio group, arylalkyl group, arylalkyloxy group, arylalkylthio group, substituted amino group, substituted silyl group, monovalent heterocyclic group, arylalkenyl group, or aryl ethynyl group.

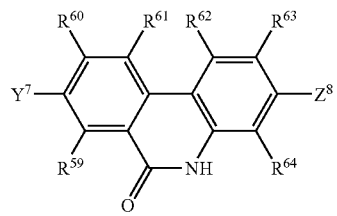
(25-3)

In the formula, $R^{59}$, $R^{60}$, $R^{61}$, $R^{62}$, $R^{63}$, $R^{64}$, and $Y^7$ represent the same meaning as the above. $Z^8$ represents a hydrogen atom, alkyl group, alkyloxy group, alkylthio group, aryl group, aryloxy group, arylthio group, arylalkyl group, arylalkyloxy group, aryl alkylthio group, substituted amino group, substituted silyl group, monovalent heterocyclic group, arylalkenyl group, or arylethynyl group.

Among the compounds represented by the above formula (1) or (2-0), in view of easiness of synthesis and functional-group conversion, it is preferable that $Y^1$-$Y^4$ represent a halogen atom, alkylsulfonate group, arylsulfonate group, arylalkylsulfonate group, boric ester group, or boric acid group each independently, and more preferably a halogen atom.

As the alkylsulfonate group, methane sulfonate group, ethane sulfonate group, trifluoromethane sulfonate group, etc. are exemplified, and as the arylsulfonate group, benzene sulfonate group, p-toluene sulfonate group, etc., are exemplified, and as the arylalkylsulfonate group, benzyl sulfonate group etc. are exemplified. As the boric ester group, groups represented by the below formula are exemplified.

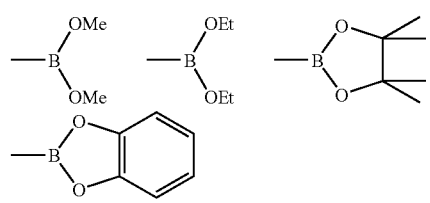

As the sulfonium methyl group, groups represented by the below formula are exemplified.

—CH$_2$SMe$_2$X and —CH$_2$SPh$_2$X (X is a halogen atom.)

As the phosphonium methyl group, groups represented by the below formula are exemplified.

—CH$_2$PPh$_3$X (X is a halogen atom.)

As the phosphonate methyl group, groups represented by the below formula are exemplified.

—CH$_2$PO(OR')$_2$ (R' is alkyl group, aryl group, or arylalkyl group.)

As the monohalogenated methyl group, fluoromethyl group, chlorination methyl group, bromomethyl group, and iodomethyl group, are exemplified.

Among the compounds represented by the above (16-1), (17-1) or (18-1), $Y^1$-$Y^4$ can be converted from a compound having halogen atom to a compound having other functional group. For example, in the case of boric ester group, it can be prepared by: a method where it is reacted with boric ester after being reacted with a metalation reagent, and a method it is reacted with diborane in existence of a palladium catalyst and according to J. Org. Chem., 7508 (1995).

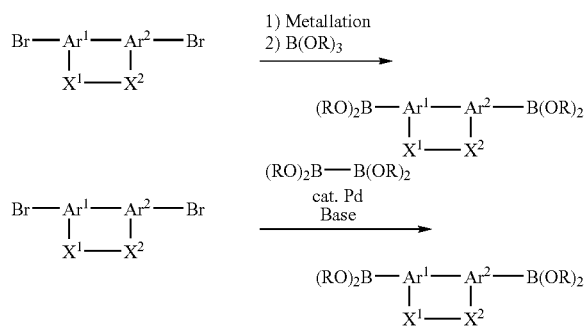

As for the compound represented by the above (2-1), (23-1) or (24-1), functional-group conversion can be carried out by the same method. As the following functional-group conversion reaction, it is the same.

As the metalation reagent, exemplified are: aryl lithium such as, phenyl lithium, naphtyl lithium, and tolyl lithium; alkyl lithium, such as methyl lithium, n-butyl lithium, sec-butyl lithium and t-butyl lithium; lithium amide, such as lithium diisopropyl amide, and lithium-2,2,6,6-tetramethyl piperidide and lithium hexamethyl disilazide; and metal magnesium.

As the boric ester, trimethoxy borane, triethoxy borane, etc. are exemplified.

As the boric acid groups, they can be prepared by a method of carrying out hydrolysis of the compounds of the above boric ester group etc. under an acidic or basic condition.

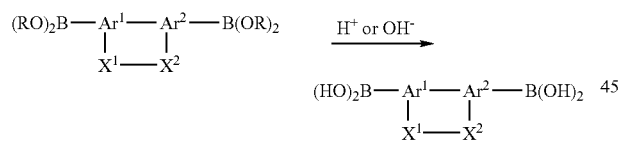

As the alkylphosphonate group, aryl phosphonate group, and arylalkyl phosphonate group, they can be prepared by a method of reacting the compound of the above boric acid group or boric ester group with peroxide, and then reacting them with a sulfonating agent etc. under existence of a base.

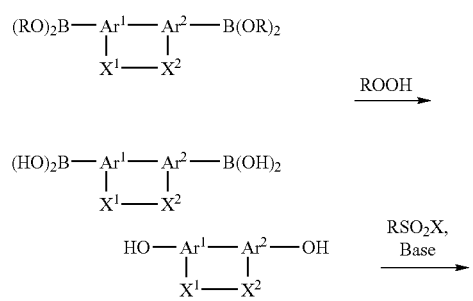

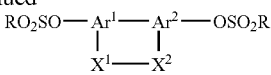

As the peroxide, peroxide, t-butyl peroxide, peracetic acid, perbenzoic acid, etc. are exemplified. As the base, exemplified are: tertiary amines, such as trimethylamine, triethylamine, triisopropyl amine, tri-n-butylamine, diisopropylethyl amine, and N,N,N',N'-tetramethylethylene diamine; and pyridines, such as pyridine, and 4-dimethylamino pyridine. As the sulfonating agent, exemplified are: alkyl sulfonium chlorides, such as methane sulfonium chloride and trifluoromethane sulfonium chloride; alkyl sulfone acid anhydrides, such as methyl sulfone acid anhydride and trifluoromethane sulfone acid anhydride; aryl sulfonyl chlorides, such as benzene sulfonyl chloride and p-toluene sulfonyl chloride; aryl sulfone acid anhydrides, such as benzene sulfone acid anhydride and p-toluene sulfone acid anhydride; arylalkyl sulfonium chlorides, such as benzyl sulfonium chloride; and arylalkyl sulfone acid anhydrides, such as benzyl sulfone acid anhydride, etc.

In case of the formyl groups, they can be produced by a method of reacting a compound having a halogen atom as $Y^1$-$Y^4$ with a metalation reagent, and then reacting them with N,N-dimethylformamide, etc.

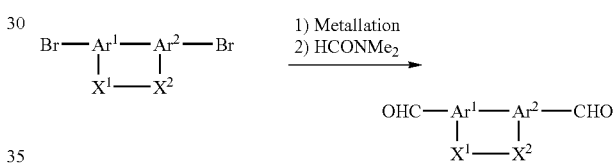

As the metalation reagent, it is the same as those of the above.

In case of the monohalogenated methyl group, exemplified are: a method of halogenation after reducing a compound of the above formyl group; a method of halogenation, after reacting a compound of a halogen atom as $Y^1$-$Y^4$ with a metalation agent, and reacting it with formaldehyde.

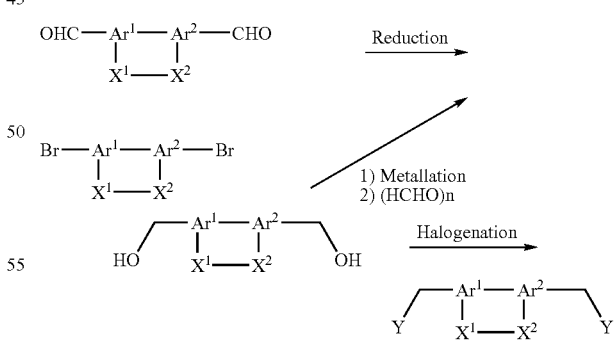

As the reducing agent, exemplified are: sodium boron hydride, lithium aluminum hydride, diiso butyl aluminum hydride, hydrogen, etc. As the halogenation reagent, exemplified are: chlorination reagents, such as carbon tetrachloride, N-chlorosuccinimide, and thionyl chloride; bromination reagents, such as carbon tetrabromide, N-bromosuccinimide, phosphorus tribromide, and phosphorus bromide. As the metalation reagent, it is the same as those of the above.

In case of the sulfonium methyl group, it can be prepared by a method of reacting the above compound of monohalogenated methyl group with a sulfide.

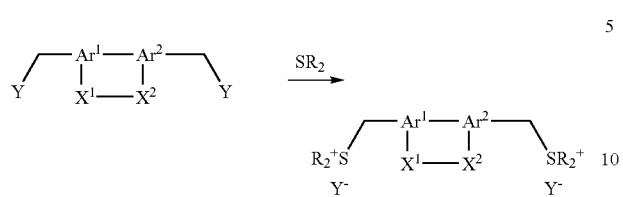

As the sulfide, exemplified are: dialkyl sulfides, such as dimethyl sulfide and diethyl sulfide; cyclic sulfides, such as tetrahydrothiophene; and diaryl sulfides, such as diphenyl sulfide, and ditollyl sulfide, etc.

In case of the phosphonium methyl groups, they can be synthesized by a method of reacting the above compound of monohalogenated methyl group with a phosphine, etc.

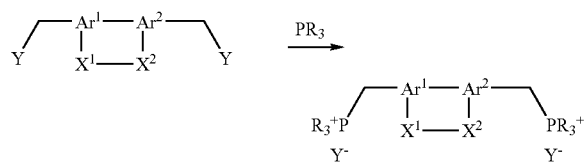

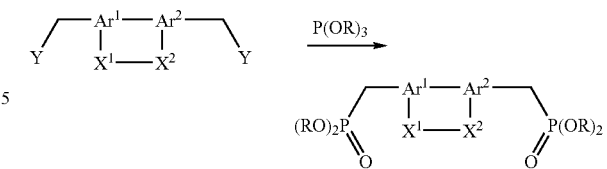

As the phosphates, trimethyl phosphite, triethyl phosphite, etc. are exemplified.

In case of the vinyl groups, they can be synthesized by a Heck reaction of the compound of $Y^1$-$Y^4$ as the halogen atom, with ethylene.

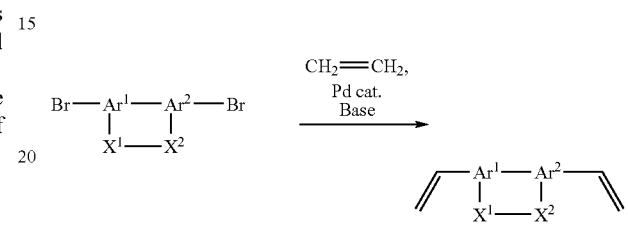

The compounds represented by the above formula (16-2), can be synthesized, for example, from compounds wherein $Y^1$ and $Y^2$ are bromine atoms, among the corresponding compounds represented by (16-1). Reaction schemes are shown below. Similarly, the compounds represented by (2-2), (17-2), (17-3), (18-2), (18-3), (20-2), (20-3), (23-2), (23-3), (24-2), (24-3), (25-2), and (25-3) can be synthesized.

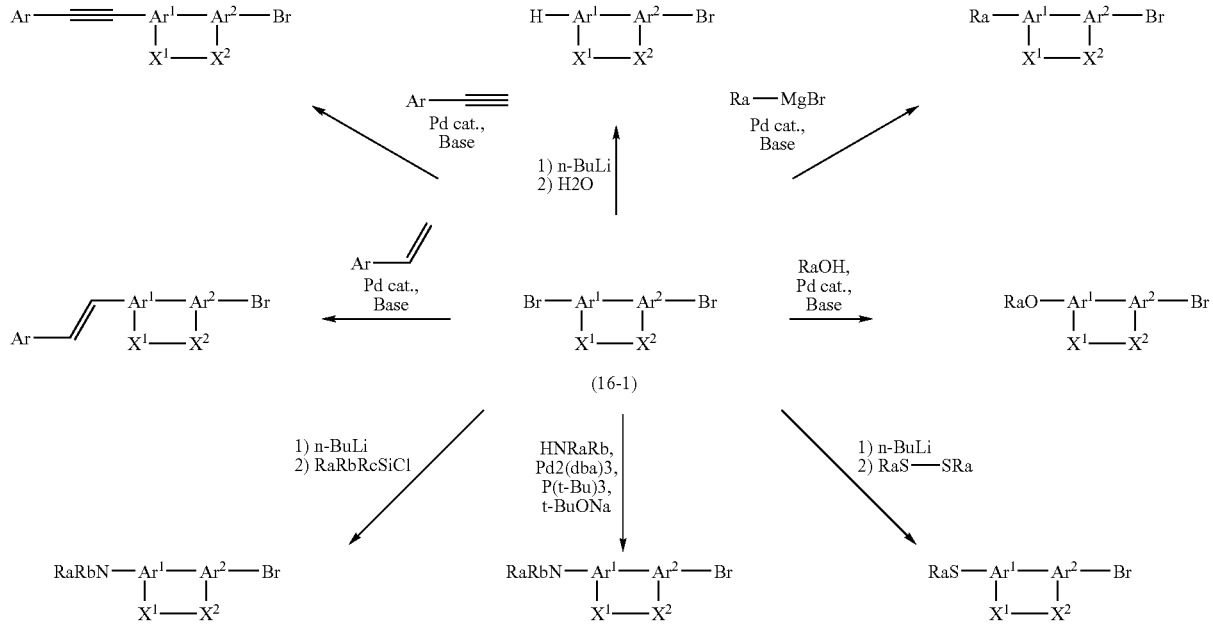

As the phosphine, exemplified are: trialkyl phosphines, such as trimethyl phosphine, triethyl phosphine, and tri-t-butyl phosphine; triarylalkyl phosphines, such as tribenzyl phosphine, etc.; and triaryl phosphines, such as triphenyl phosphine, and tritolyl phosphine, etc.

In case of the phosphonate methyl groups, they can be synthesized by a method of reacting the above compound of monohalogenated methyl group with a phosphite.

As the method of condensation polymerization, in case of having vinylene group in the main chain, it can be produced using other monomers according to requirements, for example, by a method described in JP-A-5-202355.

That is, exemplified are: [1] polymerization by Wittig reaction of a compound having aldehyde group and a compound having a phosphonium base, [2] polymerization by Wittig reaction of a compound having an aldehyde group and a phosphonium base, [3] polymerization by Heck reaction of a compound having a vinyl group and a compound having a halogen atom, [4] polymerization by Heck reaction of a compound having a vinyl group and a halogen atom, [5] polymerization by Horner-Wadsworth-Emmons method of a compound having an aldehyde group and a compound having an alkylphosphonate group, [6] polymerization by Horner-Wadsworth-Emmons method of a compound having an aldehyde group and an alkylphosphonate group, [7] polycondensation by dehydrohalogenation method of a compound having two or more of halogenated methyl groups, [8] polycondensation by sulfonium-salt decomposition method of a compound having two or more sulfonium-salt groups, [9] polymerization by Knoevenagel reaction of a compound having an aldehyde group and a compound having an acetonitrile group, [10] polymerization by Knoevenagel reaction of a compound having an aldehyde group and an acetonitrile group, and [11] polymerization by McMurry reaction of a compound having two or more aldehyde groups.

The polymerizations of the above [1]-[11] are schematically shown below.

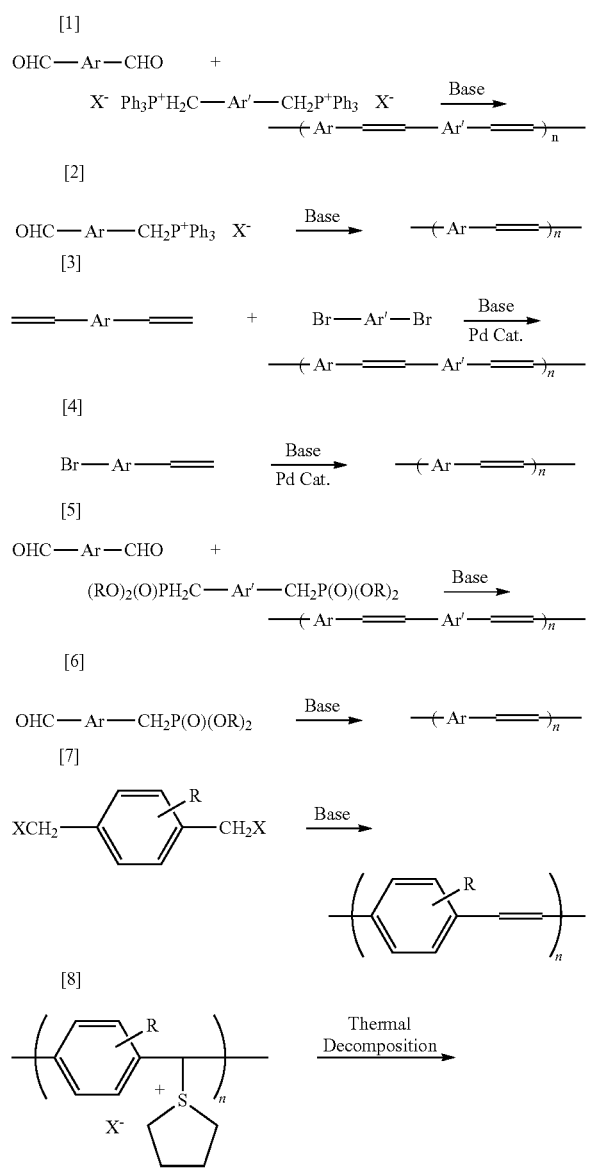

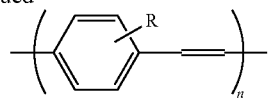

[9]

[10]

[11]

In case of not having vinylene group in the main chain, as the manufacture method of the polymer compound of the present invention, exemplified are: [12] a method of polymerization by Suzuki coupling reaction, [13] a method of polymerization by Grignard reaction, [14] a method of polymerization by Ni(0) catalyst, [15] a method of polymerization by an oxidizing agent such as $FeCl_3$, etc. and an electrochemical oxidization polymerization, [16] a method of decomposition of an intermediate polymer having an appropriate leaving group, etc.

The above polymerization methods [12]-[16] are schematically shown below.

[12]

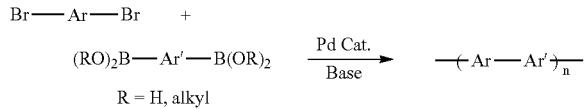

[13]

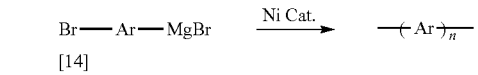

[14]

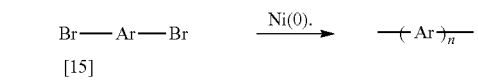

[15]

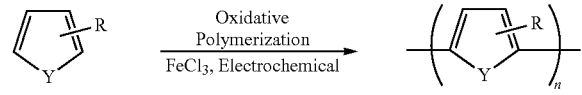

Y = S, NH

[16]

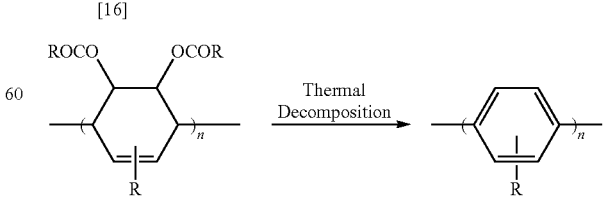

Among these, the polymerization by Wittig reaction, polymerization by Heck reaction, polymerization by Horner- Wadsworth-Emmons method, polymerization by Knoevenagel reaction, and Suzuki coupling reaction, method of polymerization by Grignard reaction, and method of polymerization by Ni(0) catalyst are preferable, since it is easy to control the structures. The method of polymerization by Suzuki coupling reaction, method of polymerization by Grignard reaction, and method of polymerization by Ni(0) catalyst are more preferable, in view of availability of raw materials, and easiness of polymerization reaction operation.

Specifically, a monomer is dissolved in an organic solvent according to necessity, and can be reacted using alkali or appropriate catalyst, at a temperature between the boiling point and the melting point of the organic solvent.

Known methods which can be used are described in: Organic Reactions, Volume 14, page 270-490, John Wiley & Sons, Inc., 1965; Organic Reactions, Volume 27, page 345-390, John Wiley & Sons, Inc., 1982; Organic Syntheses, Collective Volume VI, page 407-411, John Wiley & Sons, Inc., 1988; Chemical Review (Chem. Rev.), Volume 95, page 2457 (1995); Journal of Organometallic Chemistry (J. Organomet. Chem.), Volume 576, page 147 (1999); Jounal of Praktical Chemistry (J. Prakt. Chem.), Volume 336, page 247 (1994); and Macromolecular Chemistry, Macromolecular Symposium (Makromol. Chem., Macromol. Symp.), Volume 12th, page 229 (1987).

It is preferable that the organic solvent used is subjected to a deoxygenation treatment sufficiently and the reaction is progressed under an inert atmosphere, generally for suppressing a side reaction, though the treatment differs depending on compounds and reactions used. Further, it is preferable to conduct a dehydration treatment likewise. However, this is not applicable in the case of a reaction in a two-phase system with water, such as a Suzuki coupling reaction.

For the reaction, alkali or a suitable catalyst is added. It can be selected according to the reaction to be used. It is preferable that the alkali or the catalyst can be dissolved in a solvent used for a reaction. Example of the method for mixing the alkali or the catalyst, include a method of adding a solution of alkali or a catalyst slowly, to the reaction solution with stirring under an inert atmosphere of argon, nitrogen, etc. or conversely, a method of adding the reaction solution to the solution of alkali or a catalyst slowly.

When these polymeric light-emitting substances of the present invention are used for a light-emitting materials of a polymer LED, the purity thereof exerts an influence on light emitting property, therefore, it is preferable that a monomer is purified by a method such as distillation, sublimation purification, re-crystallization and the like before being polymerized. Further, it is preferable to conduct a purification treatment such as re-precipitation purification, chromatographic separation and the like after the polymerization.

In the manufacture method of the polymer compound of the present invention, each of monomers may be mixed together, or may be mixed dividedly, if necessary, to react.

The reaction conditions are described, more specifically. In case of Wittig reaction, Horner reaction, Knoevengel reaction, etc., the reaction is carried out using alkali in an equivalent amount to the functional groups of the monomer, preferably 1-3 equivalent amounts. As the alkali, without being limited especially, can be used are: metal alcoholates, such as potassium-t-butoxide, sodium-t-butoxide, sodium ethylate, and lithium methylate; hydride reagents, such as sodium hydride; amides, such as and sodium amide; etc. As the solvent, N,N-dimethylformamide, tetrahydrofuran, dioxane, toluene, etc. are used. As the reaction temperature, usually it can be conducted at from room temperature to about 150° C. The reaction time is, for example, from 5 minutes to 40 hours, which is just necessary to conduct the polymerization sufficiently. And since it is not necessary to be left for a long time after the end of the reaction, it is preferably from 10 minutes to 24 hours. In the reaction, if the concentration is too small, the efficiency of the reaction will become difficult, and if it is too large, the reaction control will become difficult, accordingly, it is appropriately selected in the range of about 0.01 wt % and the maximum dissolvable concentration. Usually, it is in the range of 0.1 wt %-20 wt %. In the case of Heck reaction, monomers are reacted in existence of a base, such as triethyl amine, using a palladium catalyst. Using a solvent having comparatively high boiling point, such as N,N-dimethylformamide or N-methylpyrrolidone, the reaction temperature is about 80-160° C., and the reaction time is about 1 hour to 100 hours.

In case of Suzuki coupling reaction, it is conducted with using, for example, palladium [tetrakis(triphenyl phosphine)], or palladium acetate, as a catalyst; and adding an inorganic base, such as potassium carbonate, sodium carbonate, and barium hydroxide, and an organic base, such as triethyl amine, and inorganic salt, such as cesium fluoride, in an amount equivalent to the monomers, preferably 1-10 equivalent. The reaction may be conducted in a two-phase system using an inorganic salt as a solution. As the solvent, N,N-dimethylformamide, toluene, dimethoxy ethane, tetrahydrofuran, etc., are exemplified. Although it depends also on a solvent, the temperature is preferably about 50-160° C., and may be raised to the boiling point of the solvent and refluxed. The reaction time is about from 1 hour to 200 hours.

In the case of Grignard reaction, exemplified is a reaction in which a Grignard reagent solution is prepared by reacting a halogenated compound with metal Mg in an ether solvent, such as tetrahydrofuran, diethyl ether, and dimethoxy ethane, and a monomer solution prepared separately are mixed, and after adding a nickel or a palladium catalyst with taking care of violent reaction, the reaction is conducted with raising the temperature and refluxing. Grignard reagent is used in an amount of equivalent to the monomers, preferably 1 to 1.5 equivalents, more preferably, 1 to 1.2 equivalents. In cases of polymerizing by other methods, the reactions can be conducted according to known methods.

Among the compounds represented by the above formula (18), the compound represented by the below formula (18-1) can be prepared by reacting the compound represented by the below formula (19) in existence of acid.

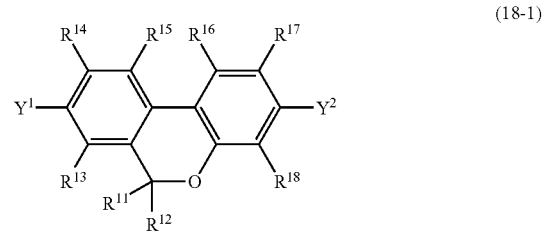
(18-1)

(In the formula, $R^{11}$-$R^{18}$, $Y^1$ and $Y^2$ are the same as those of the above.)

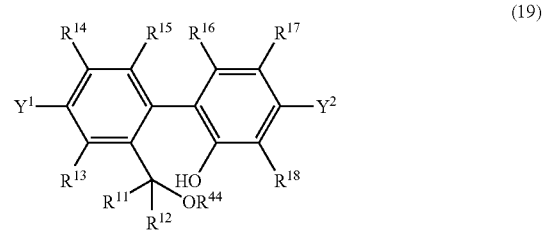
(19)

(In the formula, $R^{11}$-$R^{18}$, $Y^1$ and $Y^2$ are the same as those of the above. $R^{44}$ represents a hydrogen atom, alkyl group, aryl group, arylalkyl group, or monovalent heterocyclic group.)

As the acid used for the synthesis of the above (18-1), either of Lewis acid or Bronsted acid may be used, and examples there of include hydrogen chloride, hydrogen bromide, hydrofluoric acid, sulfuric acid, nitric acid, formic acid, acetic acid, propionic acid, oxalic acid, benzoic acid, boron fluoride, aluminum chloride, tin chloride (IV), iron chloride (II), titanium tetrachloride, or mixtures thereof.

The method of the reaction is not limited, and it can be carried out in existence of a solvent. The reaction temperature is preferably between −80° C. and the boiling point of the solvent.

As the solvent used for the reaction, exemplified are: saturated hydrocarbons, such as pentane, hexane, heptane, octane, and cyclohexane; unsaturated hydrocarbons, such as benzene, toluene, ethylbenzene, and xylene; halogenated saturated hydrocarbons, such as carbon tetrachloride, chloroform, dichloromethane, chloro butane, bromobutane, chloropentane, bromopentane, chlorohexane, bromohexane, chlorocyclohexane, and bromo cyclohexane; halogenated unsaturated hydrocarbons, such as chlorobenzene, dichloro benzene, and trichlorobenzene; alcohols, such as methanol, ethanol, propanol, isopropanol, butanol, t-butyl alcohol; carboxylic acids, such as, formic acid, acetic acid, and propionic acid; ethers, such as, dimethyl ether, diethyl ether, methyl-t-butyl ether, tetrahydrofuran, tetrahydropyran, and dioxane; and inorganic acids, such as hydrogen chloride, hydrogen bromide, hydrofluoric acid, sulfuric acid, and nitric acid, etc. These may be used as a single solvent or a mixed solvent thereof.

After the reaction, it can be obtained by usual post-treatment, for example, such as, after quenching with water, it is extracted by an organic solvent, and the solvent is distilled off. After the isolation of the product, purification can be conducted by a method, such as fractionation by chromatography, and recrystallization.

Among the compounds represented by the above formula (19), it is preferable that $X^1$ and $X^2$ are each independently a halogen atom, alkylsulfonate group, arylsulfonate group, arylalkylsulfonate group, boric ester group, or boric acid group, in view of easiness of synthesis and functional-group conversion.

The compound represented by the above formula (19) can be synthesized by reacting the compound represented by the below formula (20), with a Grignard reagent, or an organo Li compound.

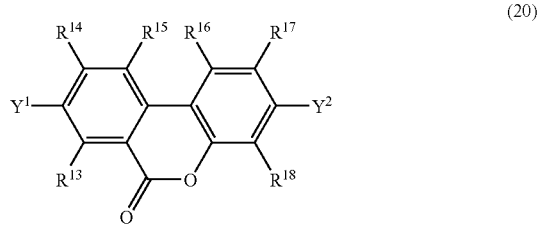

(20)

(In the formula, $R^{13}$-$R^{18}$, $Y^1$ and $Y^2$ represent the same meaning as the above.)

As the Grignard reagent used for the above reaction, exemplified are: methyl magnesium chloride, methyl magnesium bromide, ethyl magnesium chloride, ethyl magnesium bromide, propyl magnesium chloride, propyl magnesium bromide, butyl magnesium chloride, butyl magnesium bromide, hexyl magnesium bromide, octyl magnesium bromide, decyl magnesium bromide, allyl magnesium chloride, allyl magnesium bromide, benzyl magnesium chloride, phenyl magnesium bromide, naphtyl magnesium bromide, tolyl magnesium bromide, etc.

As the organo Li compound, exemplified are: methyl lithium, ethyl lithium, propyl lithium, butyl lithium, phenyl lithium, naphtyl lithium, benzyl lithium, tolyl lithium, etc.

The method of the reaction is not limited, and it can be carried out in the existence of a solvent under inert gas atmosphere, such as nitrogen and argon. The reaction temperature is preferably from −80° C. to the boiling point of the solvent.

As the solvent used for the reaction, exemplified are: saturated hydrocarbons, such as pentane, hexane, heptane, octane, and cyclohexane; unsaturated hydrocarbon, such as benzene, toluene, ethyl benzene, and xylene; and ethers, such as dimethyl ether, diethyl ether, methyl-t-butyl ether, tetrahydrofuran, tetrahydropyran, and dioxane. These may be used as a single solvent or a mixed solvent thereof.

After the reaction, it can be obtained by usual post-treatment, for example, such as, after quenching with water, it is extracted by an organic solvent, and the solvent is distilled off. After the isolation of the product, purification can be conducted by a method, such as fractionation by chromatography, and recrystallization.

Moreover, in the present invention, among the compounds represented by the above formula (20), the compound represented by the below formula (22) can be produced by reacting the compound represented by a below formula (21) with sodium perborate.

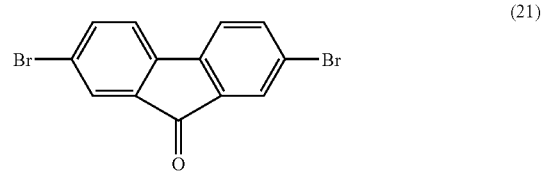

(21)

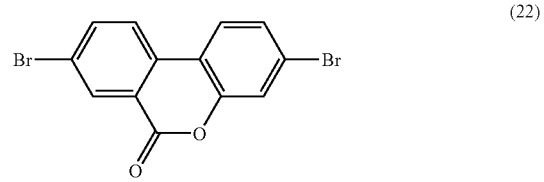

(22)

The method of reaction can be conducted in existence of carboxylic acid solvents, such as acetic acid, trifluoro acetic acid, propionic acid, and butyric acid. In order to improve the solubility, it is preferable to carry out in mixed solvent, such as, with carbon tetrachloride, chloroform, dichloromethane, benzene, and toluene. The reaction temperature is preferably 0° C. to a boiling point of the solvent.

After the reaction, it can be obtained by usual post-treatment, for example, such as, after quenching with water, it is extracted by an organic solvent, and the solvent is distilled off. After the isolation of the product, purification can be conducted by a method, such as fractionation by chromatography, and recrystallization.

As the base used, exemplified are: metal hydrides, such as lithium hydride, sodium hydride, and potassium hydride; organo lithium reagents, such as methyl lithium, n-butyl lithium, sec-butyl lithium, t-butyl lithium, phenyl lithium; Grignard reagents, such as, methyl magnesium bromide, methyl magnesium chloride, ethyl magnesium bromide, ethyl magnesium chloride, allyl magnesium bromide, allyl magnesium chloride, phenyl magnesium bromide, benzyl magnesium chloride; alkali metal amides, such as, lithium diisopropyl amide, lithium hexa methyl disilazide, sodium hexa methyl disilazide, potassium hexamethyl disilazide; inorganic-salt groups, such as, lithium hydroxide, sodium hydroxide, potassium hydroxide, lithium carbonate, sodium carbonate, and potassium carbonate, or mixtures thereof.

As the halogenated compound, exemplified are: methyl chloride, methyl bromide, methyl iodide, ethyl chloride, ethyl bromide, ethyl iodide, propyl chloride, propyl bromide, propyl iodide, butyl chloride, butyl bromide, butyl iodide, hexyl chloride, hexyl bromide, octyl chloride, octyl bromide, decyl chloride, allyl chloride, allyl bromide, benzyl chloride, benzyl bromide, benzyl chloride, benzyl bromide, tolyl chloride, tolyl bromide, tolyl iodide, anisyl chloride, anisyl bromide, anisyl iodide, etc.

The reaction can be carried out in existence of a solvent under inert gas atmosphere, such as nitrogen and argon. The reaction temperature is preferably −80° C. to a boiling point of the solvent.

As the solvent used for reaction, exemplified are: saturated hydrocarbons, such as pentane, hexane, heptane, octane, cyclohexane; unsaturated hydrocarbons, such as, benzene, toluene, ethyl benzene, xylene; and ethers, such as dimethyl ether, diethyl ether, methyl-t-butyl ether, tetrahydrofuran, tetrahydropyran, dioxane; single solvent; amines, such as, trimethylamine, triethylamine, N,N,N',N'-tetramethylethylene diamine, pyridine; amides, such as, N,N-dimethylformamide, N,N-dimethyl acetamide, N,N-diethyl acetamide, N-methylmorpholine oxide, and N-methyl-2-pyrrolidone; and these may be used as a single solvent or a mixed solvent thereof.

After the reaction, it can be obtained by usual post-treatment, for example, such as, after quenching with water, it is extracted by an organic solvent, and the solvent is distilled off. After the isolation of the product, purification can be conducted by a method, such as fractionation by chromatography, and recrystallization.

The compounds represented by the above formula (2-1), (16-1), (17-1), (18-1), (23-1) or (24-1), can be converted to medical and agricultural intermediate products, or organic electronic materials, by polymerization reaction, after derivation of $Y^1$-$Y^6$ parts thereof.

The polymer compound of the present invention can be used also as a material for electronic devices, and can be used also as an organic semiconductor for organic transistors, a coloring matter for laser, a material for an organic solar-cell, etc.

Next, the use of the polymer compound of the present invention is explained.

The polymer compound of the present invention has fluorescence or phosphorescence in the solid state, and it can be used as a light emitting polymer (high molecular weight light-emitting material). Moreover, this polymer compound has excellent electronic transportation ability, and can be used suitably as a polymer-LED material, or a charge transporting material.

The polymer LED using this light emitting polymer is a high performance polymer LED, which can be driven efficiently at a low-voltage.

Therefore, the polymer LED of the present invention can be preferably used for apparatus, such as, a liquid crystal display as a back light, a curved or flat light source for lighting, a segment display, a dot matrix flat panel display, etc.

The polymer compound of the present invention can be used also for coloring matter for laser, an organic solar-cell material, an organic semiconductor for organic transistors, a light emitting thin film, and conductive thin-film materials, such as a conductive thin film, and an organic semiconductor thin film.

Next, the polymer LED of the present invention is explained.

The polymer LED of the present invention comprises an organic layer between the electrodes consisting of an anode and a cathode, and the organic layer contains the polymer compound of the present invention.

The organic layers may be any of a light emitting layer, a hole transporting layer, and an electron transporting layer, and it is preferable that the organic layer is a light emitting layer.

Here, the light emitting layer means a layer having a function of light-emission, the hole transporting layer means a layer having a function of hole-transportation, and the electron transporting layer means a layer having a function to electron-transport. The electron transporting layer and the hole transporting layer are called as a charge transporting layer, generically. Two or more layers of the light emitting layer, the hole transporting layer, and the electron transporting layer, may be used, each independently.

When an organic layer is a light emitting layer, the light emitting layer of organic layer may contain further a hole transporting material, an electron transporting material, or a light-emitting material. Here, the light-emitting material means a material showing fluorescence and/or phosphorescence.

When the polymer compound of the present invention, and a hole transporting material are mixed, the mixing rate of the hole transporting material is 1 wt % to 80 wt % based on the whole of the mixture, and it is preferably 5 wt % to 60 wt %. When the polymer material of the present invention and the electron transporting material are mixed, the mixing rate of the electron transporting material is 1 wt % to 80 wt % based on the whole of the mixture, and it is preferably 5 wt % to 60 wt %. Furthermore, when the polymer compound of the present invention and the light-emitting material is mixed, the mixing rate of the light-emitting material is 1 wt % to 80 wt % based on the whole of the mixture, and it is preferably 5 wt % to 60 wt %. When the polymer compound of the present invention, the light-emitting material, the hole transporting material and/or the electron transporting material are mixed, the mixing rate of the light-emitting material is 1 wt % to 50 wt % based on the whole of the mixture, and preferably, it is 5 wt % to 40 wt %; the total of the hole transporting material and the electron transporting material is 1 wt % to 50 wt %, and preferably, it is 5 wt % to 40 wt %; and the amount of the polymer compound of the present invention is 99 wt % to 20 wt %.

As the hole transporting material, electron transporting material, and light-emitting material to be mixed, well-known low molecule compounds and well-known polymer compounds can be used, and it is preferable to use polymer compounds.

As the polymer compounds, for the hole transporting material, the electron transporting material and the light-emitting material, exemplified are, polyfluoren, derivative thereof, copolymer thereof, polyarylene, derivative thereof, copolymer thereof, polyarylene vinylene, derivative thereof, copolymer thereof, aromatic amine, and (co)polymer of its derivative, and they are disclosed in: WO 99/13692, WO 99/48160, GB2340304A, WO 00/53656, WO 01/19834, WO 00/55927, GB2348316 and WO 00/46321, WO 00/06665, WO 99/54943, WO 99/54385, U.S. Pat. No. 5,777,070 and WO 98/06773, WO 97/05184, WO 00/35987, WO 00/53655, WO 01/34722, WO 99/24526, WO 00/22027, WO 00/22026, WO 98/27136, U.S. Pat. No. 5,763,636 and WO 98/21262, U.S. Pat. No. 5,741,921, WO 97/09394, WO 96/29356, WO 96/10617, EP0707020 and WO 95/07955, JP-A-2001-181618, JP-A-2001-123156, JP-A-2001-3045, JP-A-2000-351967, JP-A-2000-303066, JP-A-2000-299189, JP-A-2000-252065, JP-A-2000-136379, JP-A-2000-104057, JP-A-2000-80167, JP-A-10-324870, JP-A-10-114891, JP-A-9-111233, JP-A-9-45478 etc.

As the fluorescent material of low molecular weight, there can be used, for example, naphthalene derivatives, anthracene or derivatives thereof, perylene or derivatives thereof; dyes such as polymethine dyes, xanthene dyes, coumarine dyes, cyanine dyes; metal complexes of 8-hydroxyquinoline or derivatives thereof, aromatic amine, tetraphenylcyclopentane or derivatives thereof, or tetraphenylbutadiene or derivatives thereof, and the like.

Specifically, there can be used known compounds such as those described in JP-A Nos. 57-51781, 59-195393 and the like, for example.

The polymer compound of the present invention can be mixed with and can be used as a light-emitting material or a charge transporting material. Here, two or more kinds of polymer compounds of the present invention may be used.

The ratio of at least one kind of material selected from a hole transporting material, an electron transporting material and a light-emitting material, to the polymer compound of the present invention can be decided according to the use, and in the case of the use of a light-emitting material, the same ratio on the above light emitting layer is preferable.

As for the thickness of the light emitting layer in the polymer LED of the present invention, the optimum value differs depending on material used, and may properly be selected so that the driving voltage and the light emitting efficiency become optimum values, and for example, it is from 1 nm to 1 μm, preferably from 2 nm to 500 nm, further preferably from 5 nm to 200 nm.

As for a method of forming a light emitting layer, for example, a method of film formation from solution is exemplified. As for the film-forming method from solution, there can be used coating methods, such as spin coating method, casting method, micro gravure coating method, gravure coating method, bar-coating method, roll coating method, wire-bar coating method, dip coating method, spray coating method, screen stenciling method, flexography method, offset printing method, and ink-jet printing method. At the point that a pattern forming and multicolored printing are easy, the printing methods, such as the screen stenciling method, flexography method, offset-printing method, and ink-jet printing method, are preferable.

As the ink composition used for printing method etc., at least one kind of the polymer compound of the present invention should just be contained, and additives, such as a hole transporting material, an electron transporting material, a light-emitting material, a solvent, a stabilizer, etc. may be contained in addition to the polymer compound of the present invention.

The rate of the polymer compound of the present invention in the ink composition is 20 wt % to 100 wt % based on the total weight of the composition except the solvent, and preferably 40 wt % to 100 wt %.

The rate of a solvent in case that the ink composition contains a solvent, is 1 wt % to 99.9 wt % based on the total weight of the composition, and preferably 60 wt % to 99.5 wt %, and further preferably, 80 wt % to 99.0 wt %.

The viscosity of the ink composition differs depending on the printing methods, but when the ink composition goes through discharging apparatus, such as in the ink jet printing method, the viscosity is preferably in the range of 1 to 20 mPa·s at 25° C., in order to prevent clogging and flight bending at the time of discharge.

The solvent used for the ink composition is not especially restricted, but preferably, it can dissolve or disperse uniformly the materials constituting said ink composition, other than the solvent itself. When the material constituting the ink composition is soluble in a non-polar solvent, as the solvent, exemplified are: chlorine solvents, such as chloroform, methylene chloride, and dichloro ethane; ether solvents, such as tetrahydrofuran; aromatic hydrocarbon solvents, such as toluene, and xylene; ketone solvents, such as acetone, and methyl ethyl ketone; and ester type solvents, such as, ethyl acetate, butyl acetate, and ethyl cellosolve acetate.

As the polymer LED of the present invention, exemplified are: a polymer LED having an electron transporting layer between a cathode and a light emitting layer; a polymer LED having an hole transporting layer between an anode and a light emitting layer; and a polymer LED having an electron transporting layer between an cathode and a light emitting layer, and a hole transporting layer between an anode and a light emitting layer.

For example, the following structures a) to d) are specifically exemplified.
a) anode/light emitting layer/cathode
b) anode/hole transporting layer/light emitting layer/cathode
c) anode/light emitting layer/electron transporting layer/cathode
d) anode/hole transporting layer/light emitting layer/electron transporting layer/cathode
(wherein, "/" indicates adjacent lamination of layers. Hereinafter, the same).

When the polymer LED of the present invention has a hole transporting layer, as the hole transporting materials used, there are exemplified polyvinylcarbazole or derivatives thereof, polysilane or derivatives thereof, polysiloxane derivatives having an aromatic amine in the side chain or the main chain, pyrazoline derivatives, arylamine derivatives, stilbene derivatives, triphenyldiamine derivatives, polyaniline or derivatives thereof, polythiophene or derivatives thereof, polypyrrole or derivatives thereof, poly(p-phenylenevinylene) or derivatives thereof, poly(2,5-thienylenevinylene) or derivatives thereof, or the like.

Specific examples of the hole transporting material include those described in JP-A Nos. 63-70257, 63-175860, 2-135359, 2-135361, 2-209988, 3-37992 and 3-152184.

Among them, as the hole transporting materials used in the hole transporting layer, preferable are polymer hole transporting materials such as polyvinylcarbazole or derivatives thereof, polysilane or derivatives thereof, polysiloxane derivatives having an aromatic amine compound group in the side chain or the main chain, polyaniline or derivatives thereof, polythiophene or derivatives thereof, poly(p-phenylenevinylene) or derivatives thereof, poly(2,5-thienylenevinylene) or derivatives thereof, or the like, and further preferable are polyvinylcarbazole or derivatives thereof, polysilane or derivatives thereof and polysiloxane derivatives having an aromatic amine compound group in the side chain or the main chain.

As a hole transporting material of low molecular weight compound, a pyrazoline derivative, an arylamine derivative, a stilbene derivative, and a triphenyldiamine derivative, are exemplified. In the case of a hole transporting material having lower molecular weight, it is preferably dispersed in a polymer binder for use.

The polymer binder to be mixed is preferably that which does not extremely disturb a charge transporting property, and that does not have strong absorption of a visible light is suitably used. As such polymer binder, poly(N-vinylcarbazole), polyaniline or derivatives thereof, polythiophene or derivatives thereof, poly(p-phenylene vinylene) or derivatives thereof, poly(2,5-thienylene vinylene) or derivatives thereof, polycarbonate, polyacrylate, poly(methyl acrylate), poly(methyl methacrylate), polystyrene, poly(vinyl chloride), polysiloxane and the like are exemplified.

Poly(N-vinyl carbazole) or derivative thereof can be obtained, for example, by cation polymerization or radical polymerization of a vinyl monomer.

As the polysilane or derivatives thereof, there are exemplified compounds described in Chem. Rev., 89, 1359 (1989) and GB 2300196 published specification, and the like. For synthesis, methods described in them can be used, and a Kipping method can be suitably used particularly.

As the polysiloxane or derivatives thereof, those having the structure of the above-described hole transporting material having lower molecular weight in the side chain or main chain, since the siloxane skeleton structure has poor hole transporting property. Particularly, there are exemplified those having an aromatic amine having hole transporting property in the side chain or main chain.

The method for forming a hole transporting layer is not restricted, and in the case of a hole transporting layer having lower molecular weight, a method in which the layer is formed from a mixed solution with a polymer binder is exemplified. In the case of a polymer hole transporting material, a method in which the layer is formed from a solution is exemplified.

The solvent used for the film forming from a solution is not particularly restricted providing it can dissolve a hole transporting material. As the solvent, there are exemplified chlorine solvents such as chloroform, methylene chloride, dichloroethane and the like, ether solvents such as tetrahydrofuran and the like, aromatic hydrocarbon solvents such as toluene, xylene and the like, ketone solvents such as acetone, methyl ethyl ketone and the like, and ester solvents such as ethyl acetate, butyl acetate, ethylcellosolve acetate and the like.

As the film forming method from a solution, there can be used coating methods such as a spin coating method, casting method, micro gravure coating method, gravure coating method, bar coating method, roll coating method, wire bar coating method, dip coating method, spray coating method, screen printing method, flexo printing method, offset printing method, inkjet printing method and the like, from a solution.

Regarding the thickness of the hole transporting layer, the optimum value differs depending on material used, and may properly be selected so that the driving voltage and the light emitting efficiency become optimum values, and at least a thickness at which no pin hole is produced is necessary, and too large thickness is not preferable since the driving voltage of the device increases. Therefore, the thickness of the hole transporting layer is, for example, from 1 nm to 1 µm, preferably from 2 nm to 500 nm, further preferably from 5 nm to 200 nm.

When the polymer LED of the present invention has an electron transporting layer, known compounds are used as the electron transporting materials, and there are exemplified oxadiazole derivatives, anthraquinonedimethane or derivatives thereof, benzoquinone or derivatives thereof, naphthoquinone or derivatives thereof, anthraquinone or derivatives thereof, tetracyanoanthraquinodimethane or derivatives thereof, fluorenone derivatives, diphenyldicyanoethylene or derivatives thereof, diphenoquinone derivatives, or metal complexes of 8-hydroxyquinoline or derivatives thereof, polyquinoline and derivatives thereof, polyquinoxaline and derivatives thereof, polyfluorene or derivatives thereof, and the like.

Specifically, there are exemplified those described in JP-A Nos. 63-70257, 63-175860, 2-135359, 2-135361, 2-209988, 3-37992 and 3-152184.

Among them, oxadiazole derivatives, benzoquinone or derivatives thereof, anthraquinone or derivatives thereof, or metal complexes of 8-hydroxyquinoline or derivatives thereof, polyquinoline and derivatives thereof, polyquinoxaline and derivatives thereof, polyfluorene or derivatives thereof are preferable, and 2-(4-biphenyl)-5-(4-t-butylphenyl)-1,3,4-oxadiazole, benzoquinone, anthraquinone, tris(8-quinolinol)aluminum and polyquinoline are further preferable.

The method for forming the electron transporting layer is not particularly restricted, and in the case of an electron transporting material having lower molecular weight, a vapor deposition method from a powder, or a method of film-forming from a solution or melted state is exemplified, and in the case of a polymer electron transporting material, a method of film-forming from a solution or molten state is exemplified, respectively. At the time of film-forming from a solution or molten state, the above polymer binder can be used together.

The solvent used in the film-forming from a solution is not particularly restricted provided it can dissolve electron transporting materials and/or polymer binders. As the solvent, there are exemplified chlorine solvents such as chloroform, methylene chloride, dichloroethane and the like, ether solvents such as tetrahydrofuran and the like, aromatic hydrocarbon solvents such as toluene, xylene and the like, ketone solvents such as acetone, methyl ethyl ketone and the like, and ester solvents such as ethyl acetate, butyl acetate, ethylcellosolve acetate and the like.

As the film-forming method from a solution or melted state, there can be used coating methods such as a spin coating method, casting method, micro gravure coating method, gravure coating method, bar coating method, roll coating method, wire bar coating method, dip coating method, spray coating method, screen printing method, flexo printing method, offset printing method, inkjet printing method and the like.

Regarding the thickness of the electron transporting layer, the optimum value differs depending on material used, and may properly be selected so that the driving voltage and the light emitting efficiency become optimum values, and at least a thickness at which no pin hole is produced is necessary, and too large thickness is not preferable since the driving voltage of the device increases. Therefore, the thickness of the electron transporting layer is, for example, from 1 nm to 1 µm, preferably from 2 nm to 500 nm, further preferably from 5 nm to 200 nm.

Of charge transporting layers disposed adjacent to an electrode, that having function to improve charge injecting efficiency from the electrode and having effect to decrease driving voltage of an device are particularly called sometimes a charge injecting layer (hole injecting layer, electron injecting layer) in general.

For enhancing adherence with an electrode and improving charge injection from an electrode, the above-described charge injecting layer or insulation layer having a thickness of 2 nm or less may also be provided adjacent to an electrode, and further, for enhancing adherence of the interface, preventing mixing and the like, a thin buffer layer may also be inserted into the interface of a charge transporting layer and light emitting layer.

The order and number of layers laminated and the thickness of each layer can be appropriately applied while considering light emitting efficiency and life of the device.

In the present invention, as the polymer LED having a charge injecting layer (electron injecting layer, hole injecting layer) provided, there are listed a polymer LED having a charge injecting layer provided adjacent to a cathode and a polymer LED having a charge injecting layer provided adjacent to an anode.

For example, the following structures e) to p) are specifically exemplified.

e) anode/charge injecting layer/light emitting layer/cathode
f) anode/light emitting layer/charge injecting layer/cathode
g) anode/charge injecting layer/light emitting layer/charge injecting layer/cathode
h) anode/charge injecting layer/hole transporting layer/light emitting layer/cathode
i) anode/hole transporting layer/light emitting layer/charge injecting layer/cathode
j) anode/charge injecting layer/hole transporting layer/light emitting layer/charge injecting layer/cathode
k) anode/charge injecting layer/light emitting layer/electron transporting layer/cathode
l) anode/light emitting layer/electron transporting layer/charge injecting layer/cathode
m) anode/charge injecting layer/light emitting layer/electron transporting layer/charge injecting layer/cathode
n) anode/charge injecting layer/hole transporting layer/light emitting layer/electron transporting layer/cathode
o) anode/hole transporting layer/light emitting layer/electron transporting layer/charge injecting layer/cathode
p) anode/charge injecting layer/hole transporting layer/light emitting layer/electron transporting layer/charge injecting layer/cathode As the specific examples of the charge injecting layer, there are exemplified layers containing an conducting polymer, layers which are disposed between an anode and a hole transporting layer and contain a material having an ionization potential between the ionization potential of an anode material and the ionization potential of a hole transporting material contained in the hole transporting layer, layers which are disposed between a cathode and an electron transporting layer and contain a material having an electron affinity between the electron affinity of a cathode material and the electron affinity of an electron transporting material contained in the electron transporting layer, and the like.

When the above-described charge injecting layer is a layer containing an conducting polymer, the electric conductivity of the conducting polymer is preferably $10^{-5}$ S/cm or more and $10^3$ S/cm or less, and for decreasing the leak current between light emitting pixels, more preferably $10^{-5}$ S/cm or more and $10^2$ S/cm or less, further preferably $10^{-5}$ S/cm or more and $10^1$ S/cm or less.

Usually, to provide an electric conductivity of the conducting polymer of $10^{-5}$ S/cm or more and $10^3$ S/cm or less, a suitable amount of ions are doped into the conducting polymer.

Regarding the kind of an ion doped, an anion is used in a hole injecting layer and a cation is used in an electron injecting layer. As examples of the anion, a polystyrene sulfonate ion, alkylbenzene sulfonate ion, camphor sulfonate ion and the like are exemplified, and as examples of the cation, a lithium ion, sodium ion, potassium ion, tetrabutyl ammonium ion and the like are exemplified.

The thickness of the charge injecting layer is for example, from 1 nm to 100 nm, preferably from 2 nm to 50 nm.

Materials used in the charge injecting layer may properly be selected in view of relation with the materials of electrode and adjacent layers, and there are exemplified conducting polymers such as polyaniline and derivatives thereof, polythiophene and derivatives thereof, polypyrrole and derivatives thereof, poly(phenylenevinylene) and derivatives thereof, poly(thienylene vinylene) and derivatives thereof, polyquinoline and derivatives thereof, polyquinoxaline and derivatives thereof, polymers containing aromatic amine structures in the main chain or the side chain, and the like, and metal phthalocyanine (copper phthalocyanine and the like), carbon and the like.

The insulation layer having a thickness of 2 nm or less has function to make charge injection easy. As the material of the above-described insulation layer, metal fluoride, metal oxide, organic insulation materials and the like are listed. As the polymer LED having an insulation layer having a thickness of 2 nm or less, there are listed polymer LEDs having an insulation layer having a thickness of 2 nm or less provided adjacent to a cathode, and polymer LEDs having an insulation layer having a thickness of 2 nm or less provided adjacent to an anode.

Specifically, there are listed the following structures q) to ab) for example.

q) anode/insulation layer having a thickness of 2 nm or less/light emitting layer/cathode
r) anode/light emitting layer/insulation layer having a thickness of 2 nm or less/cathode
s) anode/insulation layer having a thickness of 2 nm or less/light emitting layer/insulation layer having a thickness of 2 nm or less/cathode
t) anode/insulation layer having a thickness of 2 nm or less/hole transporting layer/light emitting layer/cathode
u) anode/hole transporting layer/light emitting layer/insulation layer having a thickness of 2 nm or less/cathode
v) anode/insulation layer having a thickness of 2 nm or less/hole transporting layer/light emitting layer/insulation layer having a thickness of 2 nm or less/cathode
w) anode/insulation layer having a thickness of 2 nm or less/light emitting layer/electron transporting layer/cathode
x) anode/light emitting layer/electron transporting layer/insulation layer having a thickness of 2 nm or less/cathode
y) anode/insulation layer having a thickness of 2 nm or less/light emitting layer/electron transporting layer/insulation layer having a thickness of 2 nm or less/cathode
z) anode/insulation layer having a thickness of 2 nm or less/hole transporting layer/light emitting layer/electron transporting layer/cathode
aa) anode/hole transporting layer/light emitting layer/electron transporting layer/insulation layer having a thickness of 2 nm or less/cathode
ab) anode/insulation layer having a thickness of 2 nm or less/hole transporting layer/light emitting layer/electron transporting layer/insulation layer having a thickness of 2 nm or less/cathode The substrate forming the polymer. LED of the present invention may preferably be that does not change in forming an electrode and layers of organic materials, and there are exemplified glass, plastics, polymer film, silicon substrates and the like. In the case of a opaque substrate, it is preferable that the opposite electrode is transparent or semitransparent.

Usually, at least one of the electrodes consisting of an anode and a cathode, is transparent or semitransparent. It is preferable that the anode is transparent or semitransparent.

As the material of this anode, electron conductive metal oxide films, semitransparent metal thin films and the like are used. Specifically, there are used indium oxide, zinc oxide, tin oxide, and films (NESA and the like) fabricated by using an electron conductive glass composed of indium/tin/oxide (ITO), indium/zinc/oxide and the like, which are metal oxide complexes, and gold, platinum, silver, copper and the like are used, and among them, ITO, indium/zinc/oxide, tin oxide are preferable. As the fabricating method, a vacuum vapor deposition method, sputtering method, ion plating method, plating method and the like are used. As the anode, there may also be used organic transparent conducting films such as polyaniline or derivatives thereof, polythiophene or derivatives thereof and the like.

The thickness of the anode can be appropriately selected while considering transmission of a light and electric conductivity, and for example, from 10 nm to 10 μm, preferably from 20 nm to 1 μm, further preferably from 50 nm to 500 nm.

Further, for easy charge injection, there may be provided on the anode a layer comprising a phthalocyanine derivative conducting polymers, carbon and the like, or a layer having an average film thickness of 2 nm or less comprising a metal oxide, metal fluoride, organic insulating material and the like.

As the material of a cathode used in the polymer LED of the present invention, that having lower work function is preferable. For example, there are used metals such as lithium, sodium, potassium, rubidium, cesium, beryllium, magnesium, calcium, strontium, barium, aluminum, scandium, vanadium, zinc, yttrium, indium, cerium, samarium, europium, terbium, ytterbium and the like, or alloys comprising two or more of them, or alloys comprising one or more of them with one or more of gold, silver, platinum, copper, manganese, titanium, cobalt, nickel, tungsten and tin, graphite or graphite intercalation compounds and the like. Examples of alloys include a magnesium-silver alloy, magnesium-indium alloy, magnesium-aluminum alloy, indium-silver alloy, lithium-aluminum alloy, lithium-magnesium alloy, lithium-indium alloy, calcium-aluminum alloy and the like. The cathode may be formed into a laminated structure of two or more layers.

The thickness of the cathode can be appropriately selected while considering transmission of a light and electric conductivity, and for example, from 10 nm to 10 μm, preferably from 20 nm to 1 μm, further preferably from 50 nm to 500 nm.

As the method for fabricating a cathode, there are used a vacuum vapor deposition method, sputtering method, lamination method in which a metal thin film is adhered under heat and pressure, and the like. Further, there may also be provided, between a cathode and an organic layer, a layer comprising an conducting polymer, or a layer having an average film thickness of 2 nm or less comprising a metal oxide, metal fluoride, organic insulation material and the like, and after fabrication of the cathode, a protective layer may also be provided which protects the polymer LED. For stable use of the polymer LED for a long period of time, it is preferable to provide a protective layer and/or protective cover for protection of the device in order to prevent it from outside damage.

As the protective layer, there can be used a polymeric compound, metal oxide, metal fluoride, metal borate and the like. As the protective cover, there can be used a glass plate, a plastic plate the surface of which has been subjected to lower-water-permeation treatment, and the like, and there is suitably used a method in which the cover is pasted with an device substrate by a thermosetting resin or light-curing resin for sealing. If space is maintained using a spacer, it is easy to prevent an device from being injured. If an inner gas such as nitrogen and argon is sealed in this space, it is possible to prevent oxidation of a cathode, and further, by placing a desiccant such as barium oxide and the like in the above-described space, it is easy to suppress the damage of an device by moisture adhered in the production process. Among them, any one or more means are preferably adopted.

The polymer LED of the present invention can be used for a flat light source, a segment display, a dot matrix display, and a liquid crystal display as a back light, etc.

For obtaining light emission in plane form using the polymer LED of the present invention, an anode and a cathode in the plane form may properly be placed so that they are laminated each other. Further, for obtaining light emission in pattern form, there is a method in which a mask with a window in pattern form is placed on the above-described plane light emitting device, a method in which an organic layer in non-light emission part is formed to obtain extremely large thickness providing substantial non-light emission, and a method in which any one of an anode or a cathode, or both of them are formed in the pattern. By forming a pattern by any of these methods and by placing some electrodes so that independent on/off is possible, there is obtained a display device of segment type which can display digits, letters, simple marks and the like. Further, for forming a dot matrix device, it may be advantageous that anodes and cathodes are made in the form of stripes and placed so that they cross at right angles. By a method in which a plurality of kinds of polymeric compounds emitting different colors of lights are placed separately or a method in which a color filter or light emission converting filter is used, area color displays and multi color displays are obtained. A dot matrix display can be driven by passive driving, or by active driving combined with TFT and the like. These display devices can be used as a display of a computer, television, portable terminal, portable telephone, car navigation, view finder of a video camera, and the like.

Further, the above-described light emitting device in plane form is a thin self-light-emitting one, and can be suitably used as a flat light source for back-light of a liquid crystal display, or as a flat light source for illumination. Further, if a flexible plate is used, it can also be used as a curved light source or a display.

Hereafter, examples are shown in order to explain the present invention still in detail, but the present invention is not limited to these.

Here, as the number average molecular weight, polystyrene reduced number average molecular weight was obtained by gel permeation chromatography (GPC), with using chloroform as a solvent.

EXAMPLE 1

Synthesis of Compound 1

6.65 g (19.9 mmol) of 2,7-dibromo-9-fluorenone was put in a 500 ml three-necked flask having replaced the inside by nitrogen, and dissolved in 140 ml of a mixed solvent of trifluoro acetic acid:chloroform=1:1. To this solution, sodium perborate 1 hydrate was added, and stirred for 20 hours. The reaction liquid was filtration through celite, and washed with toluene. The filtrated liquid was washed with water, sodium hydrogensulfite, and saturated NaCl aqueous solution, and then it was dried by sodium sulfate. After the solvent was distilled off, 6.11 g crude product was obtained.

This crude product was recrystallized from toluene (33 ml), and 4.99 g of Compound 1 was obtained. Furthermore, it was recrystallized from chloroform (50 ml), and 1.19 g of Compound 1 was obtained.

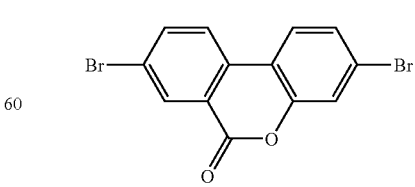

1

$^1$H-NMR (CDCl$_3$, 300 MHz): 8.52 (s, 1H), 7.97-7.86 (m, 3H), 7.55-7.46 (m, 2H)
GC-MS (m/z): 356, 354, 352

EXAMPLE 2

Synthesis of Compound 2

Preparation of $C_8H_{17}MgBr$

Magnesium 1.33 g (54.2 mmol) was put in a 100 ml three necked flask, and flame-dried, and replaced the inside with argon. THF 10 ml and 1-bromooctane 2.3 ml (13.6 mmol) were added and heated to start the reaction. After refluxing for 2.5 hours, it was left cooling to a room temperature.

Grignard reaction 1.00 g (p. 96%, 2.7 mmol) of 1 was put in a 300 ml three-necked flask having replaced the inside by nitrogen, and suspended in 10 ml THF. After cooling to 0° C., $C_8H_{17}MgBr$ solution prepared above was added. The cooling bath was removed and it was stirred under reflux for 5 hours. After standing the reaction liquid to cool, 10 ml of water and hydrogen chloride were added. Although it was suspension liquid before adding hydrogen chloride, it became a solution of two phases after the addition. After partition, the organic phase was washed by water and saturated NaCl aqueous solution. It was dried with sodium sulfate and the solvent was distilled off, and 1.65 g crude product was obtained. By purification through silica gel column chromatography (hexane:ethyl-acetate=20:1), 1.30 g of Compound 2 was obtained.

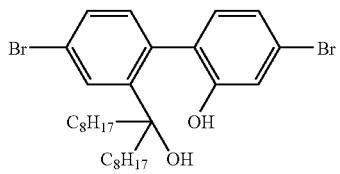

2

$^1$H-NMR (CDCl$_3$, 300 MHz): 7.66 (br, 1H), 7.42 (dd, 1H), 7.10-7.06 (m, 2H), 6.91-6.85 (m, 2H), 5.55 (br, 1H), 1.90-0.86 (m, 34H)

MS (APCI, Negative, m/z): 583, 581, 579

EXAMPLE 3

Synthesis of Compound 3

0.20 g (0.32 mmol) of 2 was put in a 25 ml two-necked flask having replaced the inside by nitrogen, and dissolved in 4 ml of toluene. To this solution, 0.02 g (0.06 mmol) of p-toluene sulfonic acid 1 hydrate was added, and stirred at 100° C. for 11 hours. After standing the reaction liquid to cool, the reaction liquid was washed with water, 4N NaOH aqueous solution, and saturated NaCl aqueous solution in the order of water, and the solvent was distilled off. 0.14 g of Compound 3 was obtained.

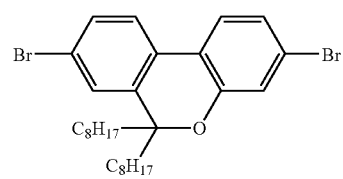

3

$^1$H-NMR (CDCl$_3$, 300 MHz): 7.59 (d, 1H), 7.53 (d, 1H), 7.47 (d, 1H), 7.29 (br, 1H), 7.15 (s, 1H), 7.13 (d, 1H), 1.92 (br, 4H), 1.28 (m, 24H), 0.93 (t, 6H)

FD-MS (m/z): 566, 564, 562

EXAMPLES 4-9

By using Grignard reagent or Li reagent shown in the following Table 1 instead of $C_8H_{17}MgBr$ in Example 2, Compounds 4-9 shown in Table 1 were synthesized.

TABLE 1

| Example | Compound | Gringard reagent[#1] |
|---|---|---|
| 4 | 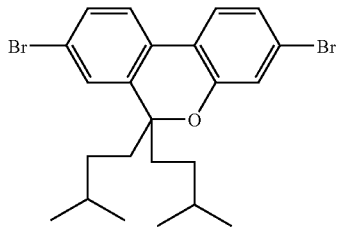<br>4 | 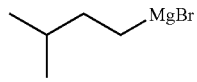 |
| 5 | 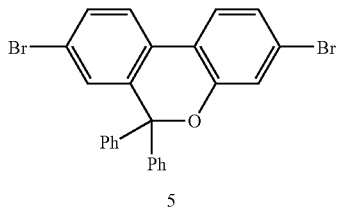<br>5 | |

TABLE 1-continued

| Example | Compound | Grignard reagent[#1] |
|---|---|---|
| 6 | (compound 6) | 4-(octyloxy)phenyl-MgBr |
| 7 | (compound 7) | 4-(t-Bu)phenyl-MgBr |
| 8 | (compound 8) | 4-(pentaphenylphenyl)phenyl-Li |
| 9 | (compound 9) | 4,4'-bis(octyloxy)-2,2'-biphenylenebis(MgBr) |

[#1] Grignard reagent was prepared from the corresponding bromide.

As to Example 8, a Li reagent prepared by the method according to J. Am. Chem. Soc., 2001, 123, 946 was used instead of Grignard reagent.

Compound 4: $^1$H-NMR (300 MHz/CDCl$_3$): δ 7.54 (d, 1H), 7.48 (d, 1H), 7.42 (dd, 1H), 7.21 (d, 1H), 7.10 to 7.05 (m, 2H), 1.91 to 1.76 (m, 4H), 1.53 to 1.38 (m, 2H), 1.30 to 1.09 (m, 4H), 0.90 to 0.81 (m, 12H)

$^{13}$C-NMR: (300 MHz/CDCl$_3$): δ 153.9, 139.0, 130.9, 128.2, 127.9, 124.7, 124.0, 123.9, 123.0, 122.0, 121.2, 120.1, 83.2, 36.8, 32.7, 31.9, 28.5, 22.9, 22.7, 14.4

MS (API-ES (negative) KCL addition m/z: 517, 515, 513 (M+C))

Compound 5: $^1$H-NMR (300 MHz/CDCl$_3$): δ 7.56 (d, 1H), 7.51 (dd, 1H), 7.42 (d, 1H), 7.30 to 7.13 (m, 12H), 7.03 (dd, 1H), 6.84 (br, 1H)

$^{13}$C-NMR (300 MHz/CDCl$_3$): δ 153.7, 142.7, 138.9, 132.0, 131.5, 129.0, 128.8, 128.6, 128.3, 125.7, 124.3, 124.2, 123.2, 122.1, 121.9, 121.6, 87.1

MS (APCI (Positive)) m/z: 495, 493, 491

Compound 6: $^1$H-NMR (300 MHz/CDCl$_3$): δ 7.54 (d, 1H), 7.49 (d, 1H), 7.42 (d, 1H), 7.16 (br, 1H), 7.06 to 7.02 (m, 5H), 6.85 (s, 1H), 6.78 (d, 4H), 3.90 (t, 4H), 1.79 to 1.70 (m, 4H), 1.45 to 1.29 (m, 20H), 0.90 (t, 6H)

$^{13}$C-NMR (300 MHz/CDCl$_3$): δ 159.2, 153.6, 139.6, 134.8, 131.9, 131.4, 130.3, 125.5, 124.2, 124.1, 123.1, 122.1, 121.8, 114.0, 86.8, 68.3, 32.1, 29.7, 29.6, 29.5, 26.4, 23.0, 14.4

MS (APCI (Positive)) m/z: 751, 749, 747

Compound 7: $^1$H-NMR (300 MHz/CDCl$_3$): δ 7.55 (d, 1H), 7.50 (dd, 1H), 7.43 (d, 1H), 7.32 to 7.27 (m, 4H), 7.20 (br, 1H), 7.09 to 7.02 (m, 5H), 6.87 (d, 1H), 1.29 (s, 18H)

$^{13}$C-NMR (300 MHz/CDCl$_3$): δ 153.9, 151.2, 139.8, 139.2, 131.8, 131.5, 128.7, 128.6, 125.4, 125.2, 124.3, 123.1, 122.0, 121.7, 121.4, 86.9, 34.8, 31.6

Compound 8: $^1$H-NMR (300 MHz/CDCl$_3$): δ 7.54-7.51 (m, 3H), 7.45 (d, 1H), 7.16 to 6.77 (m, 51H), 6.61 (brs, 1H)

MS (APPI-positive) m/z: 1253.3 (calcd. 1253.2)

Compound 9: $^1$H-NMR (300 MHz/CDCl$_3$): δ 7.67 (d, 2H), 7.45 (dd, 1H), 7.26 to 7.06 (m, 6H), 6.77 (br, 1H), 6.69 (dd, 2H), 4.01 (t, 4H), 1.81 (m, 4H), 1.48 to 1.30 (m, 20H), 0.89 (t, 6H)

MS (ESI (Negative, KCl addition)) m/z: 747, 745, 743 (M-H)

EXAMPLE 10

Synthesis of Compound 3-a

In a reaction vessel under nitrogen atmosphere, 1.0 g (1.77 mmol) of the above Compound 3, bis(pinacolate)diboron 0.945 g (3.72 mmol), 1,1'-bis(diphenyl phosphino)ferrocene] palladium dichloride 0.078 g (0.11 mmol), 1,1'-bis(diphenyl phosphino) ferrocene 0.059 g (0.11 mmol) and 1,4-dioxane 15 ml were put in, and bubbling of argon gas was carried out for 30 minutes. Then, 1.043 g (10.6 mmol) of potassium acetate was added, and reacted at 95° C. for 13.5 hours under nitrogen atmosphere. After the reaction, the reaction liquid was filtrated and the insoluble material was removed. It was purified through alumina short column, and the solvent was removed, then it was dissolved in toluene, and filtrated with activated carbon being added and stirred. The filtrated liquid was again purified through alumina short column, and filtrated with activated carbon being added and stirred. After removing toluene completely, it was recrystalled with adding 2.5 ml of hexane, 0.28 g of Compound 3-a shown below was obtained. (yellowish white crystal)

$^1$H-NMR (300 MHz/CDCl$_3$): δ 0.85 (t, 6H), 1.20 (s, 12H), 1.35 (m, 24H), 1.88 (m, H), 7.36 (s, 1H), 7.38 (d, 1H), 7.51 (s, 1H), 7.72 (d, 1H), 7.75 (s, 2H).

MS: (FD$^+$)M$^+$ 659

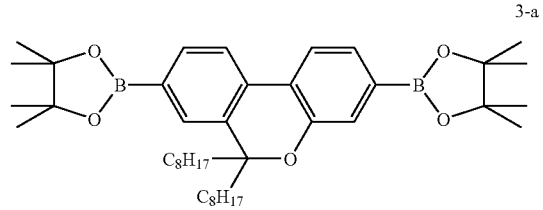

3-a

EXAMPLE 11

Synthesis of Compound 10

8.72 g (p. 96%, 28.4 mmol) of 2,7-Dibromo-9-fluorenones was put in a 1 L three-necked flask having replaced the inside by argon, and 250 g of trichloro acetic acid and 6.7 ml of concentrated sulfuric acid were added. This solution was heated to 100° C., 0.5 g of sodium azide was added 5 times at every 5 hours (Total 2.5 g, 36.9 mmol), it was kept warm further for 7 hours. This solution was charged into a 500 ml iced water, filtrated and washed with water, 10.65 g crude product of Compound 10 was obtained.

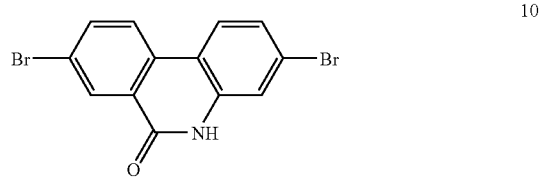

10

$^1$H-NMR (DMSO-d6, 300 MHz): 8.44 (d, 1H), 8.37 (d, 1H), 8.32 (d, 1H), 8.03 (dd, 1H), 7.55 (d, 1H), 7.44 (dd, 1H)

MS (APCI-Positive, m/z): 356, 354, 352

EXAMPLE 12

Synthesis of Compounds 11 and 12

5.00 g (p. 65.6%, 9.3 mmol) of Compound 10 was put in a 300 ml three-necked flask having replaced the inside by nitrogen, and dispersed in 100 ml dehydrated DMF. NaH (p. 60%, 21.2 mmol) was added to this solution, and heated at 100° C. for 1 hour. After heating, the insoluble portion was dissolved. After standing this solution to cool to room temperature, 1-bromooctyl. 3.7 ml (p. 99.5%, 21.2 mmol) was added, and stirred at 100° C. for 10 hours. The reaction liquid was cooled to 0° C., 50 ml water was added, and 150 ml×3 times of toluene extraction were carried out. The organic phases are combined, and it was washed by water and saturated NaCl aqueous solution, dried with sodium sulfate, and the solvent was distilled off. 10.16 g of crude product was obtained. This crude product was purified through silica gel column chromatography (eluent: hexane to hexane:ethyl acetate=100:1), and 0.83 g of Compound 11 and 0.93 g of Compound 12 were obtained.

Compound 11

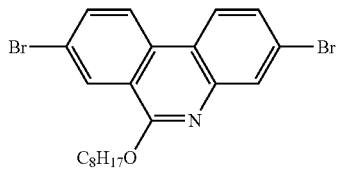

$^1$H-NMR (CDCl$_3$, 300 MHz): 8.46 (d, 1H), 8.26 (d, 1H), 8.16 (d, 1H), 8.02 (d, 1H), 7.87 (dd, 1H), 7.55 (dd, 1H), 4.58 (t, 2H), 1.92 (m, 2H), 1.59 to 1.33 (m, 10H), 0.90 (t, 3H)
MS (APCI-Positive, m/z): 468, 466, 464

Compound 12

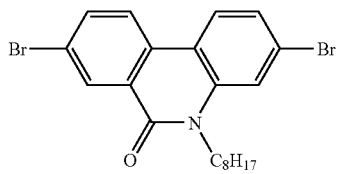

$^1$H-NMR (CDCl$_3$, 300 MHz): 8.64 (d, 1H), 8.09 (m, 2H), 7.82 (dd, 1H), 7.51 (d, 1H), 7.41 (dd, 1H), 4.30 (t, 2H), 1.77 (m, 2H), 1.60 to 1.29 (m, 10H), 0.89 (t, 3H)
MS (APCI-Positive, m/z): 468, 466, 464

EXAMPLE 13

Synthesis of Polymer Compound A

After charging 0.96 g of the above Compound 3 and 0.55 g of 2,2'-bipyridyl in a reaction vessel, the inside of the reaction system was replaced by nitrogen gas. Tetrahydrofuran (THF) (dehydrated solvent) 80 g which was deaerated previously by bubbling of argon gas was added. Next, to this mixed solution, 1.05 g of bis(1,5-cyclooctadiene)nickel(0){Ni(COD)$_2$} was added, then, after stirring it at room temperature for 10 minutes, it was reacted at 60° C. for 1.5 hours. The reaction was carried out in nitrogen gas atmosphere. After the reaction, this solution was cooled, and poured into a mixed solution of methanol 100 ml/ion-exchanged water 200 ml, and stirred for about 1 hour. Next, resulting precipitate was collected by filtration. This precipitate was dried under reduced-pressure, and dissolved in chloroform. After having filtrated this solution and removing insoluble material, this solution was purified by passing it through column filled with alumina. Next, this solution was poured into methanol, reprecipitated and the resulting precipitate was collected. This precipitate was dried under reduced-pressure, and 0.5 g of a polymer was obtained. The polystyrene reduced number average molecular weight of this polymer was $7.3 \times 10^5$, and the polystyrene reduced weight average molecular weight was $6.5 \times 10^6$.

EXAMPLE 14

Synthesis of Polymer Compound B

After charging 0.56 g of the above Compound 3 and 0.27 g of 2,2'-bipyridyl in a reaction vessel, the inside of the reaction system was replaced by nitrogen gas. Tetrahydrofuran (THF) (dehydrated solvent) 40 g which was deaerated previously by bubbling of argon gas was added. Next, to this mixed solution, 0.47 g of bis(1,5-cyclooctadiene)nickel(0){Ni(COD)$_2$} was added, then, after stirring it at room temperature for 10 minutes, it was reacted at 60° C. for 3 hours. The reaction was carried out in nitrogen gas atmosphere. After the reaction, this solution was cooled, and poured into a mixed solution of methanol 100 ml/ion-exchanged water 200 ml, and stirred for about 1 hour. Next, resulting precipitate was collected by filtration. This precipitate was dried under reduced-pressure, and dissolved in toluene. After having filtrated this solution and removing insoluble material, this solution was washed with about 1 N hydrogen chloride. This solution was allowed to stand and the toluene layer was recovered. This solution was washed by about 2.5% of aqueous ammonia. This solution was allowed to stand and the toluene layer was recovered. After washing this solution by ion-exchanged water, the toluene layer was recovered. Next, this solution was poured into methanol, reprecipitated, and the resulting precipitate was collected. This precipitate was dried under reduced-pressure, and 0.15 g of a polymer was obtained.

The polystyrene reduced number average molecular weight of this polymer was $8.2 \times 10^4$, and the polystyrene reduced weight average molecular weight was $2.6 \times 10^5$.

EXAMPLE 15

Synthesis of Polymer Compound C

After charging 0.56 g of the above Compound 3, 0.017 g of 4-bromotoluene, and 0.37 g of 2,2'-bipyridyl in a reaction vessel, the inside of the reaction system was replaced by nitrogen gas. Tetrahydrofuran (THF) (dehydrated solvent) 40 g which was deaerated previously by bubbling of argon gas was added. Next, to this mixed solution, 0.66 g of bis(1,5-cyclooctadiene)nickel(0){Ni(COD)$_2$} was added, then, after stirring it at room temperature for 10 minutes, it was reacted at 60° C. for 3 hours. The reaction was carried out in nitrogen gas atmosphere. After the reaction, this solution was cooled, and poured into a mixed solution of methanol 100 ml/ion-exchanged water 200 ml, and stirred for about 1 hour. Next, resulting precipitate was collected by filtration. This precipitate was dried under reduced-pressure, and dissolved in toluene. After having filtrated this solution and removing insoluble material, this solution was washed with about 1 N hydrogen chloride. This solution was allowed to stand and the toluene layer was recovered. This solution was washed by about 2.5% of aqueous ammonia. This solution was allowed to stand and the toluene layer was recovered. After washing this solution by ion-exchanged water, the toluene layer was recovered. Next, this solution was poured into methanol, reprecipitated, and the resulting precipitate was collected. This precipitate was dried under reduced-pressure, and 0.1 g of a polymer was obtained.

The polystyrene reduced number average molecular weight of this polymer was $3.0 \times 10^4$, and the polystyrene reduced weight average molecular weight was $9.4 \times 10^4$.

EXAMPLE 16

Synthesis of Polymer Compound D

After charging 0.42 g of the above Compound 3, and 0.55 g of 2,2'-bipyridyl in a reaction vessel, the inside of the reaction system was replaced by nitrogen gas. Tetrahydrofuran (THF) (dehydrated solvent) 75 ml which was deaerated previously by bubbling of argon gas was added. Next, to this mixed solution, 1.0 g of bis(1,5-cyclooctadiene)nickel(0){Ni (COD)₂} was added, then, after stirring it at room temperature for 10 minutes, it was reacted at 60° C. for 3 hours. The reaction was carried out in nitrogen gas atmosphere.

After the reaction, this solution was cooled, and poured into a mixed solution of methanol 10 ml/ion-exchanged water 200 ml, and stirred for about 1 hour. Next, resulting precipitate was collected by filtration. This precipitate was dried under reduced-pressure, and dissolved in toluene. After having filtrated this solution and removing insoluble material, this solution was passed through a column filled with alumina. Next, the solution was washed with about 1 N hydrogen chloride. This solution was allowed to stand and the toluene layer was recovered. This solution was washed by about 2.5% of aqueous ammonia. This solution was allowed to stand and the toluene layer was recovered. After washing this solution by ion-exchanged water, the toluene layer was recovered. Next, this solution was poured into methanol, reprecipitated, and the resulting precipitate was collected. This precipitate was dried under reduced-pressure, and 0.29 g of a polymer was obtained.

The polystyrene reduced number average molecular weight of this polymer was $2.5 \times 10^4$, and the polystyrene reduced weight average molecular weight was $4.1 \times 10^4$.

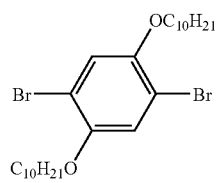

13

EXAMPLE 17

Synthesis of Polymer Compound E

After charging 0.25 g of the above Compound 3, 0.63 g of the Compound 14 shown below, and 0.46 g of 2,2'-bipyridyl in a reaction vessel, the inside of the reaction system was replaced by nitrogen gas. Tetrahydrofuran (THF) (dehydrated solvent) 70 ml which was deaerated previously by bubbling of argon gas was added. Next, to this mixed solution, 0.83 g of bis(1,5-cyclooctadiene)nickel(0){Ni(COD)₂} was added, then, after stirring it at room temperature for 10 minutes, it was reacted at 60° C. for 3 hours. The reaction was carried out in nitrogen gas atmosphere.

After the reaction, this solution was cooled, and poured into a mixed solution of methanol 100 ml/ion-exchanged water 200 ml, and stirred for about 1 hour. Next, resulting precipitate was collected by filtration. This precipitate was dried under reduced-pressure, and dissolved in toluene. After having filtrated this solution and removing insoluble material, this solution was passed through a column filled with alumina. Next, the solution was washed with about 1 N hydrogen chloride. This solution was allowed to stand and the toluene layer was recovered. This solution was washed by about 2.5% of aqueous ammonia. This solution was allowed to stand and the toluene layer was recovered. After washing this solution by ion-exchanged water, the toluene layer was recovered. Next, this solution was poured into methanol, reprecipitated, and the resulting precipitate was collected. This precipitate was dried under reduced-pressure, and 0.26 g of a polymer was obtained.

The polystyrene reduced number average molecular weight of this polymer was $2.3 \times 10^5$, and the polystyrene reduced weight average molecular weight was $1.2 \times 10^6$.

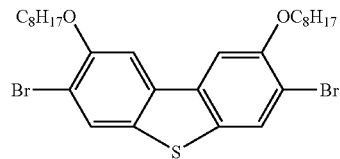

14

EXAMPLE 18

Synthesis of Polymer Compound F

After charging 0.25 g of the above Compound 3, 0.68 g of the Compound 15 shown below, and 0.46 g of 2,2'-bipyridyl in a reaction vessel, the inside of the reaction system was replaced by nitrogen gas. Tetrahydrofuran (THF) (dehydrated solvent) 70 ml which was deaerated previously by bubbling of argon gas was added. Next, to this mixed solution, 0.83 g of bis(1,5-cyclooctadiene)nickel(0){Ni(COD)₂} was added, then, after stirring it at room temperature for 10 minutes, it was reacted at 60° C. for 3 hours. The reaction was carried out in nitrogen gas atmosphere.

After the reaction, this solution was cooled, and poured into a mixed solution of methanol 100 ml/ion-exchanged water 200 ml, and stirred for about 1 hour. Next, resulting precipitate was collected by filtration. This precipitate was dried under reduced-pressure, and dissolved in toluene. After having filtrated this solution and removing insoluble material, this solution was passed through a column filled with alumina. Next, the solution was washed with about 1 N hydrogen chloride. This solution was allowed to stand and the toluene layer was recovered. This solution was washed by about 2.5% of aqueous ammonia. This solution was allowed to stand and the toluene layer was recovered. After washing this solution by ion-exchanged water, the toluene layer was recovered. Next, this solution was poured into methanol, reprecipitated, and the resulting precipitate was collected. This precipitate was dried under reduced-pressure, and 0.3 g of a polymer was obtained.

The polystyrene reduced number average molecular weight of this polymer was $3.8 \times 10^4$, and the polystyrene reduced weight average molecular weight was $4.2 \times 10^5$.

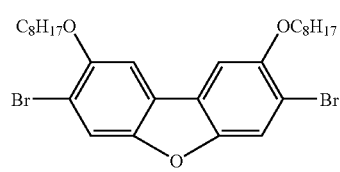

15

EXAMPLE 19

Synthesis of Polymer Compound G

After charging 0.12 g of the above Compound 3, 1.13 g of the Compound 16 shown below, and 0.94 g of 2,2'-bipyridyl in a reaction vessel, the inside of the reaction system was replaced by nitrogen gas. Tetrahydrofuran (THF) (dehydrated solvent) 60 g which was deaerated previously by bubbling of argon gas was added. Next, to this mixed solution, 1.65 g of bis(1,5-cyclooctadiene)nickel(0){Ni(COD)$_2$} was added, then, after stirring it at room temperature for 10 minutes, it was reacted at 60 for 3 hours. The reaction was carried out in nitrogen gas atmosphere.

After the reaction, this solution was cooled, and poured into a mixed solution of 25% aqueous ammonia 5 ml/methanol 35 ml/ion-exchanged water 35 ml, and stirred for about 1 hour. Next, resulting precipitate was collected by filtration. This precipitate was dried under reduced-pressure, and dissolved in toluene. After having filtrated this solution and removing insoluble material, this solution was passed through a column filled with alumina. Next, the solution was washed with about 1 N hydrogen chloride. This solution was allowed to stand and the toluene layer was recovered. This solution was washed by about 2.5% of aqueous ammonia. This solution was allowed to stand and the toluene layer was recovered. After washing this solution by ion-exchanged water, the toluene layer was recovered. Next, this solution was poured into methanol, reprecipitated, and the resulting precipitate was collected. This precipitate was dried under reduced-pressure, and 0.6 g of a polymer was obtained.

The polystyrene reduced number average molecular weight of this polymer was 6.2×10$^4$, and the polystyrene reduced weight average molecular weight was 3.0×10$^5$.

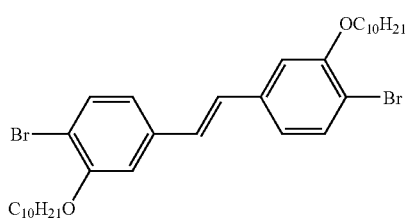

16

EXAMPLE 20

Synthesis of Polymer Compound H

After charging 0.56 g of the above Compound 3, 0.2 g of the Compound 17 shown below, and 0.46 g of 2,2'-bipyridyl in a reaction vessel, the inside of the reaction system was replaced by nitrogen gas. Tetrahydrofuran (THF) (dehydrated solvent) 40 g which was deaerated previously by bubbling of argon gas was added. Next, to this mixed solution, 0.83 g of bis(1,5-cyclooctadiene)nickel(0){Ni(COD)$_2$} was added, then, after stirring it at room temperature for 10 minutes, it was reacted at 60° C. for 3 hours. The reaction was carried out in nitrogen gas atmosphere.

After the reaction, this solution was cooled, and poured into a mixed solution of methanol 100 ml/ion-exchanged water 200 ml, and stirred for about 1 hour. Next, resulting precipitate was collected by filtration. This precipitate was dried under reduced-pressure, and dissolved in toluene. After having filtrated this solution and removing insoluble material, this solution was passed through a column filled with alumina. Next, the solution was washed with about 1 N hydrogen chloride. This solution was allowed to stand and the toluene layer was recovered. This solution was washed by about 2.5% of aqueous ammonia. This solution was allowed to stand and the toluene layer was recovered. After washing this solution by ion-exchanged water, the toluene layer was recovered. Next, this solution was poured into methanol, reprecipitated, and the resulting precipitate was collected. This precipitate was dried under reduced-pressure, and 0.06 g of a polymer was obtained.

The polystyrene reduced number average molecular weight of this polymer was 2.4×10$^4$, and the polystyrene reduced weight average molecular weight was 7.7×10$^4$.

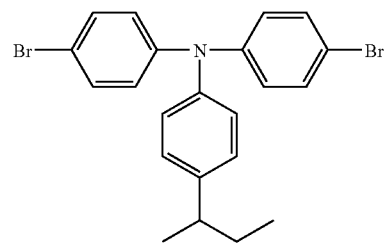

17

EXAMPLE 21

Synthesis of Polymer Compound I

After charging 0.66 g of the above Compound 3, 0.31 g of the Compound 18 shown below, and 0.55 g of 2,2'-bipyridyl in a reaction vessel, the inside of the reaction system was replaced by nitrogen gas. Tetrahydrofuran (THF) (dehydrated solvent) 50 g which was deaerated previously by bubbling of argon gas was added. Next, to this mixed solution, 1.0 g of bis(1,5-cyclooctadiene)nickel(0){Ni(COD)$_2$} was added, then, after stirring it at room temperature for 10 minutes, it was reacted at 60° C. for 3 hours. The reaction was carried out in nitrogen gas atmosphere.

After the reaction, this solution was cooled, and poured into a mixed solution of methanol 100 ml/ion-exchanged water 200 ml, and stirred for about 1 hour. Next, resulting precipitate was collected by filtration. This precipitate was dried under reduced-pressure, and dissolved in chloroform. After having filtrated this solution and removing insoluble material, this solution was passed through a column filled with alumina. Next, this solution was poured into methanol, reprecipitated, and the resulting precipitate was collected. This precipitate was dried under reduced-pressure, and 0.34 g of a polymer was obtained.

The polystyrene reduced number average molecular weight of this polymer was 2.7×10$^4$, and the polystyrene reduced weight average molecular weight was 8.9×10$^4$.

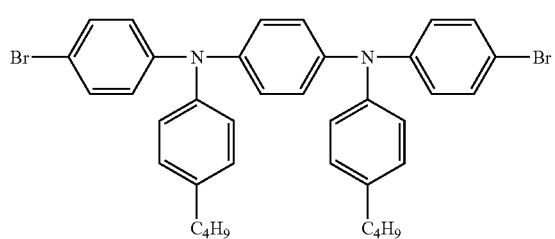

18

EXAMPLE 22

Synthesis of Polymer Compound J

After charging 0.56 g of the above Compound 3, 0.31 g of the Compound 18 shown below, 0.005 g of bromotoluene, and 0.55 g of 2,2'-bipyridyl in a reaction vessel, the inside of the reaction system was replaced by nitrogen gas. Tetrahydrofuran (THF) (dehydrated solvent) 50 g which was deaerated previously by bubbling of argon gas was added. Next, to this mixed solution, 1.0 g of bis(1,5-cyclooctadiene)nickel(0) {Ni(COD)$_2$} was added, then, after stirring it at room temperature for 10 minutes, it was reacted at 60° C. for 3 hours. The reaction was carried out in nitrogen gas atmosphere.

After the reaction, this solution was cooled, and poured into a mixed solution of methanol 100 ml/ion-exchanged water 200 ml, and stirred for about 1 hour. Next, resulting precipitate was collected by filtration. This precipitate was dried under reduced-pressure, and dissolved in toluene. After having filtrated this solution and removing insoluble material, this solution was purified by passing through a column filled with silica gel and alumina. This solution was poured into methanol, reprecipitated, and the resulting precipitate was collected. This precipitate was dried under reduced-pressure, and 0.14 g of a polymer was obtained.

The polystyrene reduced number average molecular weight of this polymer was $1.6 \times 10^4$, and the polystyrene reduced weight average molecular weight was $6.3 \times 10^4$.

EXAMPLE 23

Synthesis of Polymer Compound K

After charging 0.3 g of the above Compound 3, 0.31 g of the Compound 14 shown above, 0.31 g of the Compound 18 shown above, and 0.55 g of 2,2'-bipyridyl in a reaction vessel, the inside of the reaction system was replaced by nitrogen gas. Tetrahydrofuran (THF) (dehydrated solvent) 40 g which was deaerated previously by bubbling of argon gas was added. Next, to this mixed solution, 1.0 g of bis(1,5-cyclooctadiene)nickel(0){Ni(COD)$_2$} was added, then, after stirring it at room temperature for 10 minutes, it was reacted at 60° C. for 3 hours. The reaction was carried out in nitrogen gas atmosphere. After the reaction, this solution was cooled, and poured into a mixed solution of methanol 100 ml/ion-exchanged water 200 ml, and stirred for about 1 hour. Next, resulting precipitate was collected by filtration. This precipitate was dried under reduced-pressure, and dissolved in toluene. After having filtrated this solution and removing insoluble material, this solution was purified by passing through a column filled with silica gel and alumina. This solution was poured into methanol, reprecipitated, and the resulting precipitate was collected. This precipitate was dried under reduced-pressure, and 0.38 g of a polymer was obtained.

The polystyrene reduced number average molecular weight of this polymer was $4.4 \times 10^4$, and the polystyrene reduced weight average molecular weight was $2.6 \times 10^5$.

EXAMPLE 24

Synthesis of Polymer Compound L

After charging 0.74 g of the above Compound 6, and 0.37 g of 2,2'-bipyridyl in a reaction vessel, the inside of the reaction system was replaced by nitrogen gas. Tetrahydrofuran (THF) (dehydrated solvent) 100 ml which was deaerated previously by bubbling of argon gas was added. Next, to this mixed solution, 0.67 g of bis(1,5-cyclooctadiene)nickel(0){Ni(COD)$_2$} was added, then, it was reacted at 0-5° C. for 15 hours. The reaction was carried out in nitrogen gas atmosphere.

After the reaction, this solution was poured into a mixed solution of methanol 100 ml/ion-exchanged water 200 ml, and stirred for about 1 hour. Next, resulting precipitate was collected by filtration. This precipitate was dried under reduced-pressure, and dissolved in toluene. After having filtrated this solution and removing insoluble material, this solution was purified by passing through a column filled with alumina. Next, this solution was poured into methanol, reprecipitated, and the resulting precipitate was collected. This precipitate was dried under reduced-pressure, and 0.11 g of a polymer was obtained.

The polystyrene reduced number average molecular weight of this polymer was $3.4 \times 10^3$, and the polystyrene reduced weight average molecular weight was $4.4 \times 10^3$.

EXAMPLE 25

Synthesis of Polymer Compound M

After charging 0.74 g of the above Compound 6, 0.31 g of the above Compound 18, and 0.50 g of 2,2'-bipyridyl in a reaction vessel, the inside of the reaction system was replaced by nitrogen gas. Tetrahydrofuran (THF) (dehydrated solvent) 75 ml which was deaerated previously by bubbling of argon gas was added. Next, to this mixed solution, 0.91 g of bis(1,5-cyclooctadiene)nickel(0){Ni(COD)$_2$} was added, then, after stirring it at room temperature for 10 minutes, it was reacted at 60° C. for 3 hours. The reaction was carried out in nitrogen gas atmosphere.

After the reaction, this solution was cooled, and poured into a mixed solution of methanol 100 ml/ion-exchanged water 200 ml, and stirred for about 1 hour. Next, resulting precipitate was collected by filtration. This precipitate was dried under reduced-pressure, and dissolved in toluene. After having filtrated this solution and removing insoluble material, this solution was passed through a column filled with alumina. Next, the solution was washed with about 1 N hydrogen chloride. This solution was allowed to stand and the toluene layer was recovered. This solution was washed by about 2.5% of aqueous ammonia. This solution was allowed to stand and the toluene layer was recovered. After washing this solution by ion-exchanged water, the toluene layer was recovered. Next, this solution was poured into methanol, reprecipitated, and the resulting precipitate was collected. This precipitate was dried under reduced-pressure, and 0.5 g of a polymer was obtained.

The polystyrene reduced number average molecular weight of this polymer was $9.4 \times 10^4$, and the polystyrene reduced weight average molecular weight was $4.7 \times 10^5$.

EXAMPLE 26

Synthesis of Polymer Compound N

After charging 0.35 g of the above Compound 8, and 0.074 g of 2,2'-bipyridyl in a reaction vessel, the inside of the reaction system was replaced by nitrogen gas. Tetrahydrofuran (THF) (dehydrated solvent) 20 ml which was deaerated previously by bubbling of argon gas was added. Next, to this mixed solution, 0.13 g (0.47 mmol) of bis(1,5-cyclooctadiene)nickel(0){Ni(COD)$_2$} was added, then, after stirring it at room temperature for 10 minutes, it was reacted at 60 for 3 hours. The reaction was carried out in nitrogen gas atmosphere. After the reaction, this solution was cooled, and poured into a mixed solution of 25% aqueous ammonia 10 ml/methanol 120 ml/ion-exchanged water 50 ml, and stirred for about 1 hour. Next, resulting precipitate was collected by filtration. This precipitate was washed with ethanol, and dried under reduced-pressure for 2 hours. Next, the precipitate was dissolved in 30 ml of toluene, and stirred for 1 hour after adding 30 ml of 1 N hydrogen chloride. After removing the aqueous layer, 4% ammonia water 30 mL was added to the organic layer, and the aqueous layer was removed after stirring for 1 hour. The organic layer was added dropwise to methanol 150 mL and stirred for 1 hour, and the deposited precipitate was filtrated and dried under reduced-pressure for 2 hours, and then dissolved in 30 ml of toluene.

After purification through alumina column (amount of alumina 20 g), recovered toluene solution was added dropwise in methanol 100 mL, stirred for 1 hour, and the deposited precipitate was filtrated and dried under reduced-pressure for 2 hours. The yield of a polymer was 0.020 g.

The polystyrene reduced number average molecular weight of this polymer was $4.3 \times 10^4$, and the polystyrene reduced weight average molecular weight was $9.1 \times 10^4$.

EXAMPLE 27

Synthesis of Oolymer Compound O

After charging 0.56 g of the above Compound 9, and 0.29 g of 2,2'-bipyridyl in a reaction vessel, the inside of the reaction system was replaced by nitrogen gas. Tetrahydrofuran (THF) (dehydrated solvent) 80 g which was deaerated previously by bubbling of argon gas was added. Next, to this mixed solution, 0.6 g of bis(1,5-cyclooctadiene)nickel(0){Ni (COD)$_2$} was added, then, after stirring it at room temperature for 10 minutes, it was further reacted at room temperature for 22 hours. The reaction was carried out in nitrogen gas atmosphere.

After the reaction, this solution was poured into a mixed solution of methanol 150 ml/ion-exchanged water 150 ml, and stirred for about 1 hour. Next, resulting precipitate was collected by filtration. This precipitate was dried under reduced-pressure, and dissolved in toluene. After having filtrated this solution and removing insoluble material, this solution was passed through a column filled with alumina. Next, the solution was washed with about 1 N hydrogen chloride. This solution was allowed to stand and the toluene layer was recovered. This solution was washed by about 2.5% of aqueous ammonia. This solution was allowed to stand and the toluene layer was recovered. After washing this solution by ion-exchanged water, the toluene layer was recovered. Next, this solution was poured into methanol, reprecipitated, and the resulting precipitate was collected. This precipitate was dried under reduced-pressure, and 0.05 g of a polymer was obtained.

The polystyrene reduced number average molecular weight of this polymer was $1.5 \times 10^4$, and the polystyrene reduced weight average molecular weight was $3.0 \times 10^4$.

EXAMPLES 28-42

Fluorescence Property

TABLE 2

| Example | Polymeric fluorescent substance | Fluorescence peak (nm) | Fluorescence intensity |
|---|---|---|---|
| 28 | A | 445 | 6.15 |
| 29 | B | 448 | 4.51 |
| 30 | C | 448 | 2.27 |
| 31 | D | 428 | 8.44 |
| 32 | E | 445 | 3.87 |
| 33 | F | 429 | 4.40 |
| 34 | G | 424 | 6.04 |
| 35 | H | 445 | 3.58 |
| 36 | I | 477 | 2.67 |
| 37 | J | 476 | 1.60 |
| 38 | K | 476 | 1.91 |
| 39 | L | 439 | 9.34 |
| 40 | M | 487 | 2.78 |
| 41 | N | 434 | 5.00 |
| 42 | O | 446 | 8.55 |

0.2 wt % chloroform solutions of each polymeric fluorescent substance A-O synthesized above were spin-coated on quartz, and thin films were prepared. The fluorescence spectrum of the thin film was measured using fluorescent spectrometer ( ). For calculation of fluorescence strength, the fluorescence spectrum when excited at 350 nm was used. The relative value of fluorescence strength was calculated by dividing the area of fluorescence spectrum plotted on the horizontal axis by the absorbance at 350 nm. The measurement results are shown below.

<Measurement of EL Light Emission>

EXAMPLE 43

On a glass substrate having an ITO film sputtered thereon in a thickness of 150 nm, a film of 70 nm thickness was formed by spin-coat using a solution (Bayer Co., BaytronP) of poly (ethylenedioxythiophene)/polystyrene sulfonic acid, and it was dried at 200° C. for 10 minutes on a hot plate. Next, a film was formed by spin-coat using a toluene solution containing 1.8 wt % of Polymer compound D, at a rotation speed of 2000 rpm. After drying this at 80° C. under reduced pressure for 1 hour, and an EL device was prepared.

Further, this was dried under reduced pressure at 80° C. for 1 hour, then, about 4 nm of lithium fluoride was vapor-deposited, and, as a cathode, about 20 nm of calcium, subsequently about 50 nm aluminum were vapor-deposited to provide an EL device. Here, the deposition of metal was started after the degree of vacuum reached to $1 \times 10^{-4}$ Pa or lower. By applying voltage to the resulting device, EL light emission having a peak at 432 nm was obtained. The device showed light emission of 100 cd/m$^2$ at about 6.5V. Furthermore, the maximum light emitting efficiency was 0.45 cd/A.

EXAMPLE 44

A device was obtained as the same manner with Example 43, except that Polymer compound F was used instead of Polymer compound D. Film was formed using 1.8% toluene solution by spin-coat at 3500 rpm. By applying voltage to the resulting device, EL light emission having a peak at 448 nm was obtained. This device showed light emission of 100 cd/m$^2$ at about 9.2V. Furthermore, the maximum light emitting efficiency was 0.14 cd/A.

EXAMPLE 45

A device was obtained as the same manner with Example 43, except that Polymer compound G was used instead of Polymer compound D. Film was formed using 1.7% toluene solution by spin-coat at 1000 rpm. By applying voltage to the resulting device, EL light emission having a peak at 420 nm was obtained. This device showed light emission of 100 cd/m² at about 7.1V.

Furthermore, the maximum light emitting efficiency was 1.1 cd/A.

EXAMPLE 46

A device was obtained as the same manner with Example 43, except that Polymer compound H was used instead of Polymer compound D. Film was formed by spin-coat at 1000 rpm. By applying voltage to the resulting device, EL light emission having a peak at 452 nm was obtained. This device showed light emission of 100 cd/m² at about 4.9V. Furthermore, the maximum light emitting efficiency was 0.52 cd/A.

EXAMPLE 47

A device was obtained as the same manner with Example 43, except that Polymer compound J was used instead of Polymer compound D. Film was formed using 1.5% toluene solution by spin-coat at 800 rpm. By applying voltage to the resulting device, EL light emission having a peak at 484 nm was obtained. This device showed light emission of 100 cd/m² at about 4.5V. Furthermore, the maximum light emitting efficiency was 1.0 cd/A.

EXAMPLE 48

A device was obtained as the same manner with Example 43, except that Polymer compound M was used instead of Polymer compound D. Film was formed using 1.1% toluene solution by spin-coat at 3000 rpm. By applying voltage to the resulting device, EL light emission having a peak at 496 nm was obtained. This device showed light emission of 100 cd/m² at about 4.8V. Furthermore, the maximum light emitting efficiency was 2.97 cd/A.

EXAMPLE 49

Measurement of Liquid-Crystal Property

Polymer compound B synthesized above was interposed to a glass substrate on which polyimide orientation film was coated and rubbing-processed, and by shifting the substrate in the same direction as the direction of rubbing, share was applied. By polarizing microscope observation under cross Nicol, it was observed that Polymer compound B was oriented in one direction, and it was confirmed from the texture that it is liquid crystal phase. By DSC measurement of Polymer compound B, an exothermic peak at the time of cooling from room temperature, and large endotherm peak at the time of heating thereafter, were observed, thus it is confirmed that this polymer shows liquid crystal phase.

A toluene solution dissolved 1.5% by weight of this polymer was spin-coated on a glass substrate on which polyimide orientation film was coated and rubbing-processed, and a thin film was formed. By UV irradiation to this, polarized-light fluorescence was observed and thus, it was confirmed that this polymer may become a light-emitting material for a polarized-light emitting device.

The polymer compound of the present invention is useful as a light-emitting material, a charge transporting material, etc. The polymer compound can be used as a material for polymer light-emitting device.

The invention claimed is:

1. A polymer compound comprising a repeating unit of below formula (1), and having a polystyrene reduced number average molecular weight of $10^3$ to $10^8$,

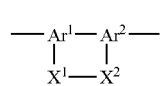
(1)

wherein, $Ar^1$ and $Ar^2$ each independently represent a trivalent aromatic hydrocarbon group or a trivalent aromatic heterocyclic group having adjacent carbons, —$X^1$—$X^2$— represents a group selected from:

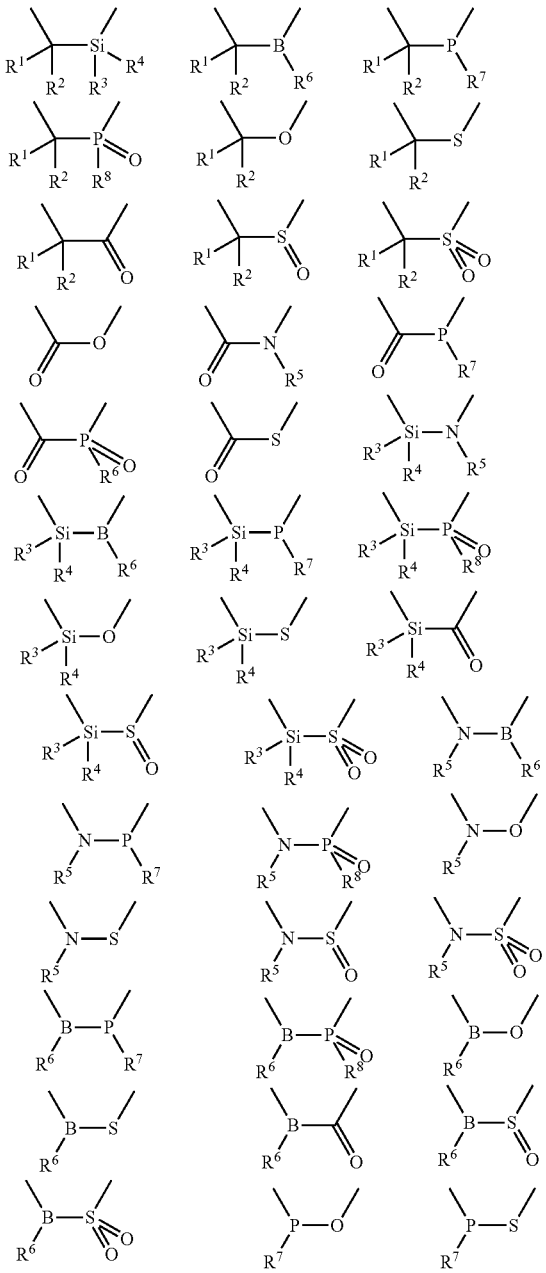

-continued

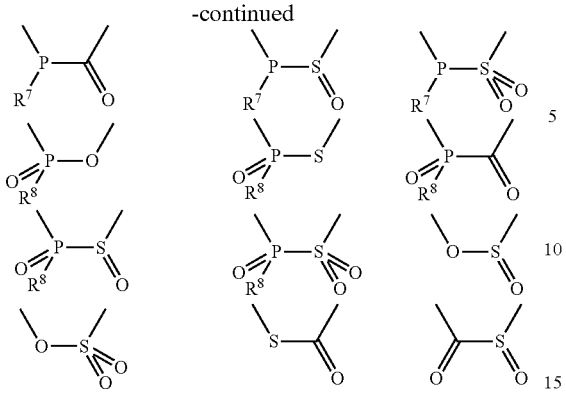

and wherein $R^1$, $R^2$, $R^3$, $R^4$, $R^5$, $R^6$, $R^7$ and $R^8$ each independently represent a hydrogen atom, halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imine residue, amino group, substituted amino group, substituted silyl group, substituted silyloxy group, substituted silylthio group, substituted silylamino group, a monovalent heterocyclic group, arylalkenyl group, arylethynyl group, carboxyl group or cyano group, $R^1$ and $R^2$, or $R^3$ and $R^4$ may be connected mutually to form a ring, $X^1$ and $X^2$ are not the same, $X^1$ and $Ar^2$ bond to adjacent carbons in the aromatic ring of $Ar^1$, and $X^2$ and $Ar^1$ bond to adjacent carbons in the aromatic ring of $Ar^2$.

2. A polymer compound according to claim 1, wherein the repeating unit represented by the above formula (1) is a repeating unit represented by the below formula (3),

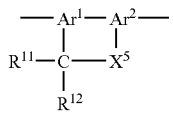 (3)

$R^{11}$ and $R^{12}$ each independently represent a hydrogen atom, halogen atom, alkyl group, aryl group, arylalkyl group, or monovalent heterocyclic group, and may be mutually connected to form a ring, and $X^5$ represents O, S, C(=O), S(=O), $SO_2$, $Si(R^3)(R^4)$, $B(R^6)$, $P(R^7)$ or $P(=O)(R^8)$.

3. A polymer compound according to claim 2, wherein the repeating unit represented by the above formula (3) is a repeating unit represented by the below formula (4),

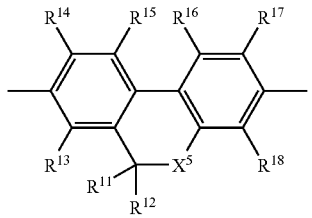 (4)

wherein $X^5$, $R^{11}$ and $R^{12}$ represent the same meaning as in claim 2, $R^{13}$, $R^{14}$, $R^{15}$, $R^{16}$, $R^{17}$, and $R^{18}$ each independently represent a hydrogen atom, halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imine residue, amino group, substituted amino group, substituted silyl group, substituted silyloxy group, substituted silylthio group, substituted silylamino group, a monovalent heterocyclic group, arylalkenyl group, aryl ethynyl group, carboxyl group, or cyano group, and $R^{14}$ and $R^{15}$, and $R^{16}$ and $R^{17}$ may be connected mutually to form a ring.

4. A polymer compound according to claim 3, wherein $X^5$ in the above formula (4) is an oxygen atom.

5. A polymer compound according to claim 1, wherein the repeating unit represented by the above formula (1) is included, and further the repeating unit represented by the below formula (5), formula (6), formula (7), or formula (8) is included, —$Ar^5$— (5)

—$Ar^5$—$X^6$—($Ar^6$—$X^7$)a-$Ar^7$— (6)

—$Ar^5$—$X^7$— (7)

—$X^7$— (8)

wherein $Ar^5$, $Ar^6$, and $Ar^7$ each independently represent an arylene group, divalent heterocyclic group, or divalent group having metal complex structure, $X^6$ represents —C≡C—, —N($R^{21}$)— or —(Si$R^{22}R^{23}$)$_b$—, $X^7$ represents —C$R^{19}$=C$R^{20}$—, —C≡C—, —N($R^{21}$)— or —(Si$R^{22}R^{23}$)$_b$—, $R^{19}$ and $R^{20}$ each independently represent a hydrogen atom, alkyl group, aryl group, monovalent heterocyclic group, carboxyl group or cyano group, $R^{21}$, $R^{22}$ and $R^{23}$ each independently represent a hydrogen atom, alkyl group, aryl group, monovalent heterocyclic group or arylalkyl group, a represents an integer of 0-1, and b represents an integer of 1-12.

6. A polymer compound according to claim 5, wherein formula (5) is a repeating unit represented by the below formula (9), (10), (11), (12), (13), or (14),

 (9)

wherein $R^{24}$ represents a halogen atom, alkyl group, alkyloxy group, alkylthio group, aryl group, aryloxy group, arylthio group, arylalkyl group, arylalkyloxy group, aryl alkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, aryl ethynyl group, carboxyl group, or cyano group, and c represents an integer of 0-4,

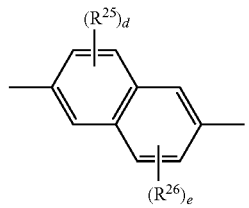 (10)

wherein $R^{25}$ and $R^{26}$ each independently represent a halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, arylethynyl group, carboxyl group, or cyano group, and d and e each independently represent an integer of 0-3,

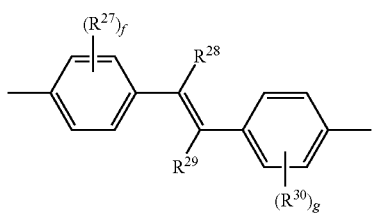

(11)

wherein $R^{27}$ and $R^{30}$ each independently represent a halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, arylethynyl group, carboxyl group, or cyano group, and $R^{28}$ and $R^{29}$ each independently represent a hydrogen atom, alkyl group, aryl group, monovalent heterocyclic group, carboxyl group, or cyano group, and f and g each independently represent an integer of 0-2,

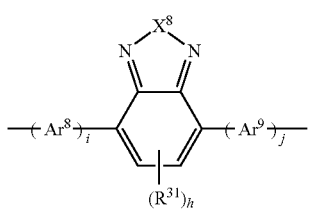

(12)

wherein $R^{31}$ represents a halogen atom, alkyl group, alkyloxy group, alkylthio group, aryl group, aryloxy group, arylthio group, arylalkyl group, arylalkyloxy group, aryl alkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, aryl ethynyl group, carboxyl group, or cyano group, h represents an integer of 0-2, $Ar^8$ and $Ar^9$ each independently represent an arylene group, divalent heterocyclic group, or a divalent group having metal complex structure, i and j each independently represent 0 or 1, and $X^8$ represents O, S, SO, SO$_2$, Se or Te,

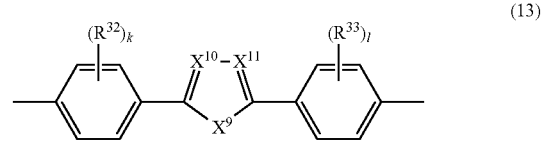

(13)

wherein $R^{32}$ and $R^{33}$ each independently represent a halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, arylethynyl group, carboxyl group, or cyano group, k and l each independently represent an integer of 0-4, $X^9$ represents O, S, SO, SO$_2$, Se, Te, N—$R^{34}$, or SiR$^{35}$R$^{36}$, $X^{10}$ and $X^{11}$ each independently represent N or C—$R^{37}$, and $R^{34}$, $R^{35}$, $R^{36}$ and $R^{37}$ each independently represent a hydrogen atom, alkyl group, aryl group, arylalkyl group or a monovalent heterocyclic group, (14)

wherein $R^{38}$ and $R^{43}$ each independently represent a halogen atom, alkyl group, alkyloxy group, alkylthio group, aryl group, aryloxy group, arylthio group, arylalkyl group, arylalkyloxy group, arylalkylthio group, acyl group, acyloxy group, amide group, acid imide group, imino group, amino group, substituted amino group, substituted silyl group, substituted silyloxy group, substituted silylthio group, substituted silylamino group, monovalent heterocyclic group, arylalkenyl group, arylethynyl group, carboxyl group, or cyano group, m and n each independently represent an integer of 0-4, $R^{39}$, $R^{40}$, $R^{41}$, and $R^{42}$ each independently represent a hydrogen atom, alkyl group, aryl group, monovalent heterocyclic group, carboxyl group, or cyano group, and $Ar^{10}$ represents an arylene group, divalent heterocyclic group, or a divalent group having metal complex structure.

7. A polymer compound according to claim 1, wherein the repeating unit represented by the above formula (1) is included, and further the repeating unit represented by the below formula (15) is included, (15)

wherein $Ar^{11}$, $Ar^{12}$, $Ar^{13}$, and $Ar^{14}$ each independently represent an arylene group or a divalent heterocyclic group, $Ar^{15}$, $Ar^{16}$, and $Ar^{17}$ each independently represent an aryl group or a monovalent heterocyclic group, o and p each independently represent 0 or 1, and $0 \leq o+p \leq 1$.

8. A polymer compound according to claim 1, wherein the total of the repeating unit represented by formula (1) is 10% by mole or more based on whole repeating units.

9. A polymer compound according to claim 1, having liquid-crystallinity.

10. A polymer compound according to claim 1, having fluorescence in the solid state.

11. A composition comprising a polymer compound according to claim 1, and at least one kind of material selected from a hole transporting material, an electron transporting material and a light-emitting material.

12. An ink composition comprising a polymer compound according to claim 1.

13. A light emitting thin film, a conductive thin film, or an organic semiconductor thin film, comprising a polymer compound according to claim 1.

14. A polymer light-emitting device having an organic layer between electrodes consisting of an anode and a cathode, and the organic layer containing a polymer compound according to claim 1.

15. A polymer light-emitting device according to claim 14, wherein the organic layer is a light emitting layer.

16. A polymer light-emitting device according to claim 15, wherein a light emitting layer contains further a hole transporting material, an electron transporting material, or a light-emitting material.

17. A flat light source, segment display material, or dot matrix display apparatus, comprising a polymer light-emitting device according to claim 14, as a back light.

18. A liquid crystal display, comprising a polymer light-emitting device according to claim 14.

* * * * *